US008843724B2

(12) United States Patent
Satoyama et al.

(10) Patent No.: US 8,843,724 B2
(45) Date of Patent: Sep. 23, 2014

(54) COMPUTER SYSTEM AND STORAGE CONTROL METHOD OF THE SAME

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 12/937,003

(22) PCT Filed: Apr. 30, 2010

(86) PCT No.: PCT/JP2010/003101
§ 371 (c)(1),
(2), (4) Date: Oct. 8, 2010

(87) PCT Pub. No.: WO2011/135635
PCT Pub. Date: Nov. 3, 2011

(65) Prior Publication Data
US 2012/0023305 A1   Jan. 26, 2012

(51) Int. Cl.
*G06F 12/00* (2006.01)
*G06F 3/06* (2006.01)

(52) U.S. Cl.
CPC ............ *G06F 3/0665* (2013.01); *G06F 3/0607* (2013.01); *G06F 3/0685* (2013.01); *G06F 3/0631* (2013.01)
USPC ........................................................ 711/170

(58) Field of Classification Search
None
See application file for complete search history.

(56) References Cited

U.S. PATENT DOCUMENTS

| 6,070,202 | A  | * | 5/2000  | Minkoff et al. ............... 710/56 |
| 6,857,059 | B2 |   | 2/2005  | Karpoff et al. |
| 7,613,945 | B2 |   | 11/2009 | Soran et al. |
| 2005/0055603 | A1 |   | 3/2005  | Soran et al. |
| 2006/0277386 | A1 | * | 12/2006 | Eguchi ............................ 711/170 |
| 2008/0235448 | A1 |   | 9/2008  | Inoue et al. |
| 2009/0043982 | A1 |   | 2/2009  | Kano et al. |
| 2009/0119529 | A1 | * | 5/2009  | Kono et al. ................... 713/324 |
| 2010/0023685 | A1 | * | 1/2010  | Ikejiri et al. .................. 711/114 |

FOREIGN PATENT DOCUMENTS

| JP | 2003-15915  | A | 1/2003 |
| JP | 2006-338341 | A | 12/2006 |
| JP | 2008-234158 | A | 10/2008 |
| JP | 2009-116436 | A | 5/2009 |
| JP | 2010-33261  | A | 2/2010 |

* cited by examiner

*Primary Examiner* — Matthew Bradley
*Assistant Examiner* — Daniel Tsui
(74) *Attorney, Agent, or Firm* — Mattingly & Malur, PC

(57) ABSTRACT

A computer system dynamically assigns the storage capacity from pool volumes to the access target in the higher-level system, and can immediately respond to the change of the status of the pool comprising the pool volumes. A control device sets the access target for the host computer to access, each time a write to the access target occurs from the host computer, from the pool assigned to the access target to the write area of the access target. The control device performs the processing of assigning the storage capacity from the logical volume in the pool. The control device defines the logical volumes in advance, compiles the same into a management group as a preliminary for the pool and, in accordance with the change of the pool status, adds the logical volumes from the management group to the pool.

17 Claims, 40 Drawing Sheets

VDEV MANAGEMENT INFORMATION 3514

LDEV MANAGEMENT
INFORMATION 3512

CAPACITY VIRTUALIZATION POOL
MANAGEMENT INFORMATION 3521

RAID GROUP INFORMATION 3515

TIER MANAGEMENT
INFORMATION 3513

SYSTEM CAPACITY POOL
MANAGEMENT INFORMATION 3525

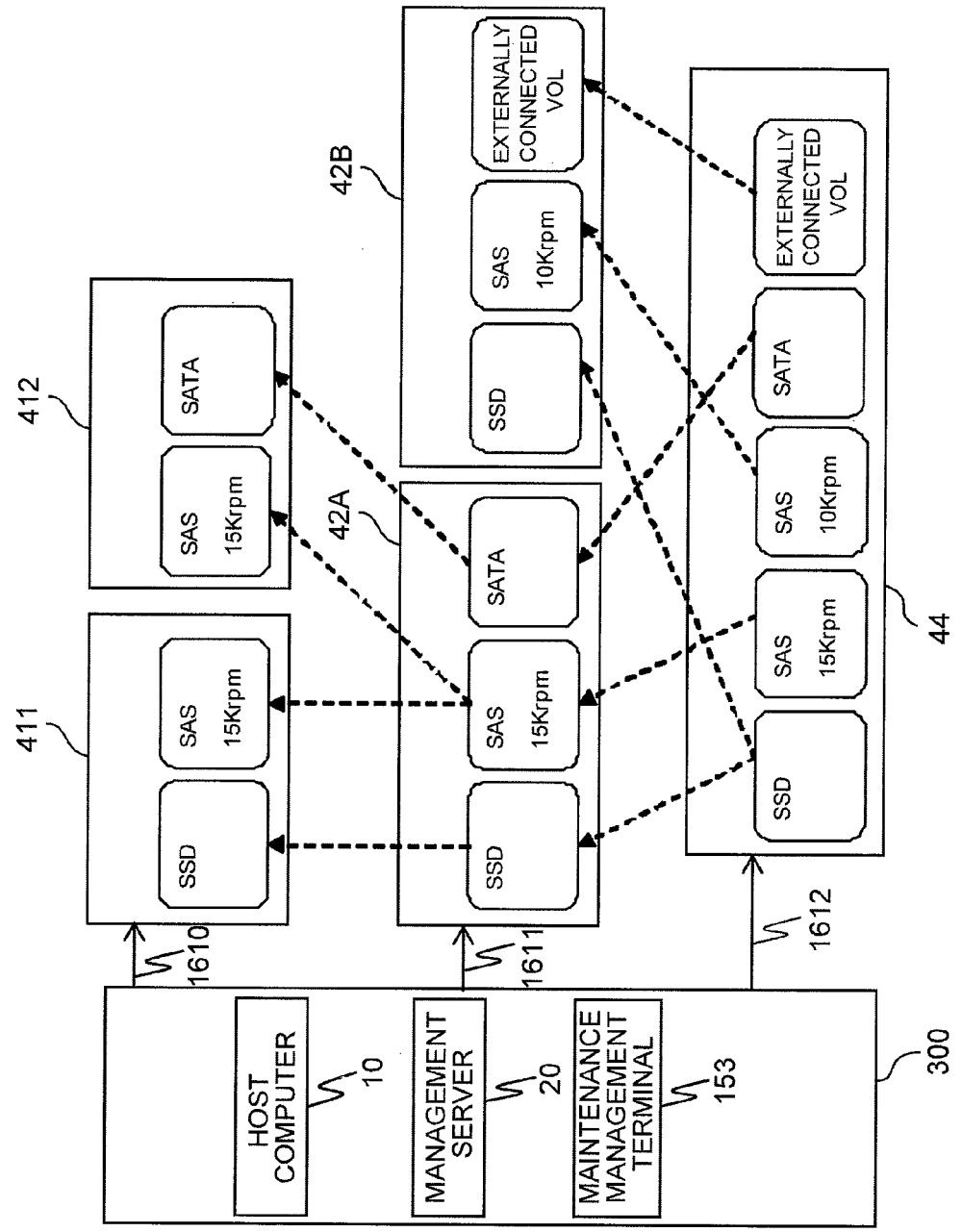

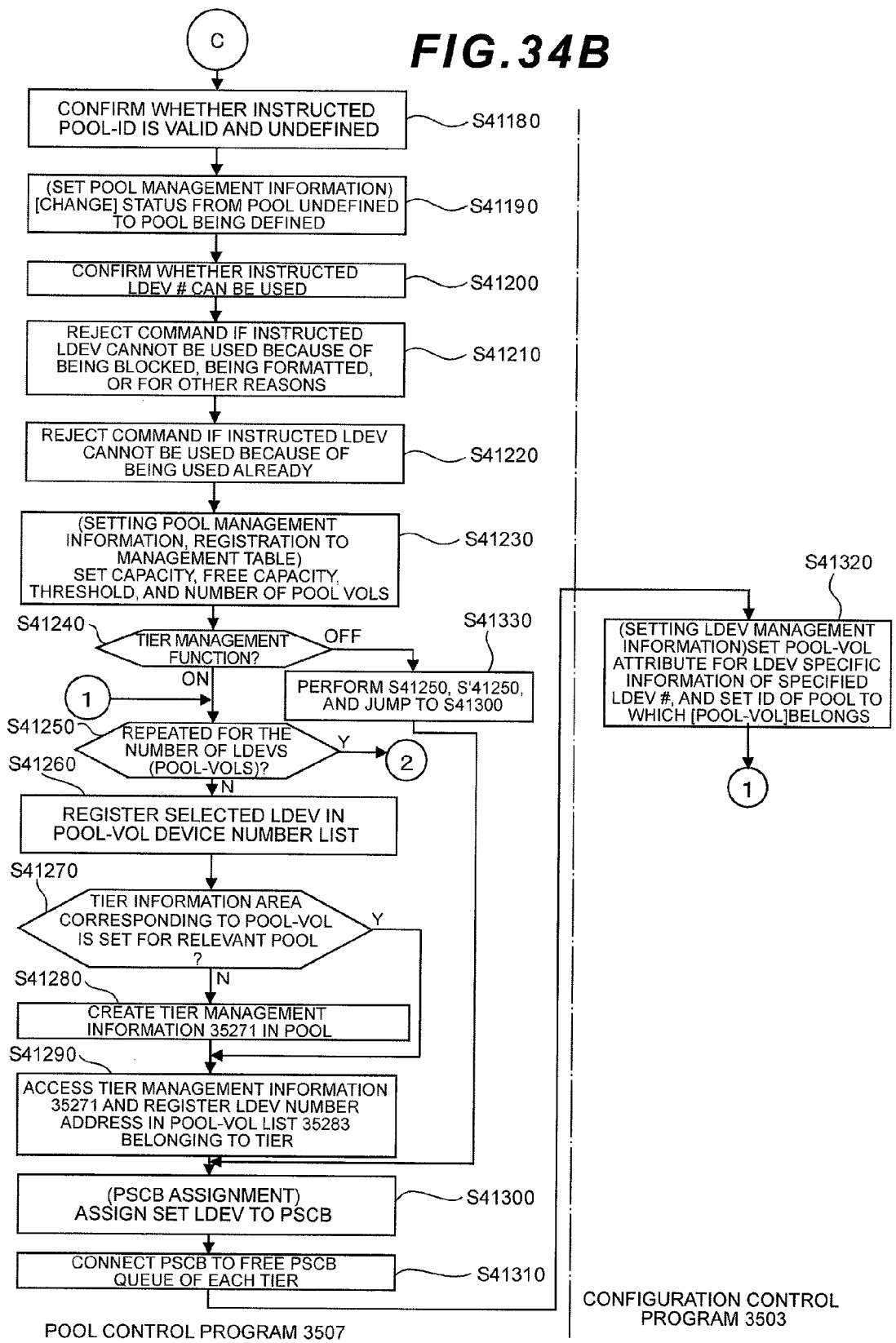

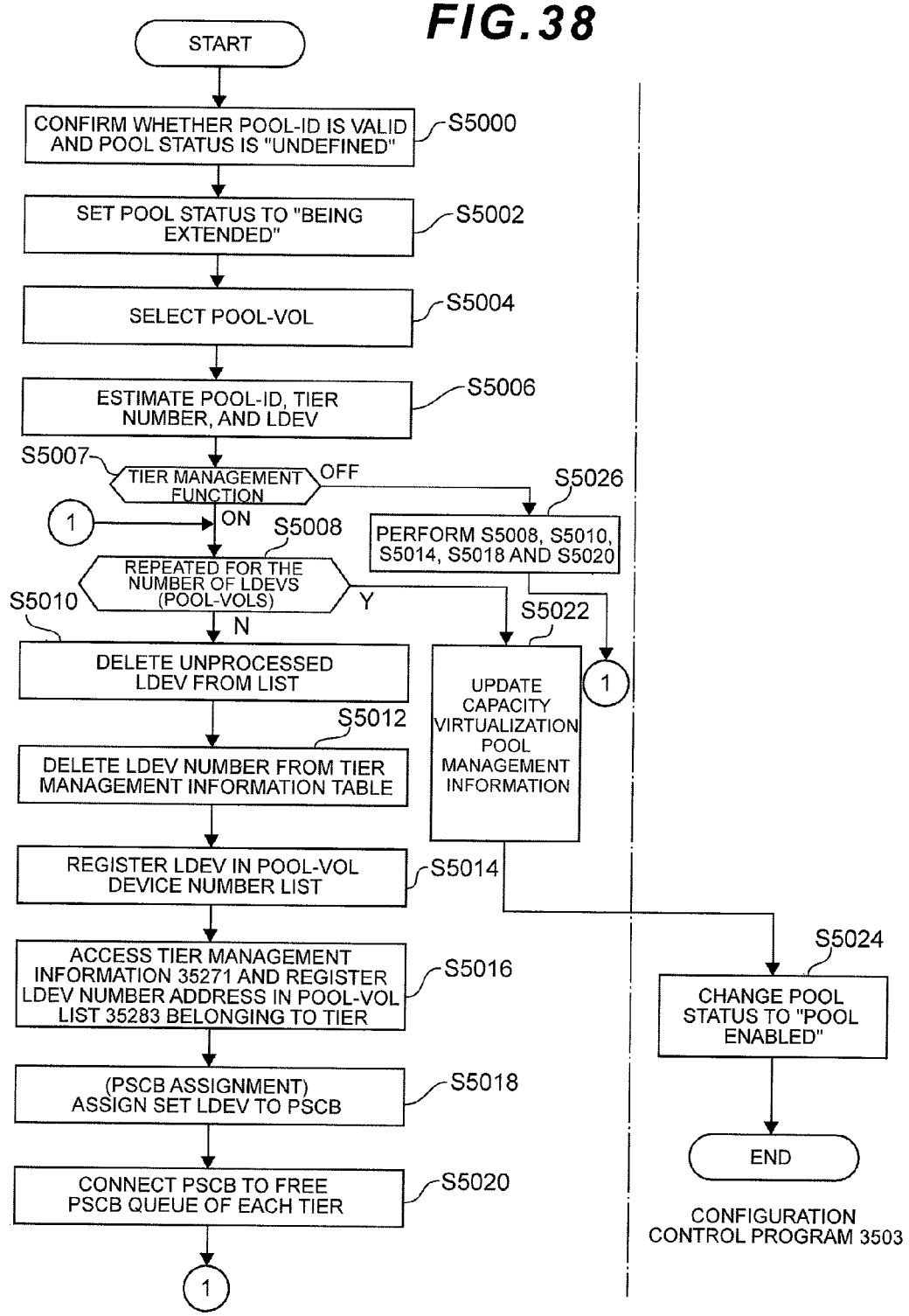

COMPUTER SYSTEM AND STORAGE CONTROL METHOD OF THE SAME

TECHNICAL FIELD

This invention relates to a computer system, specifically to a computer system which dynamically assigns a storage capacity to a host device and a storage control method of the same.

BACKGROUND ART

Conventionally, a computer system providing a large-scale data storage service to a host device exists. This system is known to comprise a host device, a storage apparatus to which the host device is connected and a management device of the storage apparatus.

The storage apparatus manages multiple hard disks by the RAID (Redundant Array of Independent/Inexpensive Disks) method. Then, [the storage apparatus] logicalizes physical storage areas included in a large number of hard disks, and provides the same to the host device as logical volumes. The host device accesses the logical volumes to request data read and write.

As one type of such logicalization technology, there is Thin Provisioning. The storage apparatus has no physical storage area, and sets logical volumes in which the storage capacity is virtualized for the host device.

These logical volumes are called virtual volumes and, in accordance with the host device's write access to the virtual volumes, the storage apparatus sequentially assigns storage areas to the virtual volumes.

Therefore, this technology is effective compared with the method of assigning a large amount of storage areas in the logical volumes from the beginning in that the storage resources can be utilized efficiently.

This technology is described in U.S. Pat. No. 6,857,059, Japanese Unexamined Patent Application Publication No. 2003-015915, Japanese Unexamined Patent Application Publication No. 2006-338341, and Japanese Unexamined Patent Application Publication No. 2008-234158.

As the method for providing storage areas to virtual volumes, if the host device makes write access to a virtual volume, by assigning a storage capacity from the capacity pool comprising actual storage areas to the address of the virtual volume, [the storage apparatus] can save write data.

At this point, a "capacity pool" (also referred to simply as a "pool") is defined and set, for example, as a set of multiple logical groups comprising actual capacity to be written to virtual volumes, and the multiple logical volumes belonging to the pool are respectively referred to as pool volumes.

Furthermore, US 2005/055603 discloses technology in which whether the access frequency to the saved data is high or low is determined and, if the access frequency is high, in accordance with physical characteristic information of pool volume media (the media type, RPM of the disk, and others), data is migrated, within the pool, to the pool volumes comprised of the media appropriate for high-speed processing.

CITATION LIST

Patent Literature

PTL 1: U.S. Pat. No. 6,857,059
PTL 2: Japanese Unexamined Patent Application Publication No. 2003-015915
PTL 3: Japanese Unexamined Patent Application Publication No. 2006-338341
PTL 4: Japanese Unexamined Patent Application Publication No. 2008-234158
PTL 5: U.S. Patent Application No. 2005/055603

SUMMARY OF INVENTION

Technical Problem

In the above-mentioned conventional technologies, if there is a case where there is no more free capacity in the pool or a case where the balance of free capacities becomes uneven among multiple pools, the system administrator or the system user, at each time, had to perform the setting control processing of the computer system configuration such as defining pool volumes respectively and adding the same to the pool. As a result, the conventional computer system had the problem of not being able to respond to the change of the pool capacity immediately.

Therefore, an object of this invention is to provide a computer system which, in the computer system dynamically assigning the storage capacity from pool volumes to the access target in the host system, can immediately respond to the change of the status of the pool comprising the pool volumes and a control method of the same.

Furthermore, another object of this invention is to provide a computer system capable of automatically performing the assignment of pool volumes to the pool independently of the operation by the administrator or the user and a control method of the same.

Furthermore, another object of this invention is to provide a computer system capable of managing and operating the pool configuration and the assignment of logical storage areas to the pool in accordance with the storage hierarchy and a control method of the same.

Solution to Problem

The computer system related to this invention is characterized by, for achieving these purposes, comprising a control device which sets the access target for the host computer to access, each time write to the access target occurs from the host computer, from the pool assigned to the access target to the write area of the access target, and performs the processing of assigning the storage capacity of the logical volume in the pool, wherein the control device defines other logical volumes in advance, compiles the same into a management group as a preliminary for the pool and, in accordance with the change of the pool status, adds the other logical volumes from the management group to the pool.

Advantageous Effects of Invention

As described above, according to this invention, a computer system which, in the computer system dynamically assigning the storage capacity from pool volumes to the access target in the host system, can immediately respond to the change of the status of the pool comprising the pool volumes can be provided.

BRIEF DESCRIPTION OF DRAWINGS

FIG. 30 is a block diagram showing the relationship between the configuration and the input means of the system of Thin Provisioning.

FIG. 34B is a flowchart related to another part of the new capacity virtualization pool creation processing.

FIG. 38 is a flowchart describing the addition processing of pool volumes from the system capacity pool to the capacity virtualization pool.

DESCRIPTION OF EMBODIMENTS

Figure 1:
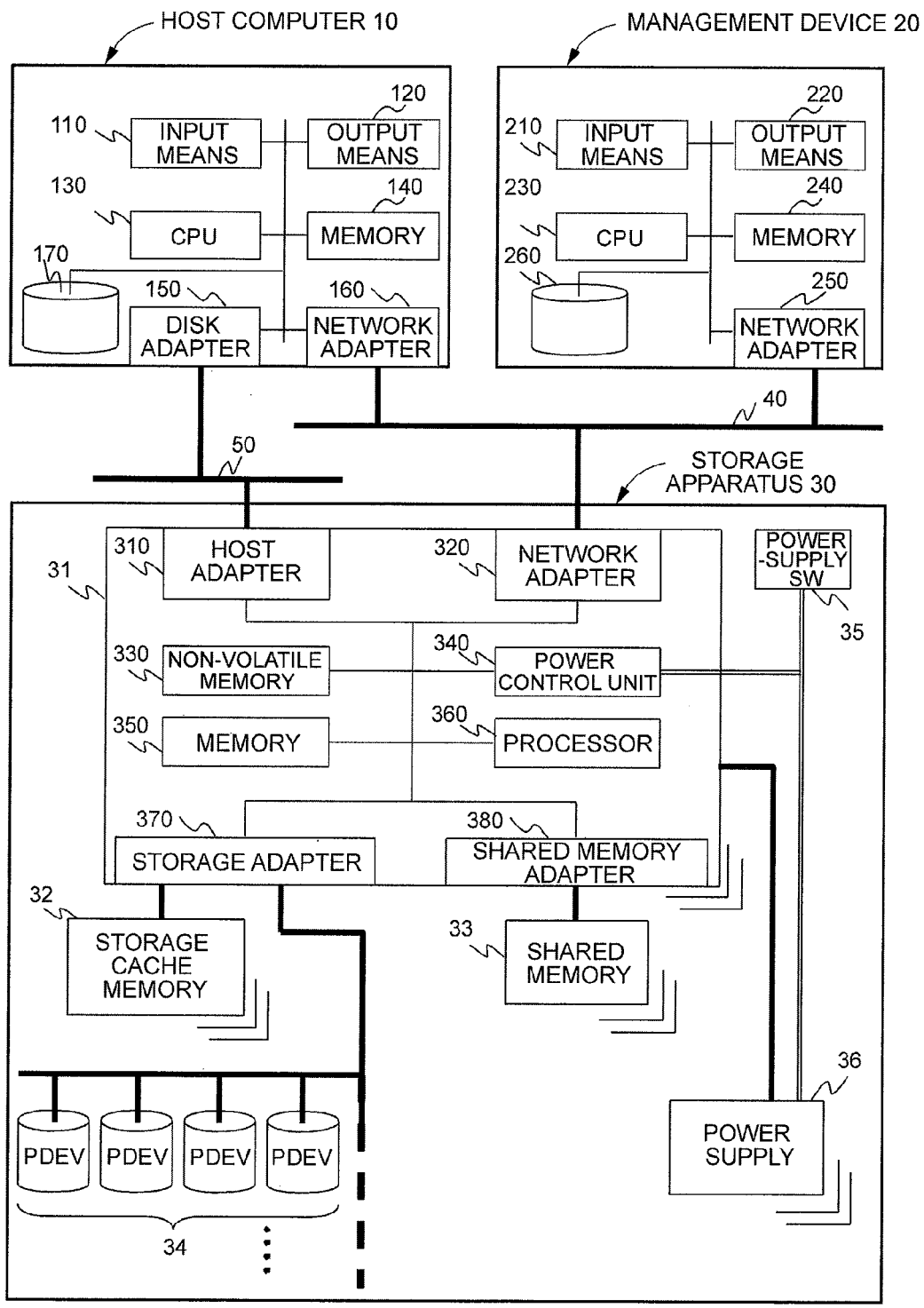
FIG. 1 is a hardware block diagram showing a first example of the computer system related to this invention.

The embodiments of this invention are now described. FIG. 1 is a hardware block diagram showing a first example of the computer system related to this invention. The computer system comprises a host computer 10, a management device 20, and a storage apparatus 30 to which these are connected. The storage apparatus 30 is also referred to as a storage system or as a storage subsystem.

The host computer 10 accesses logical storage resources in the storage apparatus 30. The management device 20 manages the configuration of the storage area in the storage apparatus 30. The storage apparatus 30 stores data in the storage area set for physical devices 34.

The host computer 10 comprises an input means (device) 110, an output means (device) 120, a CPU 130, a memory 140, a disk adapter 150, a network adapter 160, and a disk drive 170.

The input means 110 is a means for accepting the input from the administrator and others that operate the host computer 10. The input means 110 is configured of, for example, a keyboard. The output means 120 is a means for displaying the status and the setting items of the host computer 10. The output means 120 is configured of, for example, a display device.

The CPU 130 (controller) reads the programs stored in the disk drive 170 to the memory 140 and performs the processing specified by the programs. The memory 140 is configured of, for example, RAM and others and stores programs, data, and others.

The disk adapter 150 is connected to the storage apparatus 30 via a storage area network 50 and transmits and receives data to and from the storage apparatus 30. The storage area network 50 achieves data transfer by a suitable protocol for data transfer (e.g. Fibre Channel).

The network adapter 160 transmits and receives data to and from the management device 20 or the storage apparatus 30 via a management network 40. The management network 40 is configured of, for example, Ethernet (registered trademark). The disk drive 170 is configured of, for example, a hard disk device and stores data and programs.

The management device 20 comprises an input means 210, an output means 220, a CPU 230, a memory 240, a network adapter 250, and a disk drive 260.

The input means 210 is a means for accepting the input from the administrator and others that operate the management device 20 and is configured of, for example, a keyboard. The output device 220 is a means for displaying the status and the setting items of the management device 20 and is configured of, for example, a display device.

The CPU 230 reads management programs stored in the disk drive 260 to the memory 240 and, in accordance with the programs, performs the management processing for the storage apparatus 30. The memory 240 is configured of, for example, RAM and others and stores programs, data, and others.

The network adapter 250 transmits and receives data to and from the host computer 10 or the storage apparatus 30 via the management network 40. The disk drive 260 is configured of, for example, a hard disk device, and stores data and programs.

The storage apparatus 30 comprises a controller 31, a storage cache memory 32, a shared memory 33, physical devices (PDEVs) 34, a power-supply switch 35, and a power supply 36.

The controller 31 controls the storage of data into the storage areas configured of the PDEVs 34.

The storage cache memory 32 temporarily stores the data read from and written to the PDEVs 34. The shared memory 33 stores the configuration information of the controller 31 and the PDEVs 34.

The PDEVs 34 are configured of multiple disk devices. The power supply 36 supplies power to the respective parts of the storage apparatus 30.

The power-supply switch 35 is a switch by which the supply of power from the power supply 36 is turned ON/OFF. The disk devices (storage devices) are, for example, configured of hard disk drives, and mainly stores user data. As a storage device, a drive configured of a semiconductor memory such as a flash memory may also be used.

The controller 31 at least comprises a processor 360 and, in this embodiment, further comprises a host adapter 310, a network adapter 320, a non-volatile memory 330, a power control unit 340, a memory 350, a storage adapter 370, and a shared memory adapter 380.

The host adapter 310 transmits and receives data to and from the host computer 10 via the storage network 50. The network adapter 320 transmits and receives data to and from the host computer 10 or the management device 20 via the management network 40.

The non-volatile memory 330 is configured of a hard disk or a flash memory, and stores the programs running in the controller 31, configuration information, and others. The power control unit 340 controls power which is supplied from the power supply 36.

The memory 350 is configured of, for example, RAM and others and stores programs, data, and others. The processor 360 reads the programs stored in the non-volatile memory 330 to the memory 350, and performs the processing specified by the programs.

The storage adapter 370 transmits and receives data to and from the PDEVs 34 and the storage cache memory 32. The shared memory adapter 380 transmits and receives data to and from the shared memory 33.

Figure 2:
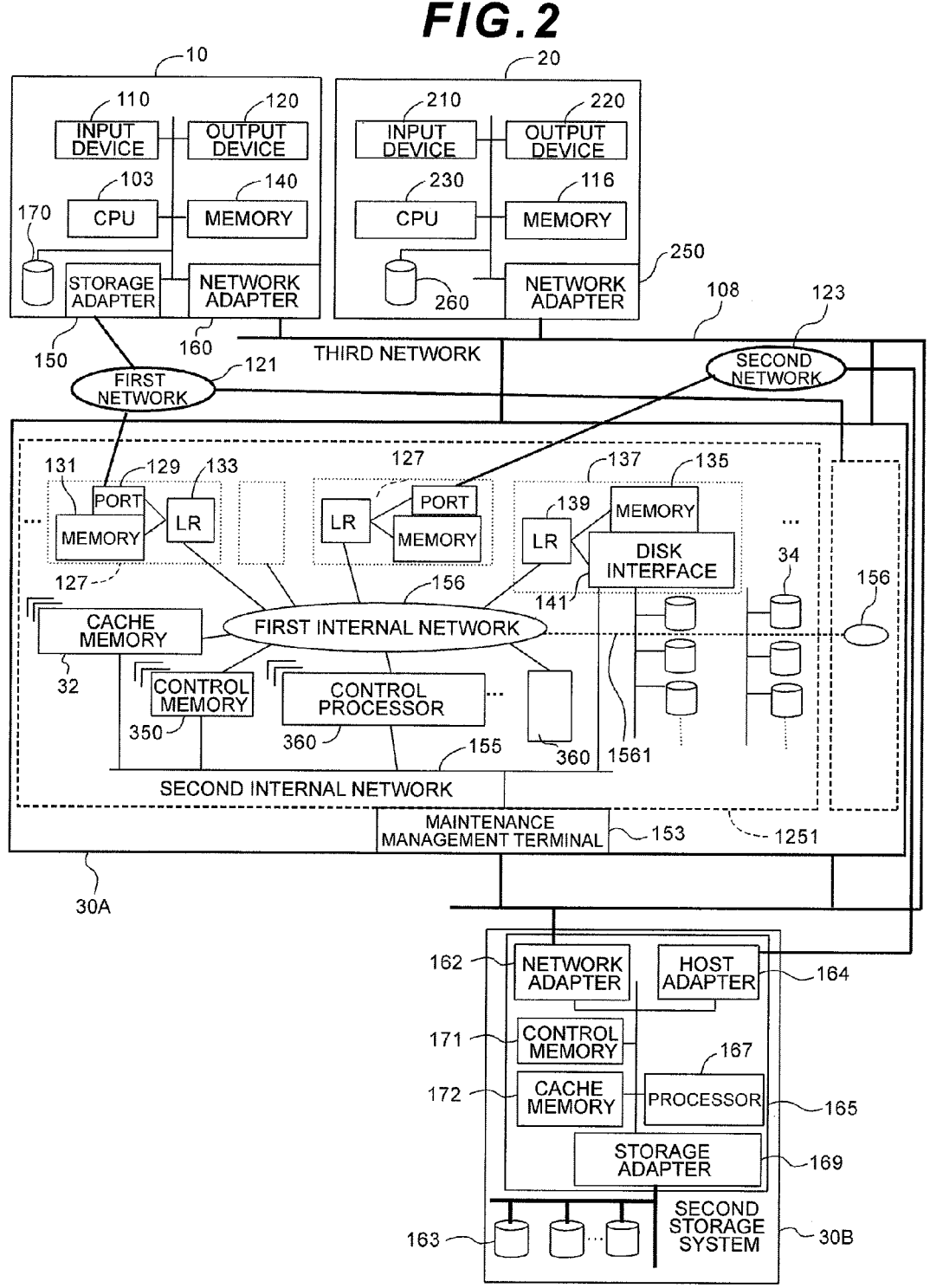
FIG. 2 is a hardware block diagram showing a second mode of the computer system.

FIG. 2 is a hardware block diagram showing a second mode of the computer system. The computer system of this embodiment comprises one or more host computers 10, a management server 20, a first storage apparatus 30A, and a second storage apparatus 30B.

The first storage apparatus 30A is connected to the host computer 10 via a first network 121. The second storage apparatus 30B is connected to the first storage apparatus 30A via a second network 123.

The one or more host computers 10, the management server 20, the first storage apparatus 30A, and the second storage apparatus 30B are connected to each other via a third network 108.

The first network 121, the second network 123, and the third network 108 may be any types of networks. For example, the first network 121 and the second network 123 are SAN. The third network 108 is LAN.

The first storage apparatus 30A comprises a controller and a storage device group 34. The controller comprises, for example, multiple frontend interfaces 127, multiple backend interfaces 137, a first internal network 156, one or more cache memories 32, one or more control memories 350, and one or more control processors 360.

The frontend interface 127 is an interface circuit for communicating with the host computer 10 or the second storage apparatus 30B connected to the storage apparatus 30A via the network 121. Therefore, the storage apparatus 30A comprises at least two frontend interfaces 127, one of which is connected to the first network 121, and the other which is connected to the second network 123.

The frontend interface 127 comprises, for example, a port 129 connected to the first network 121 or the second network 123, a memory 131, and a local router (hereinafter abbreviated to an "LR") 133. To the LR 133, the port 129 and the memory 131 are connected.

The LR 133 sorts data received via the port 129 for processing by an arbitrary control processor 360. As more specifically described, for example, a control processor 360 sets the LR 133 to cause the control processor 360 to perform an I/O command specifying a certain address. In accordance with the setting, the LR 133 sorts the I/O command and the data.

Similarly, multiple backend interfaces 137 are set. A backend interface 137 is an interface circuit for communicating with the PDEVs 34. The backend interface 137 comprises, for example, a disk interface 141 connected to the PDEVs 34, a memory 135, and an LR 139. To the LR 139, the disk interface 141 and the memory 135 are connected.

The first internal network 156 is configured of, for example, a switch (e.g. a crossbar switch) or a bus. To the first internal network 156, multiple frontend interfaces 127, multiple backend interfaces 137, one or more cache memories 32, one or more control memories 350, and one or more control processors 143 are connected. The communication among these components is performed via the first internal network 156.

To the frontend interfaces 127, the backend interfaces 137, the cache memory 32, the control memory 350, and the control processor 360 which are the components of the controller, a second internal network (e.g. LAN) 155 is connected and, to the second internal network 155, a maintenance management terminal 153 is connected.

The maintenance management terminal 153 is also connected to the third network 108 and is a computer which maintains or manages the storage system 125. The maintenance personnel of the storage apparatus 30A, for example, by operating the maintenance management terminal 153 (or the management device 20 capable of communicating with the maintenance management terminal 153), can define various types of information stored in the control memory 350.

The second storage apparatus 30B comprises a controller 165 and PDEVs 163. The controller 165 comprises, for example, a network adapter 162, a host adapter 164, a cache memory 172, a control memory 171, a processor 167, and a storage adapter 169.

The network adapter 162 is an interface which is connected to the third network 108 and communicates with the management server 111. The host adapter 164 is an interface which is connected to the second network 123 and communicates with the first storage apparatus 30A.

The host adapter 164 may also be, for example, the same type as the frontend interface 127 of the first storage apparatus 30A.

The control memory 171 is a memory which stores various types of computer programs and information.

The cache memory 172 is a memory that temporarily stores the data which is read or written in accordance with I/O commands from the first storage apparatus 125.

The processor 167 executes the various types of computer programs stored in the control memory 171. At least, the processor 167, in accordance with the I/O commands from the first storage apparatus 30A, controls the data write and read for the cache memory 172 and the PDEVs 163.

The PDEVs 163 are physical storage devices and, for example, may also be the same as the PDEVs 34 of the first storage apparatus 30A. Otherwise, the PDEVs may also be tape storage media.

The first storage apparatus 30A of this embodiment comprises what is called an external connection function. The second storage apparatus 30B is externally connected to the first storage apparatus 30A by this function. The external connection is now described.

As described above, the first storage apparatus 30A provides one or multiple logical volumes to the host computer 10. Each logical volume is recognized as one storage device by the host computer 10. For example, logical volumes which the first storage apparatus 30A provides may also be associated with PDEVs 34 in the first storage apparatus 30A. In the foregoing case, the first storage apparatus 30A, receiving a write command to a logical volume, stores the data in the PDEV 34 which is associated with the logical volume. This type of logical volume is, in the description below, also referred to as a normal volume.

Otherwise, logical volumes which the first storage apparatus 30A provides may also be associated with PDEVs 163 in the second storage apparatus 30B. In the foregoing case, the first storage apparatus 30A, receiving a write command to a logical volume, generates a write command for writing data to the PDEV 163 which is associated with the logical volume, and sends the generated write command to the second storage apparatus 30B.

The second storage apparatus 30B, in accordance with the write command received from the first storage apparatus 30A, stores the data in the PDEV 163.

As described above, the function in which the data to be stored in the logical volumes which the first storage apparatus 30A provides is actually stored in the second storage apparatus 30B connected outside the first storage apparatus 30A is referred to as the external connection function.

The first storage apparatus 30A comprises multiple clusters 1251 which establish the storage control processing. Each cluster comprises an internal network 156, and the internal networks 156 of the multiple clusters are connected by a cross-cluster network 1561.

Therefore, the control processor 360 of one cluster can access other clusters, for example, read/write the data in the cache memories 32 of the other clusters. The network 1561 among the multiple clusters is configured of a path or a switch.

Figure 3:
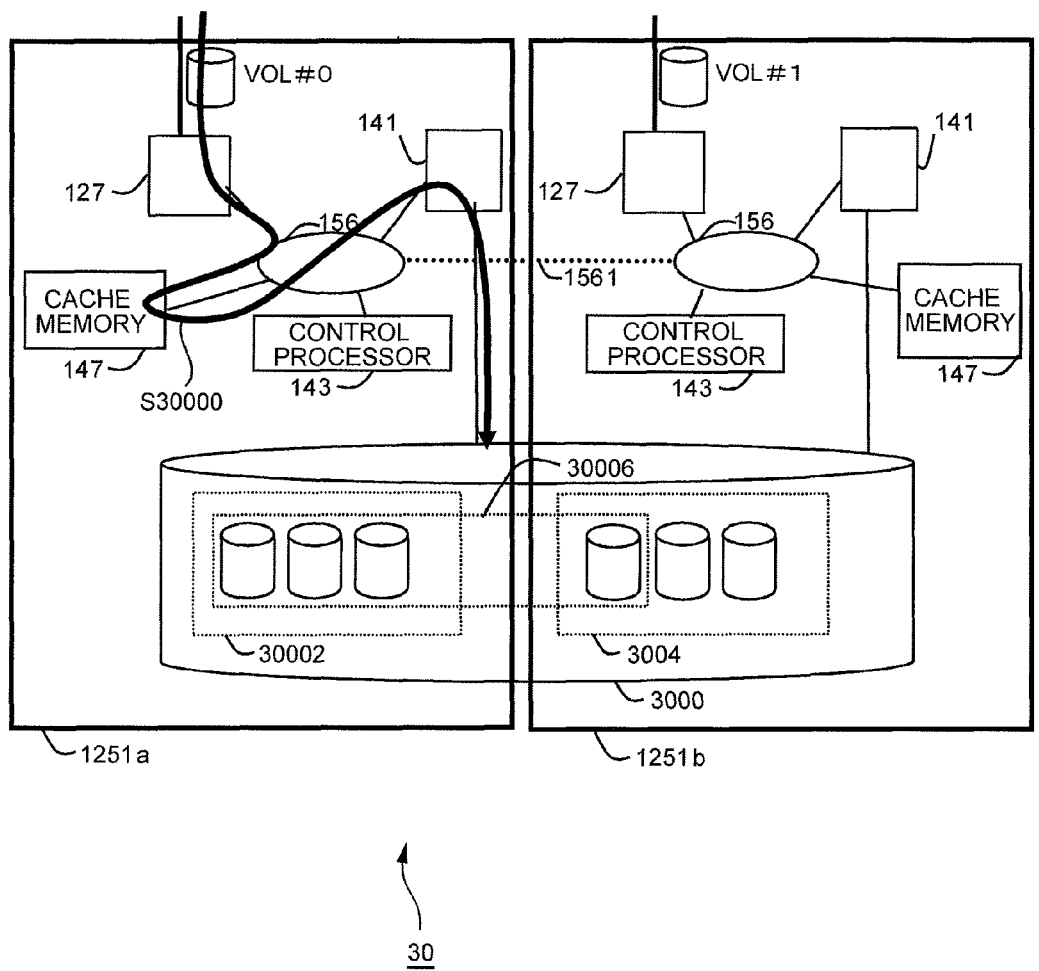
FIG. 3 is a hardware block diagram showing an example in which the storage apparatus shown in FIG. 2 is configured of multiple clusters.

FIG. 3 is a hardware block diagram describing the configuration in which the storage apparatus shown in FIG. 2 comprises multiple clusters. A first cluster 1251a controls the access processing for a first virtual volume (VOL #0), and a second cluster 1251b controls the access processing for a second virtual volume (VOL #1).

The pool 30000 shown in FIG. 3 may also be created across multiple clusters. However, depending on the device configuration of the network 1561, it is possible that routing through the relevant network 1561 slows down the transfer rate and deteriorates the performance. Therefore, for the prevention of the same, the system, in assigning pool volumes to the virtual volume (VOL #0), selects the pool volumes not routed through the network 1561.

Therefore, the storage apparatus 30 manages the pool in units of modules. The pool volume groups #0 (30002), #1 (30004), and #2 (30006) are examples of such management.

The storage apparatus 30, in assigning pages to the virtual volume #0 which is set in the cluster 1251a, selects the pool volumes of the pool group #0 (S30002) (S30000).

The storage apparatus 30 manages the capacity of the pool group in units of multiple Tiers. As described later, the same applies to the management of the system capacity pool. If the case where the pool group #0 (30002) runs out or may run out of capacity is assumed, the storage apparatus 30 adds pool volumes of the pool group #1 (30004) which is rich in capacity to the pool group #0 (30002). At this point, as the case where the ratio of the free capacity to the total pool capacity is smaller than the previously set value, the fact that the ratio of the free capacity is large indicates that [the pool group is] rich in capacity.

As the pool group #2 (30006), the setting across pool modules is also possible.

Figure 4:
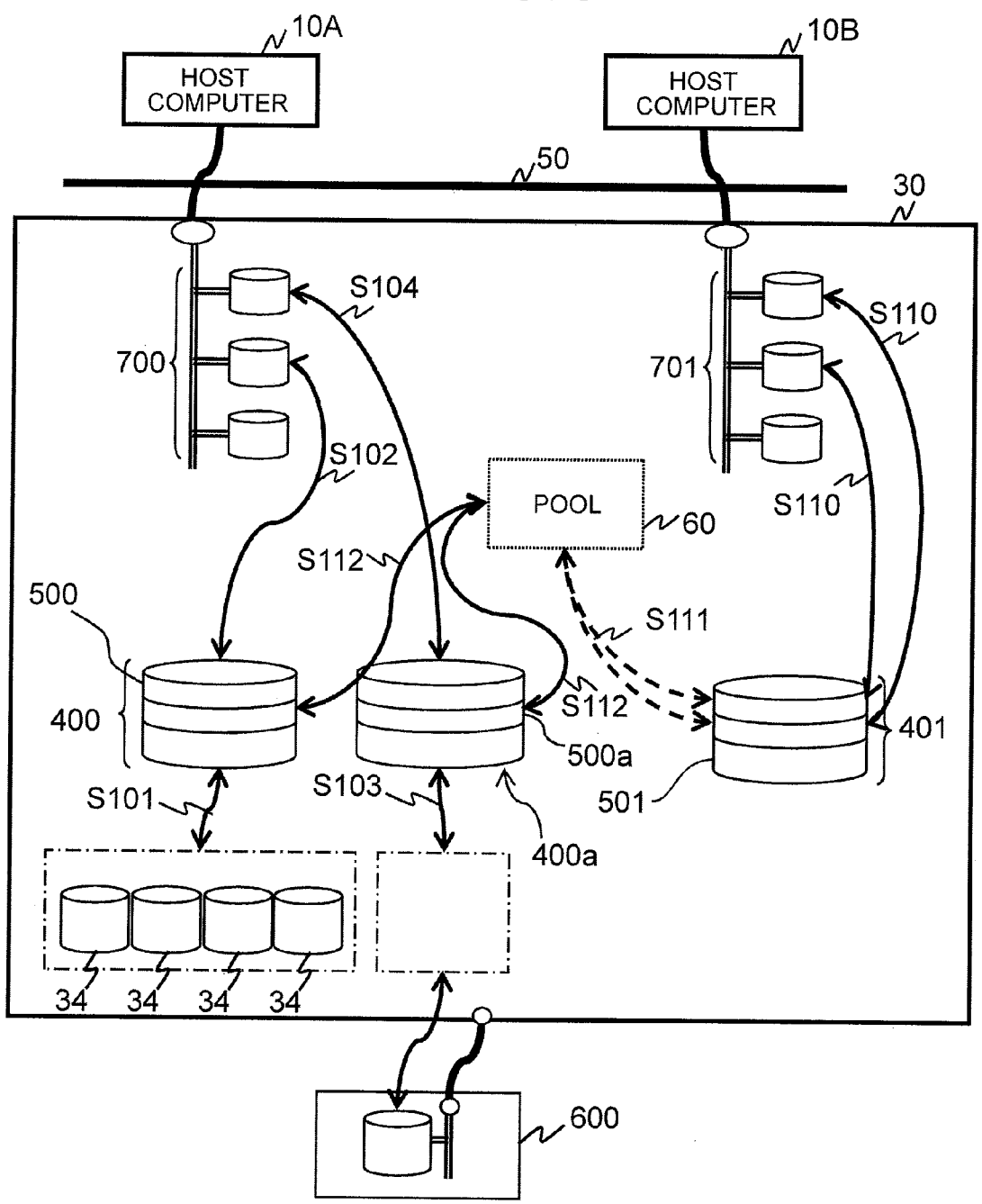
FIG. 4 is a function block diagram showing the operation of the dynamic assignment of the storage area performed by the storage apparatus.

FIG. 4 is a function block diagram showing the operation of the dynamic assignment of the storage area performed by the storage apparatus 30. A RAID group is configured of PDEVs 34 by the RAID configuration. A VDEV 400 is configured of this RAID group (S101).

The VDEV 400 is divided into multiple logical devices (LDEVs) 500 which are storage areas. The VDEV configured of PDEVs 34 is referred to as a "Type 1 VDEV." The LDEVs included in this Type 1 VDEV is referred to as "Type 1 LDEVs."

The host computer 10A accesses the logical units for the host access in the storage apparatus 30. The access target seen from the host computer 10 is referred to as a "target device." The target device 700 is set accompanied with the definition of the path from the host computer 10A to the volume including the Type 1 LDEV 500 (S102).

The storage apparatus 30 can also handle an external physical device 600 connected from outside the system just as the PDEVs 34. That is, by the RAID configuration, multiple Type 1 VDEVs 400a are configured of multiple external physical devices (EDEVs) 600 (S103). The Type 1 VDEV 400a is divided into one or more storage areas, Type 1 LDEVs 500a. By setting a path to the host computer 10 in these Type 1 LDEVs 500a, a target device 700 is set (S104).

Furthermore, the storage apparatus 30 sets a Type 2 VDEV 401. The Type 2 VDEV 401 is, unlike the Type 1 LDEV 400 configured of PDEVs 34, a virtual device which comprises an address area but does not comprise any area corresponding to the PDEVs 34.

It is possible to set a cache memory area corresponding to the Type 2 VDEV 401. In this Type 2 VDEV 401, one or more LDEVs exist. These LDEVs are referred to as Type 2 LDEVs 501.

By setting a path to the host computer 10B in these Type 2 LDEVs 501, a target device 701 is set (S110). This target device 701 is the access target of the host computer 10. The target device 701 is assigned to the Type 2 LDEVs 501. The target device and/or the Type 2 LDEVs are equivalent to the virtual volume whose capacity is virtualized in Thin Provisioning.

To the Type 2 VDEV 401 and the Type 2 LDEVs 501, no physical storage area is assigned from the PDEVs. That is, the storage capacity of the same is virtualized, and therefore different from the Type 1 VDEV 400 and the Type 1 LDEVs 500. For making this virtual area available to the host computer 10B, a pool 60 comprising an actual storage area must be associated with the Type 2 LDEVs 501. This association is described later with reference to FIG. 5A.

The pool 60 is a group into which one or multiple Type 1 LDEVs 500 are compiled by one or multiple attributes. The Type 1 LDEVs 500 are assigned to the pool 60 (S112). The Type 1 LDEVs 500 correspond to pool volumes.

The Type 1 LDEVs 500 set in the pool are assigned to the Type 2 LDEVs 501 using an address (S111). Therefore, the storage area of the target device 700 is Type 1 LDEVs 500 while the storage area of the target device 701 is Type 2 LDEVs 501.

The storage apparatus 30, if accepting the access to a Type 2 LDEV 501 via the target device 701, causes the Type 1 LDEV 500 corresponding to the Type 2 LDEV 501 to the access destination.

The write data from the host computers 10A and 10B is stored in the Type 1 LDEVs 500. The Type 1 VDEV 400 and the Type 2 VDEV 401 correspond to each other based on the address. Therefore, the write data from the hosts is stored in the PDEVs 34.

Figure 5A:
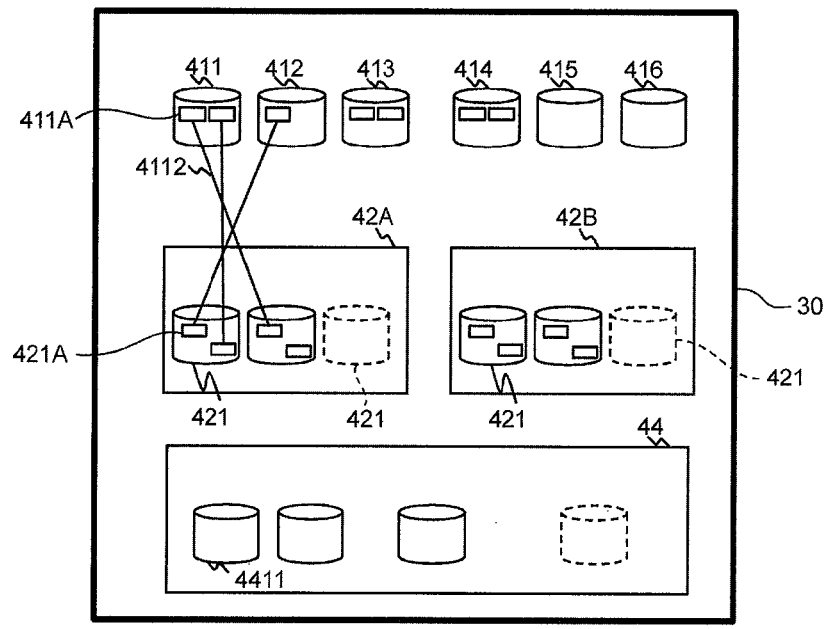
FIG. 5A is a block diagram of the storage apparatus including the correspondence relationship between the virtual volumes and the pool volumes.

FIG. 5A is a block diagram of the storage apparatus 30 including the correspondence relationship between the virtual volumes 411 to 416 and the pool volumes 421. The reference signs 42A and 42B respectively indicate the above-mentioned pools. In each pool, multiple pool volumes 421 exist. The reference sign 421A indicates a page of the pool volume.

A page is a unit of storage areas comprised of a specified capacity for processing read/write access from the host. Write data is stored in one or multiple pages. Otherwise, it is also possible to assign a page to the write access once, store the write data related to several write accesses in the same page and, if the subsequent write data cannot be stored in one page, assign a new page to the write access related to this write data.

The reference sign 411A indicates a virtual page of the virtual volume 411. The virtual page is, unlike the page of the pool volume 421, a unit of virtual storage areas without any actual storage area. Read/write from the host is processed in units of virtual pages of the virtual volume. If write from the host is performed for the virtual volume, the actual pages of the pool volume are assigned to the virtual pages of the virtual volume in accordance with the write access or at each time of write access.

The reference sign 4112 indicates a line for showing the correspondence relationship between the virtual page of the virtual volume and the virtual page of the pool volume. The storage apparatus 30 sets the correspondence relationship between the virtual volumes and the pool and the pool volumes and, to the virtual volumes, pages are assigned from the pool volumes of the pool on the correspondence relationship.

The characteristic of the storage apparatus 30 related to this invention is that the pool for providing the capacity to the virtual volume (FIG. 4: 60) is hierarchized. That is, the capacity providing pool comprises multiple hierarchies, for example, FIG. 5A shows two hierarchies. The pool of hierarchies on the side of the virtual volume 411 (on the frontend) is called a "capacity virtualization pool" while the pool of hierarchies on the PDEV side (on the backend) is called a "system capacity pool." The reference signs 42A and 42B respectively indicate capacity virtualization pools, and the reference sign 44 indicates the system capacity pool.

The capacity virtualization pools 42A and 42B are, as the names suggest, the pools whose capacities are virtualized. This is for ensuring that the storage apparatus 30 can increase or decrease the pool capacity in accordance with the pool status, without making the host computer 10 conscious.

Note that, in the above-mentioned conventional technologies, if the pool capacity runs out, the storage apparatus provided the display of warning in performing Thin Provisioning to the user and the administrator, and required the operation of adding pool volumes to the pool.

Meanwhile, the storage apparatus related to this invention, in accordance with the status of the capacity virtualization pool, from the system capacity pool 44, adds pool volumes 4411 to the capacity virtualization pool 42 automatically, and deletes the added pool volumes from the management of the system capacity pool 44.

The pool volumes 441 of the system capacity pool are managed so as not to belong to any capacity virtualization pools and, if added to a specific capacity virtualization pool, are changed to the characteristic of belonging to the specific capacity virtualization pool.

The storage apparatus 30 defines pool volumes in advance, and sets the same for the system capacity pool 44. The system capacity pool 44 comprises at least one pool volume 4411.

The storage apparatus 30, if the capacity virtualization pool 42 runs short of the actual capacity, without requiring the operation by the user or the administrator, adds pool volumes 4411 from the system capacity pool 44 to the capacity virtualization pool 42.

Meanwhile, if any surplus occurs in the actual capacity of the capacity virtualization pool 42, the storage apparatus 30 deletes pool volumes 421 from the capacity virtualization pool 42, and retrieves the deleted pool volumes to the system capacity pool 44.

Figure 5B:
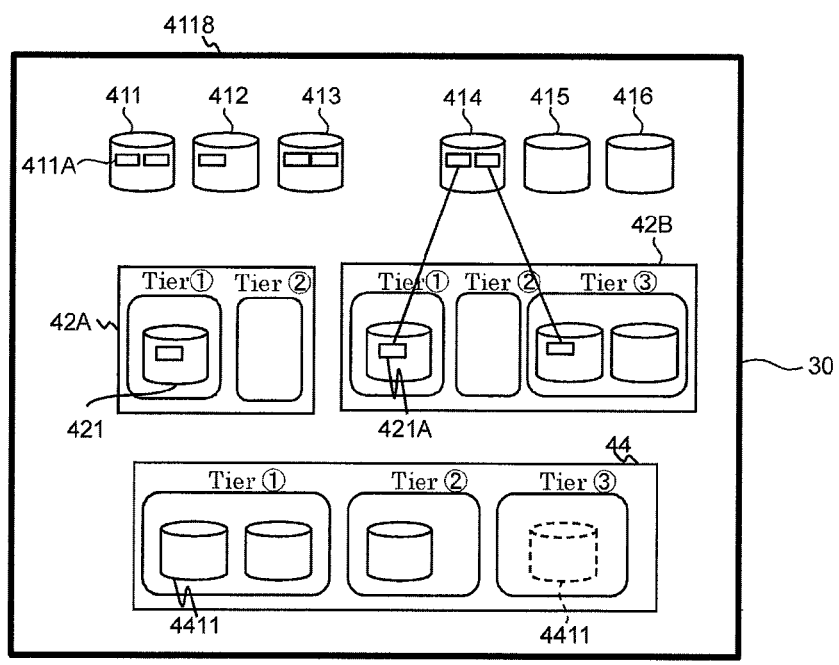
FIG. 5B is a block diagram describing that the storage apparatus manages the pool volumes mainly by classifying the same into the hierarchies complying with the characteristics of the storage devices which are the providing source of the pool volumes.

In FIG. 5A and FIG. 5B, for making it explicit that pool volumes can be added/deleted between the capacity virtualization pools 42A and 42B and the system capacity pool 44, a part of pool volumes 421 and 4411 is shown in dashed lines.

Which of the capacity virtualization pool 42 and the system capacity pool 44 the pool volumes belong to is managed by the tables.

Note that the user, by using at least one from the computer in which the administrative manager program is running (host computer 10), the management server 20, and the maintenance management terminal 153, requires the storage apparatus 30 to create a system capacity pool 44 and a capacity virtualization pool 42.

As shown in FIG. 5B, the storage apparatus 30 manages the pool volumes mainly by classifying the same into hierarchies based on the characteristics of the storage devices which are the providing sources of the pool volumes. This hierarchy classification is, for example, comprised of the Tier 1, the Tier 2, and the Tier 3, and the capacity virtualization pools 42A, 42B, and the system capacity pool 44 are also classified into groups of respective hierarchies.

The media belonging to the hierarchy as the Tier 1 are classified as online storages which are, for example, fast-response, highly reliable SSDs, SASs, and Fibre Channel HDDs.

The media belonging to the hierarchy as the Tier 2 are classified as nearline storages which are, for example, SATA hard disks and ATA hard disks.

The media belonging to the hierarchy as the Tier 3 are classified as offline storages which are, for example, low-cost, large-capacity tape devices. These are merely examples and, as described later, it is also possible to classify storage devices into hierarchies in accordance with different methods of classification from the above-mentioned classification.

The storage apparatus 30, if adding pool volumes from the system capacity pool 44 to the capacity virtualization pool 42, performs the additional pool volume installation processing among the groups of the same hierarchy. The same applies to the case where pool volumes are deleted from the capacity virtualization pool 42 and are retrieved to the system capacity pool 44.

Note that, as described later, the storage apparatus 30, among multiple capacity virtualization pools, may also perform pool volume transfer, without going through the system capacity pool. Furthermore, the storage apparatus 30 can migrate pool volumes from the higher hierarchy of the system capacity pool 44 to the lower hierarchy of the capacity virtualization pool 42.

The storage apparatus 30, for the unified management of providing pool volumes to the multiple capacity virtualization pools 42, integratedly sets the system capacity pool 44. Note that [this setting] does not prevent the existence of multiple system capacity pools 44 in the storage apparatus 30.

The storage apparatus, for flexibly performing the dynamic assignment of storage areas to multiple virtual volumes, sets multiple pools 42, at the same time, by virtualizing the storage capacity of the pools 42, enables the transfer of pool volumes to and from the system capacity pool 44, ensures that the access from the host computer 10 to the virtual volumes is not limited, and prepares to respond to the change of the actual free capacity of the capacity virtualization pool 42 immediately.

The first function of the various types of functions of the storage apparatus 30 is to assign pages of pool volumes in the capacity virtualization pool 42 to virtual volumes. The second function of the same is to add pool volumes from the system capacity pool 44 to the capacity virtualization pool 42 and to retrieve pool volumes from the capacity virtualization pool 42 to the system capacity pool 44.

As for the second function, in accordance with the unused capacity of the actual capacity of the capacity virtualization pool, pool volumes are added and retrieved. As for the first function, regardless of the level of unused capacity of the capacity virtualization pool, the assignment of pages of pool volumes to virtual volumes is constantly continued. Note that the notation of the first function and the second function is merely for convenience. These functions are achieved by the management and control programs described later.

As FIG. 5B, in the mode where the storage apparatus hierarchizes and manages the capacity virtualization pools 42A and 42B, pool volumes must also be managed in units of hierarchies in the system capacity pool 44. In the mode where the capacity virtualization pool is not hierarchized, the hierarchization of the system capacity pool is not mandatory.

The hierarchies of the capacity virtualization pool may also be set before or after starting Thin Provisioning. To the virtual volumes, the pool volumes of a specific hierarchy are associated, and furthermore the pool volumes of multiple hierarchies are not prevented from being associated.

The storage apparatus can assign storage areas of a desired hierarchy in units of pages to virtual volumes 411 and others. For example, the storage apparatus monitors the I/O frequency for virtual volumes, determines that online data or critical data is stored in the volume whose [I/O] frequency is high and, for speeding up the read access to the relevant page, assigns pages from the pool volumes belonging to the hierarchy of high-speed, high-performance media. In the mapping table of virtual volumes and pool volumes, the hierarchy information is included.

The storage apparatus 30, in assigning pages to virtual volumes, attempts to assign pages from the pool volumes of the highest hierarchy. Meanwhile, depending on the I/O load on the relevant pool volumes and the level of the remaining capacity of the pool volumes, it is also possible to assign pages from the pool volumes of the lower hierarchy.

The storage apparatus monitors the I/O load on the pages assigned to the virtual volumes for a specific period of time and, if determining that the I/O load is concentrating on a specific pool volume, performs migration of page data for the pages of the other pool volumes in the same hierarchy of the capacity virtualization pool or for the pages of the other pool volumes in a different hierarchy.

The logical storage area set for the system capacity pool 44 should be unused. For example, a volume for which a path is set, a volume in which user data is stored, and a volume which is the copy target are not appropriate as the pool volumes to be pooled in the system capacity pool.

Figure 6:
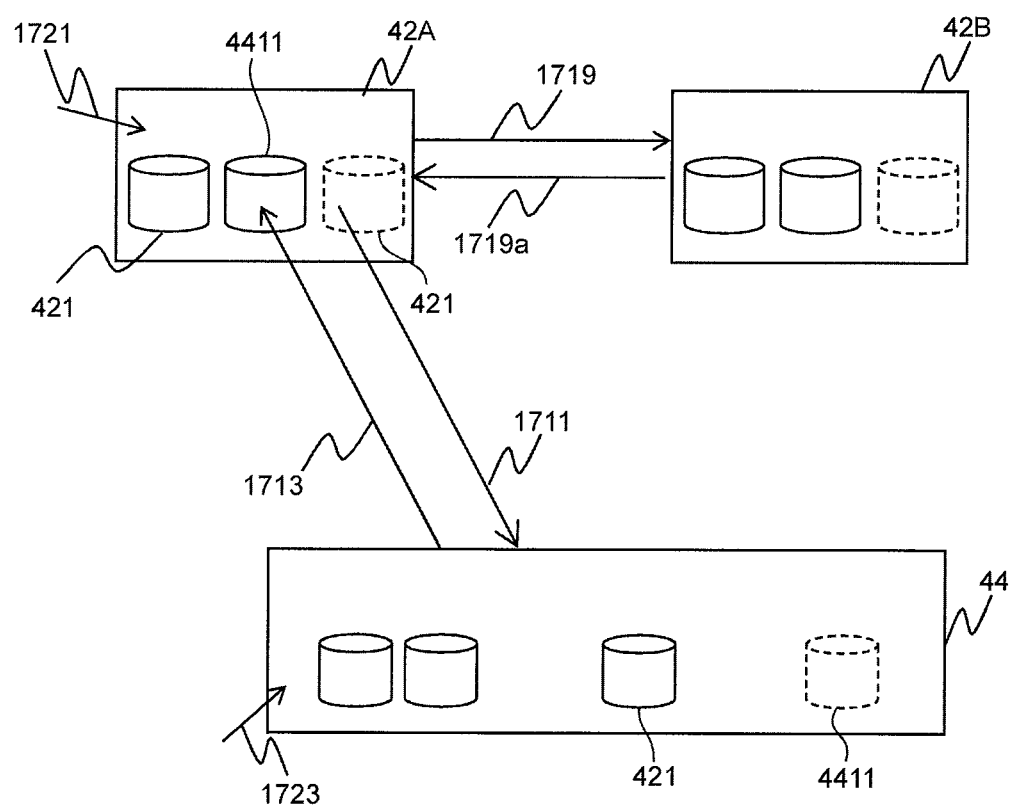
FIG. 6 is a block diagram showing the migration of the pool volumes between a capacity virtualization [pool] and a system capacity pool 44.

FIG. 6 is a block diagram showing the migration of the pool volumes between the capacity virtualization pools 42A, 42B and the system capacity pool 44. The reference sign 1723 indicates that the pool volumes are added from the Type 1 VDEVs 500, 500a to the system capacity pool 44 in accordance with the operation of the administrator.

The reference sign 1713 indicates that the pool volume 4411 is added from the system capacity pool 44 to the capacity virtualization pool 42A. The reference sign 1711 indicates that the pool volume 421 is retrieved from the capacity virtualization pool 42A to the system capacity pool.

The reference sign 1721 indicates that the pool volumes are added to the capacity virtualization pool 42A by the operation of the user or the administrator, and not from the system capacity pool 44.

The reference sign 1719 indicates that the pool volumes are migrated from the capacity virtualization pool 42A to the capacity virtualization pool 42B. The reference sign 1719a indicates the opposite to the same. This migration can be performed without going through the system capacity pool 44.

This type of pool volume migration is managed by changing the correspondence relationship between the pool volumes and the pools in the management table.

Figure 7:
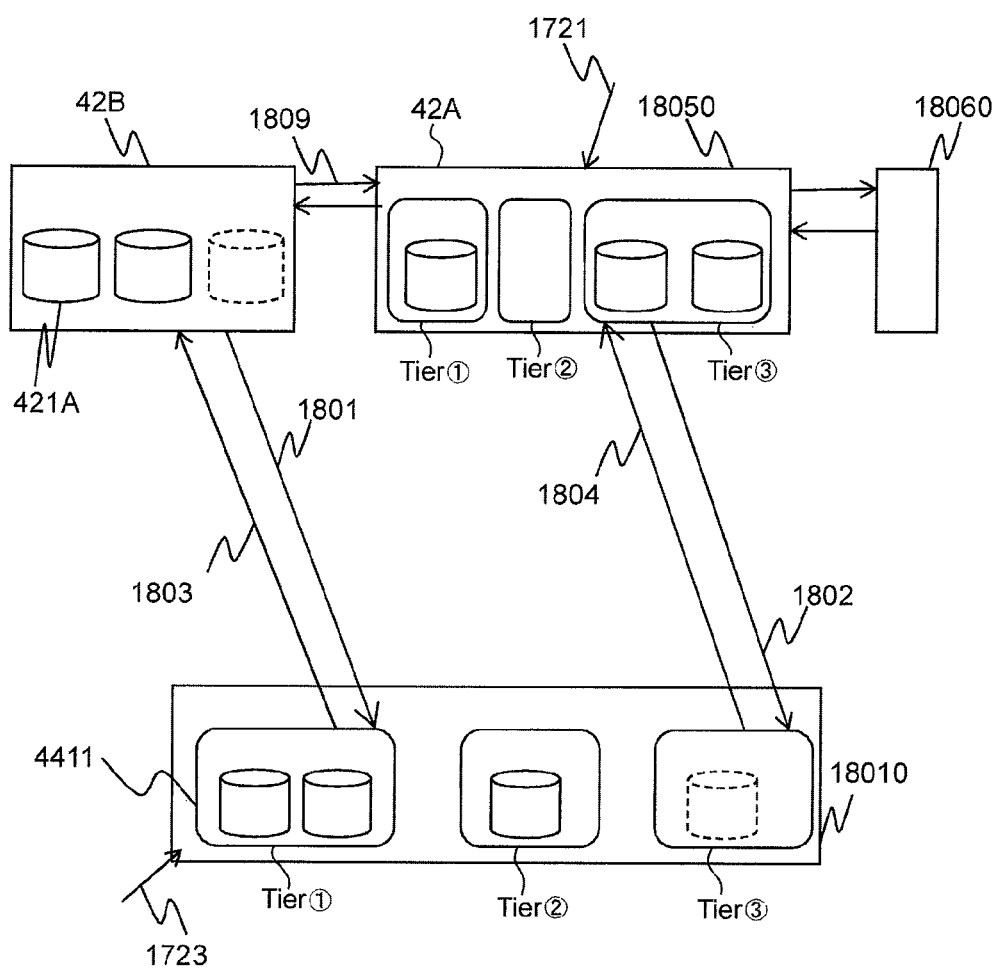
FIG. 7 is a block diagram describing the migration of the pool volumes in the mode where the capacity virtualization pool and the system capacity pool are hierarchized.

The migration of the pool volumes in the mode where the capacity virtualization pool 42A and the system capacity pool 44 are respectively hierarchized into multiple Tiers is described with reference to FIG. 7. In the capacity virtualization pool 42A, the hierarchy groups from the Tier 1 to the Tier 3 exist. The same applies to the capacity virtualization pool 42B.

The reference sign 1804 indicates that the pool volumes are added from the hierarchy as the Tier 3 of the system capacity pool 44 to the hierarchy as the Tier 3 of the capacity virtualization pool 42A. The reference sign 1802 indicates the opposite to the same.

The reference sign 1803 indicates that the pool volumes are added from the hierarchy as the Tier 1 of the system capacity pool 44 to the capacity virtualization pool 42B. The reference sign 1801 indicates the opposite to the same.

The addition of pool volumes to the capacity virtualization pool 42A (1721 in FIG. 6: performed by the operation of the user or the administrator, not from the system capacity pool 44) is performed for a specific hierarchy of the capacity virtualization pool 42A in accordance with the hierarchy which the pool volumes comprise. The addition of pool volumes to the system capacity pool is also the same as 1723 in FIG. 6.

The above-mentioned pool volume extension/reduction processing for the capacity virtualization pool is performed by the triggers described below. Firstly, the capacity monitoring function of the capacity virtualization pool acquires and analyzes the performance information of the capacity virtualization pool and, triggered by the performance deterioration occurring in the capacity virtualization pool, instructs the automatic pool volume extension/reduction function to add pool volumes from the system capacity pool to the capacity virtualization pool.

Meanwhile, the automatic pool volume extension/reduction function, triggered by the sufficient performance of the capacity virtualization pool, retrieves pool volumes from the capacity virtualization pool to the system capacity pool.

The other triggers are the trigger that the storage apparatus performs data migration among multiple types of media when receiving write from the host computer, the trigger that a timing specified by the schedule occurs, the trigger that a virtual volume is created, the trigger that pages are consumed by the copy-system processing, or the trigger that the storage apparatus receives a command from the user or the administrator utilizing the host computer, the management server, or the maintenance terminal.

Meanwhile, the triggers for the extension/reduction of the system capacity pool are the trigger that a timing specified by the schedule occurs and the trigger that the extension/reduction of the capacity virtualization pool is performed.

The performance of the capacity virtualization pool includes the level of the used actual capacity of the capacity virtualization pool, the level of the free capacity of the capacity virtualization pool, or the I/O frequency and the I/O load for the capacity virtualization pool.

One mode for determining whether the effective actual capacity of the capacity virtualization pool is appropriate or not is to use one or multiple thresholds. The effective actual capacity is the storage capacity which is unassigned to any virtual volume, that is, an empty actual capacity.

The thresholds can be set or updated when or after the capacity virtualization pool is created, by using the management server 20 and the management device 153 of the storage apparatus, by the user and the maintenance personnel. The thresholds are set or updated and registered in the capacity virtualization pool management information table by the configuration control program of the storage apparatus 30.

As for thresholds, for example, three types of thresholds exist as described below. The first threshold is the threshold related to the effective actual capacity of the capacity virtualization pool. This threshold, when the effective actual capacity of the capacity virtualization pool falls below the standard, may also be used for causing the management device 20 and the maintenance management terminal 153 to issue a warning that the capacity is scarce to the user and the maintenance personnel.

The second threshold is referred to as an "over-provisioning threshold." The storage apparatus compares the total actual capacity of the capacity virtualization pool with the total used capacity of the multiple virtual volumes which use the capacity virtualization pool as the data storage destination and, if the latter exceeds the specified ratio of the former, determines that there may be no more capacity virtualization pool in the course of the operation.

The threshold specified for the total actual capacity of the capacity virtualization pool (the total actual capacity including the used actual capacity) is an "over-provisioning threshold." It must be ensured that the actual capacity of the capacity virtualization pool×the over-provisioning threshold>the total used capacity of all the virtual volumes using the capacity virtualization pool.

For example, if the over-provisioning threshold is 90%, if the total actual capacity of the capacity virtualization pool is 1 TB, and if the total used capacity of all the virtual volumes using the pool is equal to or smaller than 1 TB×90%, the storage apparatus does not perform the capacity extension for the capacity virtualization pool and, if [the capacity] exceeds the same, performs the capacity extension processing for the capacity virtualization pool.

For the over-provisioning threshold, the user can set the priority of the automatic capacity extension processing for the capacity virtualization pool and, if the priority is set to "high," the storage apparatus, even if not satisfying the over-provisioning threshold, does not terminate Thin Provisioning, and continues Thin Provisioning while performing the automatic extension of the capacity virtualization pool.

The third threshold is a threshold related to the lower limit of the used actual capacity of the capacity virtualization pool. The case where the usage rate of the capacity virtualization pool is low indicates that the capacity virtualization pool is occupying a larger storage capacity than required. As this type of condition causes the waste of storage resources, the lower limit threshold is defined for the capacity virtualization pool and, if the usage rate, the total used capacity or others of the capacity virtualization pool falls within the lower limit value, the storage apparatus retrieves the pool volumes and the capacity from the capacity virtualization pool.

The storage apparatus, by associating the retrieved pool volumes and capacity with the system capacity pool, prepares to assign the retrieved pool volumes to the capacity virtualization pool next.

The storage apparatus, in accordance with the thresholds, performs the control of the automatic addition and automatic retrieval of pool volumes for the capacity virtualization pool.

Figure 8A:
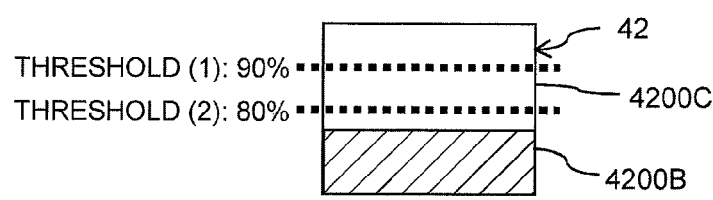
FIG. 8A is a block diagram showing that a threshold 1 (upper limit value) and a threshold 2 (lower limit value) are set for the capacity virtualization pool.

FIG. 8A indicates that the threshold 1 (upper limit value) and the threshold 2 (lower limit value) are set for the capacity virtualization pool 42. If the used actual capacity 4200B of the capacity virtualization pool 42 is equal to or larger than the upper limit threshold, the storage apparatus determines that the effective actual capacity 4200C of the capacity virtualization pool is insufficient and meanwhile, if the used actual capacity of the capacity virtualization pool is equal to or smaller than the lower limit value, determines that surplus or excess exists in the effective actual capacity of the capacity virtualization pool 42.

As an example of the threshold 1, the used actual capacity of the capacity virtualization pool to the total capacity of the capacity virtualization pool is 90% while, as an example of the threshold 2, the same is 80%.

Figure 8B:
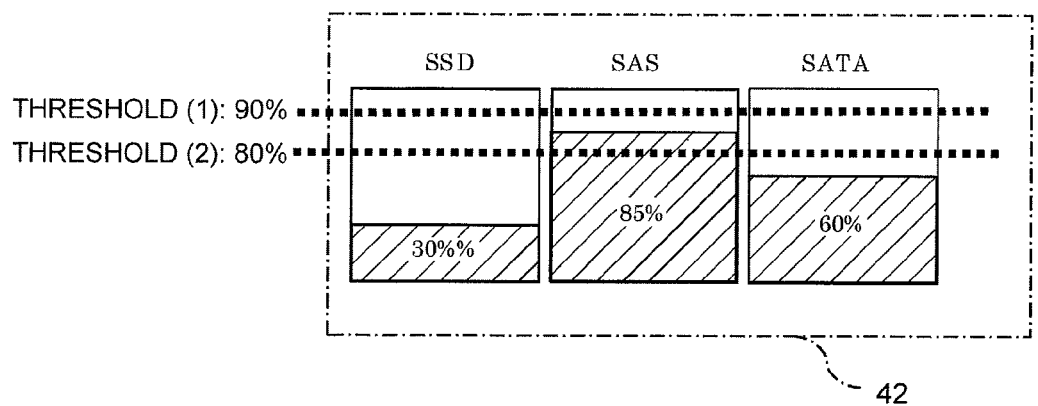
FIG. 8B is a block diagram describing that the capacity virtualization pool is hierarchized and that the storage apparatus performs the control processing based on the thresholds for each hierarchy.

As shown in FIG. 8B, if the capacity virtualization pool 42 is hierarchized, the storage apparatus performs the processing based on the thresholds for each hierarchy. In this figure, as the used actual capacities are smaller than the threshold 2 in the SSD hierarchy and the SATA hierarchy, these hierarchies are sufficient in the effective actual capacity, and the effective actual capacity of the SAS [tier] is in between the threshold 1 and the threshold 2, which is at an appropriate level.

The addition and deletion of pool volumes is performed for each hierarchy. The thresholds may also be different for each hierarchy.

If the usage rate of the capacity virtualization pool falls under the lower limit threshold, the storage apparatus or the management device checks whether the QoSLANE (Quality of Service) is set by the user exists or not and, if the setting exists, satisfying the condition, returns the pool volumes to the system capacity pool.

If the QoSLANE is not set and the system capacity pool is managed in units of hierarchies, the storage apparatus retrieves the pool volumes from the capacity virtualization pool to the system capacity pool to make the hierarchy the same as the hierarchy to which the pool volumes belong.

If the system capacity pool is not managed in units of hierarchies, the storage apparatus retrieves the pool volumes to an arbitrary hierarchy of the system capacity pool.

Note that, in returning the pool volumes from the capacity virtualization pool to the system capacity pool, [the storage apparatus] migrates the data of the assigned pages in the pool volumes to the other pool volumes left in the capacity virtualization pool, releases the mapping of the data migration source pages to the virtual volumes, and sets the mapping of the address of the virtual volumes to the data migration destination pages.

Figure 9A:
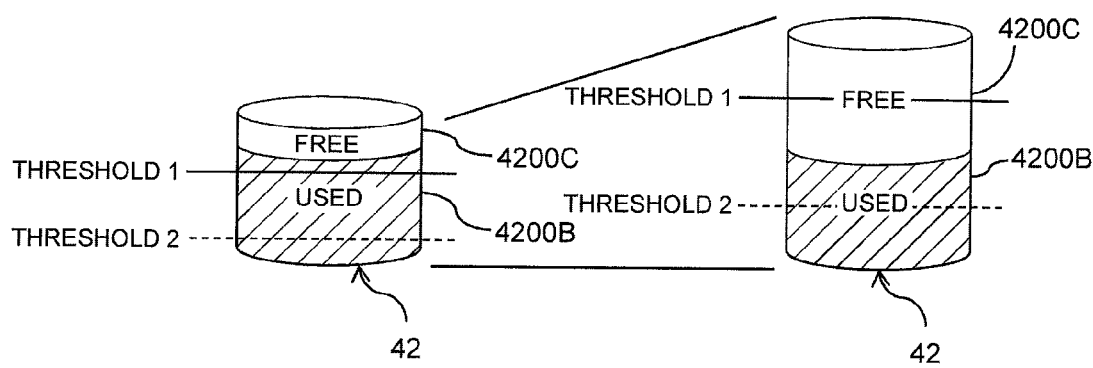
FIG. 9A is a block diagram describing the status in which the pool volumes are added to the capacity virtualization pool from the system capacity pool and the size of the effective actual capacity of the capacity virtualization pool is increased.

If the pool volumes are added from the system capacity pool 44 to the capacity virtualization pool 42, as shown in FIG. 9A, the size of the effective actual capacity 4200C of the capacity virtualization pool is increased. At this step, as in FIG. 9A, the storage apparatus may also change the values and ranges of both the threshold 1 and the threshold 2.

Figure 9B:
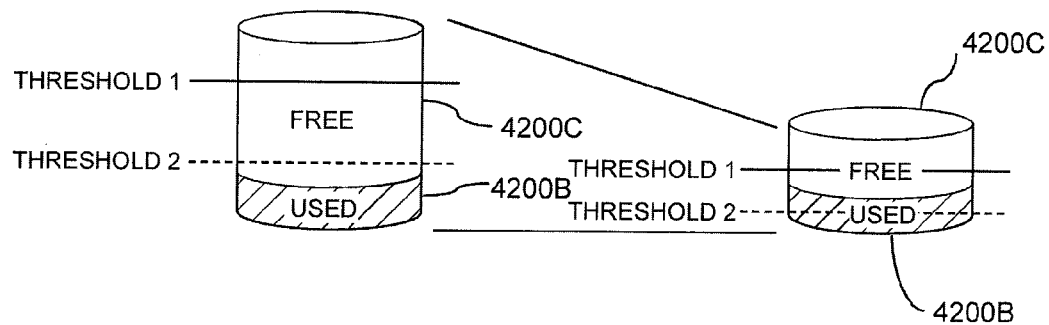
FIG. 9B is a block diagram showing the status in which the pool volumes are retrieved from the capacity virtualization pool to the system capacity pool and the effective actual capacity 42 of the capacity virtualization pool is decreased.

Meanwhile, if the pool volumes are retrieved from the capacity virtualization pool 42 to the system capacity pool, as in FIG. 9B, the size of the effective actual capacity 4200C is decreased. At this step, the storage apparatus may also change the values and ranges of both the threshold 1 and the threshold 2.

The management server 20 or the maintenance terminal 153 can suggest a specified ratio to the capacity of the capacity virtualization pool 42 as a default threshold to the user or the administrator via the GUI. The user or others may adopt this default value or may also input another threshold on the GUI.

If the capacity virtualization pool 42 is managed as multiple hierarchies, this processing may also be performed for each hierarchy. If the thresholds which the user input for the respective hierarchies do not match the threshold which is uniformly set for the capacity virtualization pool, the GUI provides the display of warning to the user or others.

Figure 10:
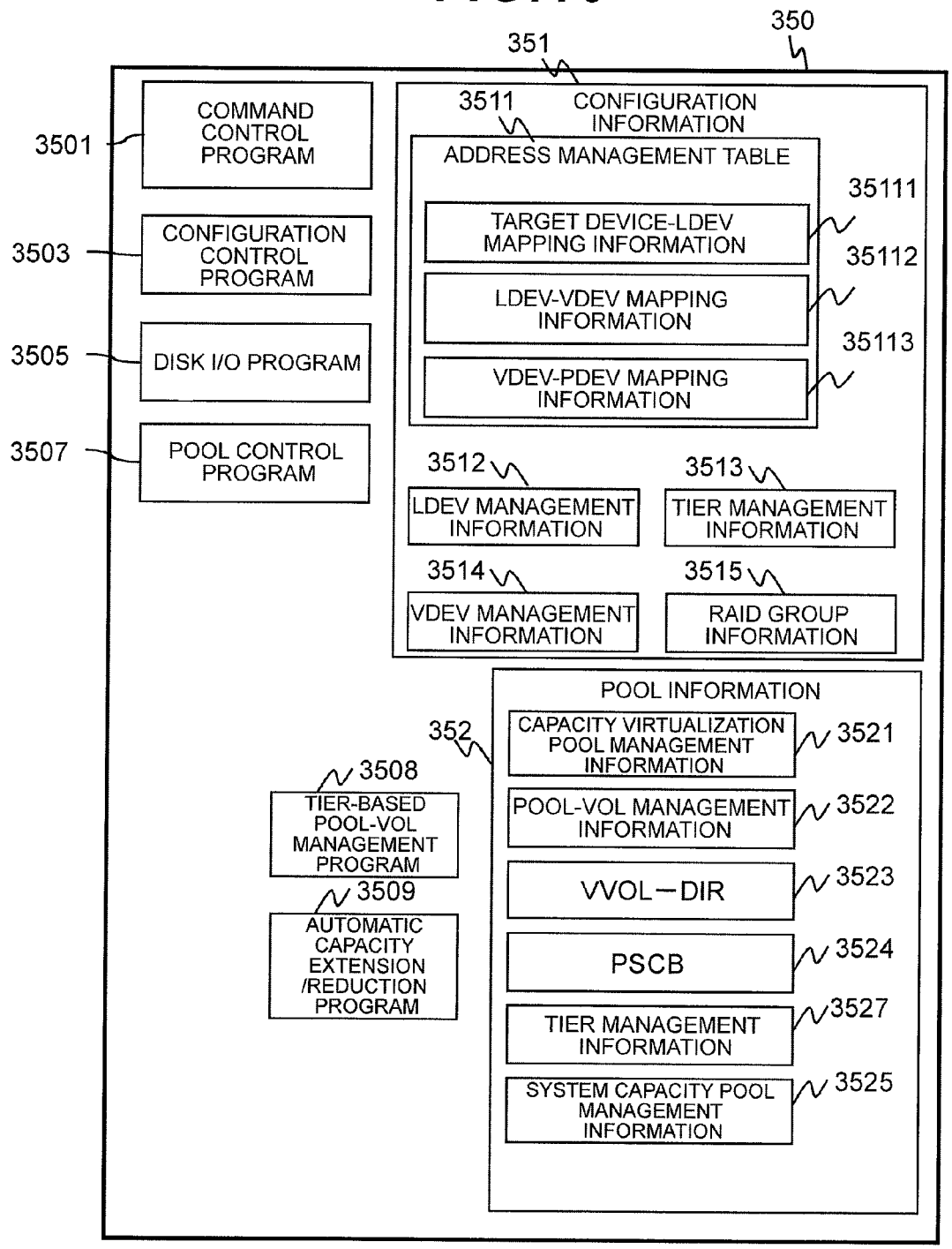
FIG. 10 is a block diagram of a memory in the storage apparatus.

Next, assuming this type of configuration of the pool, the details of the computer system are described. FIG. 10 is a block diagram of a memory 350 in the storage apparatus.

In the memory 350, various types of programs which are read and performed by the processor 360, the configuration information 351 related to the setting of the logical volumes, and the pool information 352 related to the setting of the pools are stored. Hereinafter, as for the simple notation of a pool, the pool should cover both a capacity virtualization pool and a system capacity pool.

A command control program 3501 interprets commands from the host computer 10 or the management device 20, and performs the processing specified by the commands. A configuration control program 3503 realizes the processing such as setting and updating the configuration of the storage apparatus 30.

A disk I/O program 3505 controls the access to PDEVs 34. A pool control program 3507 performs various types of processing related to the setting of the pools.

The configuration information 351 is the information which is necessary for the environment setting of the storage apparatus such as VDEVs, LDEVs, hierarchies, RAID groups and others. The configuration information 351 comprises an address management table 3511, LDEV management information 3512, VDEV management information 3514, Tier management information 3513, and RAID group management information 3515.

The address management table 3511 stores target device-LDEV mapping information 35111, LDEV-VDEV mapping information 35112, and VDEV-PDEV mapping information 35113. The details of the address management table 3511 are described later.

The LDEV management information 3512 includes the management information related to the LDEVs. The VDEV management information 3514 comprises the management information related to the VDEVs. The Tier management information 3513 includes the management information of the hierarchies defined for the capacity virtualization pools and the system capacity pools.

Furthermore, the RAID group information 3515 comprises the RAID management information such as the RAID level of the RAID group configured of multiple PDEVs 34.

The pool information 352 stores the setting related to the pools. The pool information 352 includes capacity virtualization pool management information 3521, pool volume management information 3522, VVOL (virtual volume)-DIR 3523, PSCB 3524, capacity virtualization pool Tier management information 3527, and system capacity pool management information 3525.

The capacity virtualization pool management information 3521 is the management information related to the setting of the capacity virtualization pool. The pool volume management information 3522 is the management information related to the pool volumes in the capacity virtualization pool 42 and the system capacity pool 44.

The VVOL-DIR 3523 is the information related to the assignment of LDEVs (pool volumes) in the capacity virtualization pool to the virtual volumes. The information of the PSCB 3524 is the information of the addresses of the LDEVs in the capacity virtualization pool.

The hierarchy management information 3257 is the management information of the hierarchies set for the capacity virtualization pool. This is set for each pool. The system capacity pool management information 3525 is the management information of the hierarchies set for the system capacity pool.

Furthermore, the memory 350 comprises an automatic capacity extension/reduction program 3509 which manages addition of Type 1 VDEVs 400, 400a or Type 1 LDEVs 500, 500a to the system capacity pool, additional pool volume installation and retrieval of the same between the system capacity pool and the capacity virtualization pool in accordance with the performance requirement of the capacity virtualization pool, and pool volume migration among multiple capacity virtualization pools.

Note that the above-mentioned thresholds are an example of this performance requirement. Another performance requirement is the I/O frequency.

Finally, a hierarchy-based pool volume management program 3508, if the system capacity pool and the capacity virtualization pool are hierarchized, manages the number of pool volumes and other characteristics for each hierarchy. If the pools are not hierarchized, [the program 3508] manages the number of pool volumes of the entire system capacity pool and the total number of pool volumes of each capacity virtualization pool, and other characteristics.

The processing of dynamically assigning pages from the pool volumes in the capacity virtualization pool to the virtual volumes in accordance with the access from the host device is achieved by the command control program 3501.

Note that the storage apparatus 30 equalizes page assignment to virtual volumes among the multiple pool volumes 500. This equalization processing is described in PCT/JP2009/058533. The applicant incorporates the entire statement of PCT/JP2009/058533 into this description.

Figure 11:
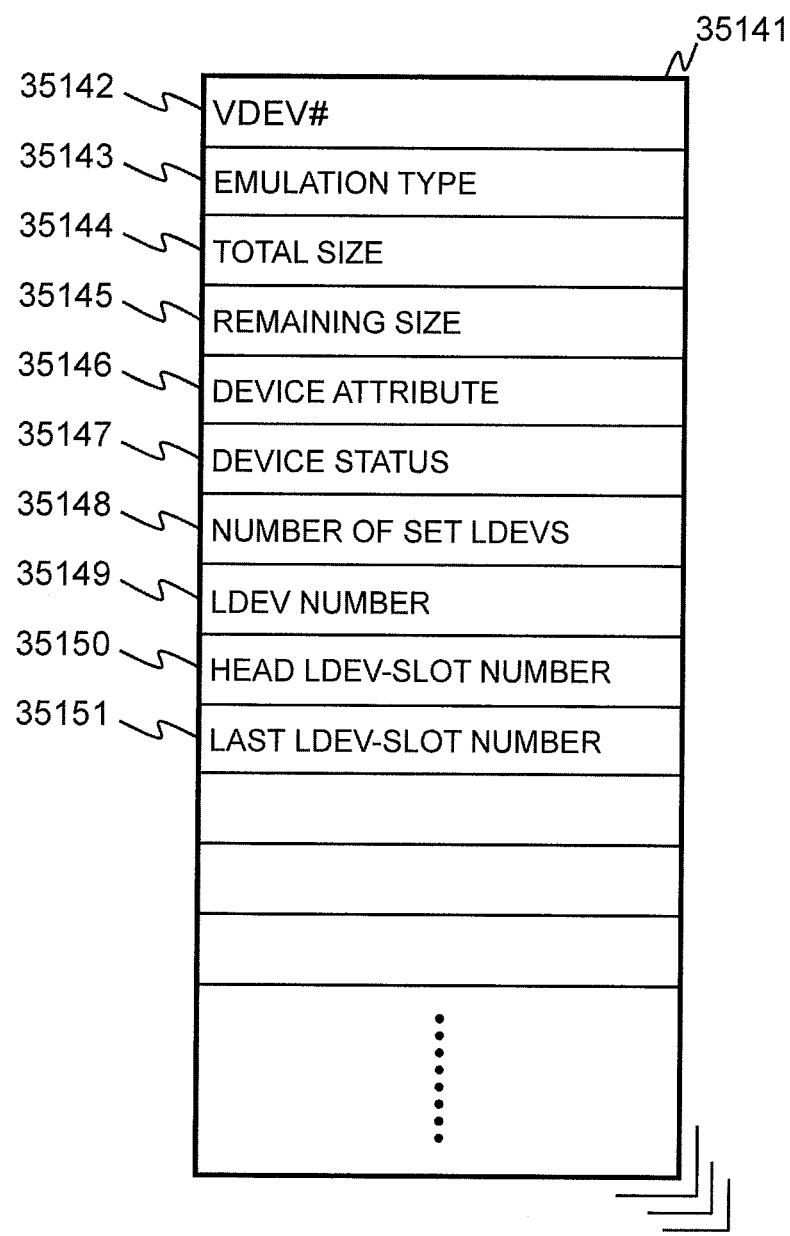
FIG. 11 is a VDEV management table.

FIG. 11 is a table of the VDEV management information 3514. The VDEV management information is configured of VDEV specific information 35141.

The VDEV specific information 35141 is configured of a VDEV number (VDEV#) 35142, an emulation type 35143, a total size 35144, a remaining size 35145, a device attribute 35146, a device status 35147, a number of set LDEVs 35148, an LDEV number 35149, a head VDEV-SLOT# 35150, and a last VDEV-SLOT# 35151.

The VDEV# 35142 is an identifier of the VDEV. The emulation type 35143 is an identifier of the VDEV's emulation type. The total size 35144 is the total size set for the VDEV. The remaining size 35145 is the size of the unused area of the VDEV.

The device attribute 35146 is an identifier of the attribute defined for the VDEV. If the VDEV is a Type 1 VDEV, an identifier indicating the Type 1 VDEV is stored while, if the VDEV is a Type 2 VDEV and set for a virtual volume, an identifier indicating the Type 2 VDEV is stored.

The device status 35147 is an identifier indicating the VDEV status. The VDEV statuses are normal, blocked, failure blocked, and others. Blocked indicates that [the VDEV is] blocked due to other reasons than the occurrence of a failure such as a puncture blockage. Failure blocked indicates that a failure occurred in one of the devices, and caused [the VDEV] to be blocked.

The number of set LDEVs 35148 is the total number of LDEVs set for the VDEV. In the LDEV number 35149, a number of the LDEV set for the VDEV is stored. The head LDEV-SLOT# 35150 is an identifier of the physical head slot number of the set LDEV.

The last LDEV-SLOT# 35151 is the physical last slot number of the set LDEV. The same number of these LDEV numbers 35149, the head LDEV-SLOT#'s 35150, and the last LDEV-SLOT#'s 35151 as the number of LDEVs are set for each LDEV number.

Figure 12:
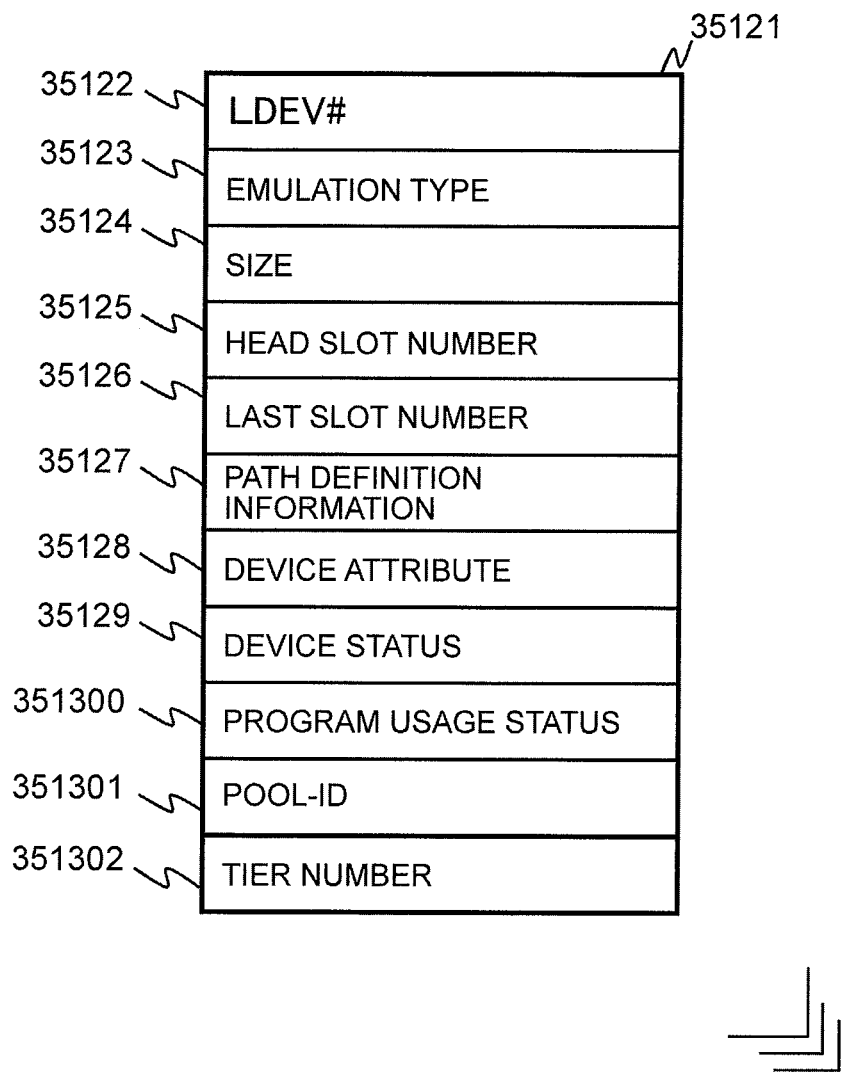
FIG. 12 is an LDEV management table.

FIG. 12 is a table of LDEV (volume) management information. The LDEV management information is configured of LDEV specific information 35121. The LDEV specific information 35121 is configured of an LDEV number (LDEV#) 35122, an emulation type 35123, a size 35124, a head slot number 35125, a last slot number 35126, path definition information 35127, a device attribute 35128, a device status 35129, a program usage status 351300, and a POOL-ID 351301.

The LDEV# 35122 is an identifier of an LDEV.

The emulation type 35123 is an identifier of the LDEV's emulation type.

The size 35124 is the total size set for the LDEV. If the LDEV is a virtual volume, the size is a virtualized size.

The head slot number 35125 is an identifier of the head slot number of the set LDEV.

The last slot number 35126 is the last slot number of the set LDEV.

The path definition information 35127 is an identifier of a path defined for the host computer 10.

The device attribute 35128 is an identifier of the attribute of the LDEV. If the LDEV is a Type 1 LDEV, an identifier indicating the Type 1 LDEV is stored while, if the LDEV is a Type 2 LDEV, an identifier indicating the Type 2 LDEV is stored. Furthermore, if the LDEV is set for the pool, an identifier indicating the pool attribute is stored.

The device status 35129 is an identifier indicating the status of the VDEV to which the LDEV belongs. The VDEV statuses are normal, blocked, failure blocked, and others. Blocked indicates that [the VDEV is] blocked due to reasons other than the occurrence of a failure such as a puncture blockage. Failure blocked indicates that a failure occurred in one of the devices, and caused [the VDEV] to be blocked.

In the program usage status 351300, if the LDEV is being processed by any of the programs, the identifier of the program is stored. In the POOL-ID 351301, if the LDEV is set for the pool, the identifier of the same is stored.

In a hierarchy number 351302, a management number of the hierarchy to which the PDEV as the providing source of the logical volume corresponds is stored. In the management accompanying hierarchization, the storage apparatus refers to this management number. If the hierarchy management number 351302 is set in the table of a virtual volume, a page is assigned to the virtual volume from the pool volume of this hierarchy.

The VDEV management table (FIG. 11) and the LDEV management table (FIG. 12) are, in accordance with the configuration control program 3503, set or updated by the operation of the user or the administrator. The same applies to the subsequent management tables.

Figure 13A:
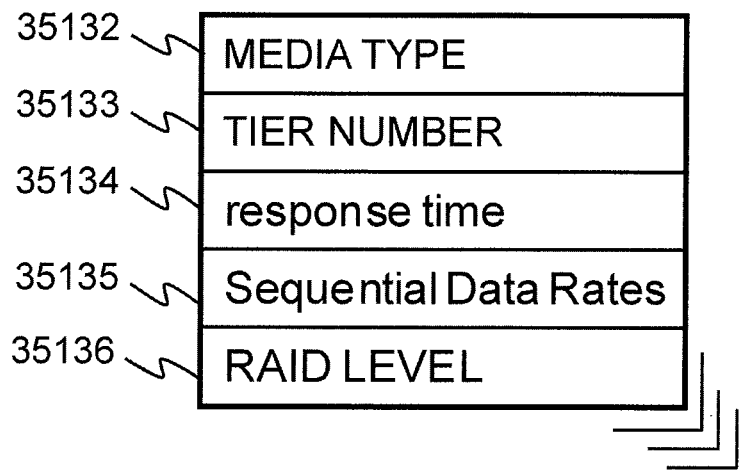
FIG. 13A is a media management information table.
Figure 13B:
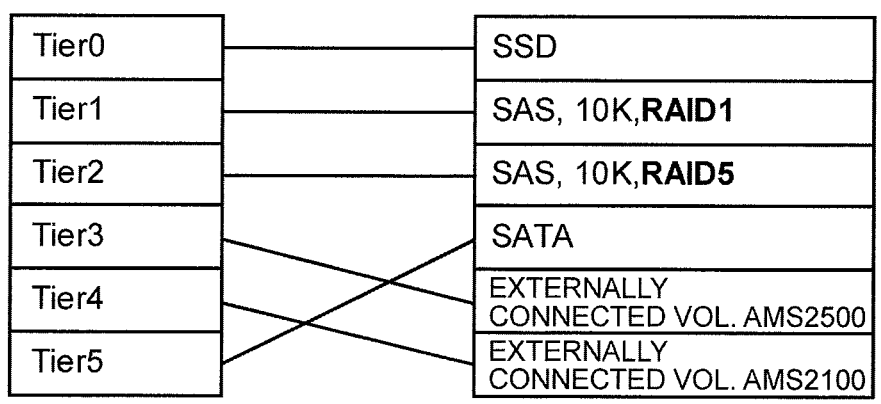
FIG. 13B is a hierarchy management information table.

The hierarchy numbers correspond to the storage devices (media). FIG. 13A is a table of media management information, and FIG. 13B is a table of hierarchy management information.

These management information [tables] are stored in the memory 350 as the concrete management information of the hierarchy management information 3513. The media management information table is created by the configuration control program 3503 if medium are additionally installed to the storage apparatus.

A media type 35132 is the type of the media. For example, the disks are SSD, FC (Fiber channel), SAS (Serial Attached SCSI), SATA (Serial ATA) and others. The storage apparatus, for classifying and managing the media types by respective hierarchy numbers 35133, registers the information configuring the hierarchies to the media management information table.

A response time 35134 indicates the response time from the media to data read/write instructions. As this [response] time is shorter, the processing performance of the media is generally higher.

A Sequential Data Rate 35135 is the data transfer ability of the media. This indicates the data amount which the media can transfer in a unit of time and, generally, as this value is larger, the data transfer ability of the media is higher.

A RAID level 35136 is the level of the RAID configuring the hierarchy, for example, RAID1, RAID5, RAID6, or others. FIG. 13A is an example of hierarchy management information, and does not exclude any other information.

The correspondence between hierarchy numbers 35133 and media types is shown in the hierarchy management information table (FIG. 13B). FIG. 13B is an example of classification for causing the media to correspond to the hierarchy numbers. This media classification is based on the media performance.

That is, in accordance with the response time 35134, the Sequential Data Rate 35135, and the RAID level which are the elements affecting the storage performance, the media and the hierarchy numbers are caused to correspond to each other. FIG. 13B shows an example where the media are classified into six types of hierarchies.

The storage apparatus can also extend the hierarchies afterwards. An example is the case where new media are added. The hierarchy classification is performed by the administrator or the user, or may also be uniquely determined by the storage system.

Note that, as another mode of media classification, the method in which, as well as the performance, the perspective of bit cost is added also exists.

The storage apparatus, for setting hierarchies in the capacity virtualization pool, the system capacity pool, and the virtual volumes, refers to the tables shown in FIG. 13A and FIG. 13B.

Hierarchies may also be classified relatively. For example, the best device existing in the computer system is set as the hierarchy 0, and the other devices are classified as lower hierarchies.

Figure 14:
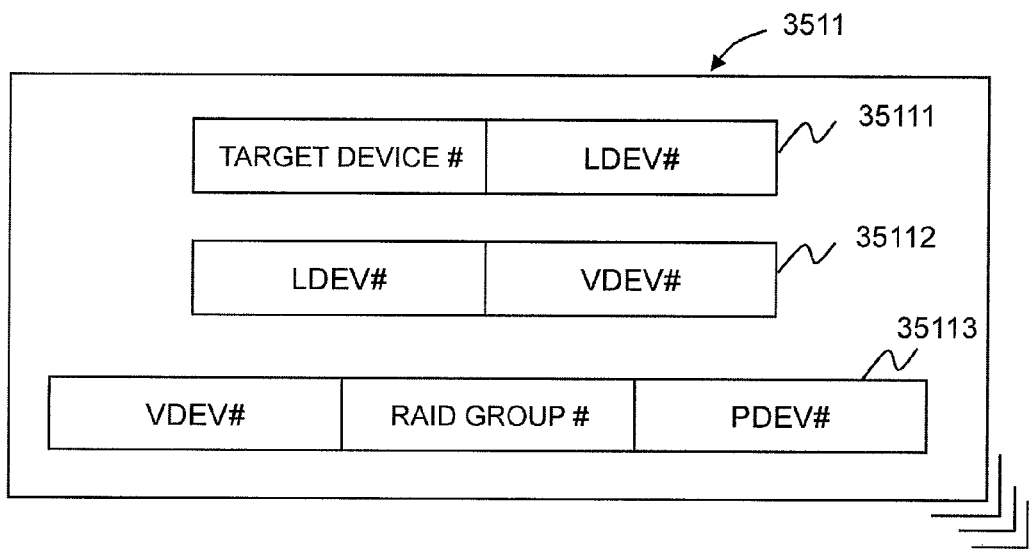
FIG. 14 is a block diagram describing an address management table.

FIG. 14 describes the address management table 3511 in detail of which the overview is described in FIG. 10.

The address management table 3511 stores the mapping information between the addresses of the target device, the LDEV, the VDEV, and the physical device.

The address management table 3511 comprises the target device-LDEV mapping information 35111, the LDEV-VDEV mapping information 35112, and the VDEV-PDEV mapping information 35113.

The target device-LDEV mapping information 35111 comprises the information of the correspondence between the target device address and the LDEV address.

The LDEV-VDEV mapping information 35112 comprises the information of the LDEV address and the VDEV address.

The VDEV-PDEV mapping information 35113 comprises the information of the VDEV address, the RAID group number (or the parity group) of the same, and the PDEV address.

The storage apparatus, by referring to this address management table, can ascertain to what addresses of what LDEV the addresses of the target devices 700 and 701 correspond. Furthermore, [the storage apparatus] can ascertain to what address of what VDEV the address of the LDEV corresponds.

Furthermore, [the storage apparatus] can ascertain to what RAID group the VDEV address belongs and to what address of what PDEV [the VDEV address] corresponds.

Figure 15:
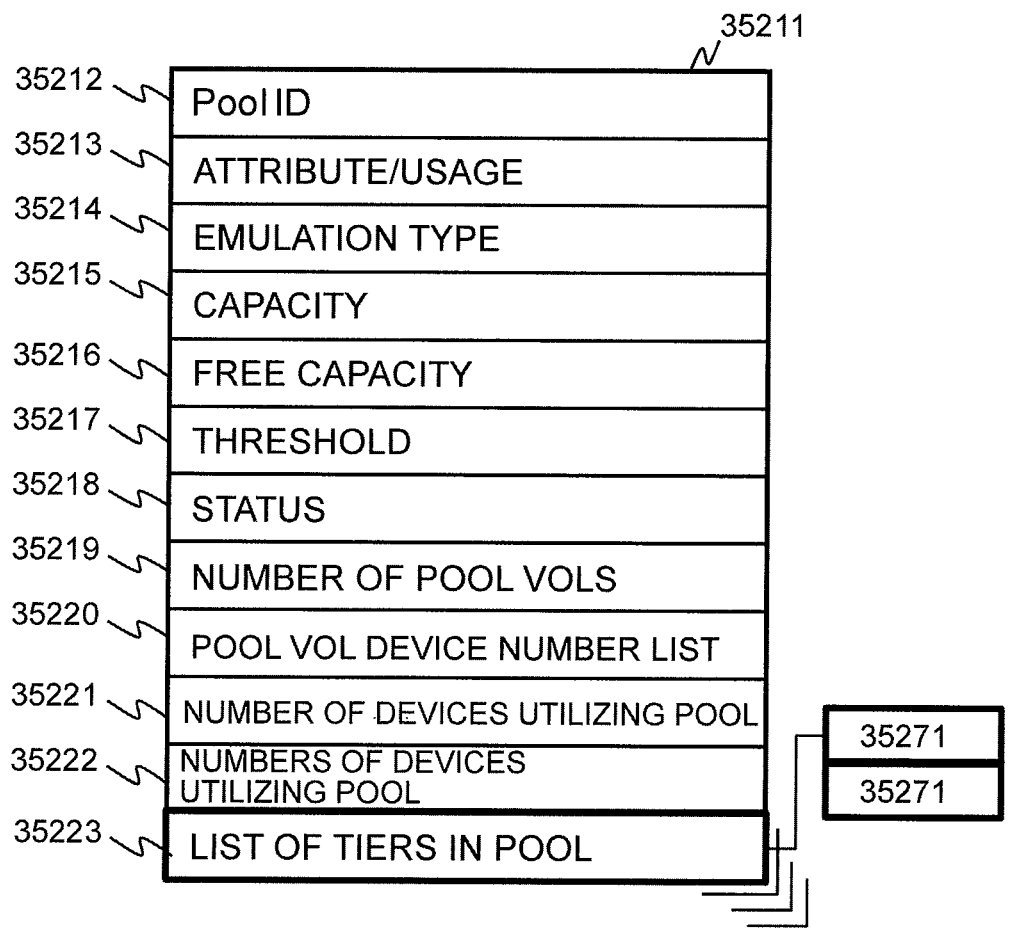
FIG. 15 is a management table of the capacity virtualization pool.

FIG. 15 is the management information table of the capacity virtualization pool.

The pool management information 3521 comprises pool specific information 35211.

The pool specific information 35211 comprises a POOL-ID 35212, an attribute/usage 35213, an emulation type 35214, a capacity 35215, a free capacity 35216, a threshold 35217, a status 35218, a number of pool volumes 35219, a pool volume device number list 35220, a number of devices utilizing the pool 35221, and numbers of devices utilizing the pool 35222.

The POOL-ID 35212 is an identifier of the pool.

The attribute/usage 35213 is an identifier indicating the attribute and usage of the capacity virtualization pool. The attribute is a form of concatenation of the PSCBs 3524 which are described later. The usage is a usage of the pool operation mode, for example, Thin Provisioning, Snapshot, remote copy, and others.

The emulation type 35214 is an identifier of the emulation type of the pool.

The capacity 35215 is an actual capacity of the capacity virtualization pool.

Note that the virtualized capacity (virtual capacity) for the host computer may also be registered in the management table in FIG. 15.

The free capacity 35216 is an unused actual capacity of the capacity virtualization pool. The total actual capacity of the capacity virtualization pool, or the used actual capacity, or one or multiple combinations of these may also be registered in the table.

The threshold 35217 is a characteristic value for performing addition of pool volumes to the capacity virtualization pool and retrieval of pool volumes from the capacity virtualization pool.

The status 35218 is a current status of the pool. For example, [the status is] being defined, being extended, enabled, and others.

The number of pool volumes 35219 is a total number of LDEVs set as the pool.

The pool volume device number list 35220 is a list of LDEV numbers set as the pool.

The number of devices utilizing the pool 35221 is a number of pool volumes belonging to the capacity virtualization pool. The numbers of devices utilizing the pool 35222 is a list of IDs of pool volumes belonging to the capacity virtualization pool.

A list of hierarchies in the pool 35223 is a list of hierarchy information lists set for the capacity virtualization pool. The hierarchy information lists 35271 are described later. The hierarchy information lists 35271 are an example of the hierarchy management information in the capacity virtualization pool 3527.

Figure 16:
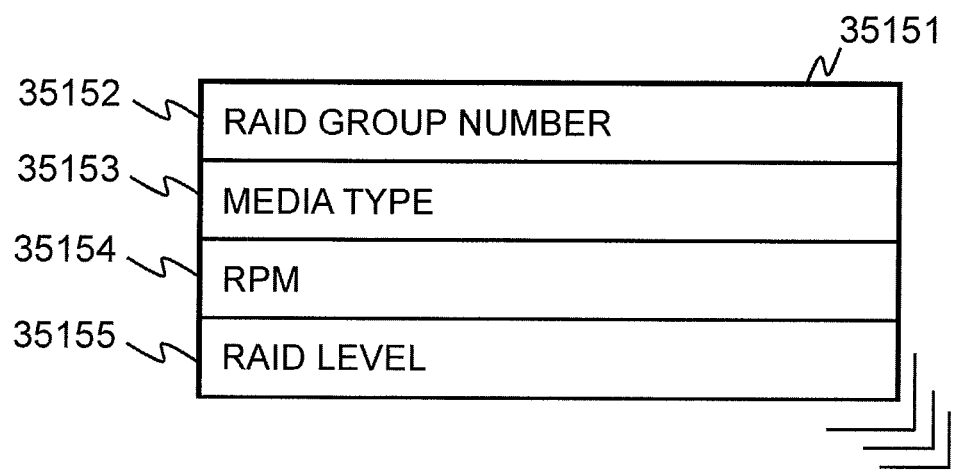
FIG. 16 is a table showing an example of RAID group information.

FIG. 16 is a table 35151 which is an example of the RAID group information 3515. This is the information for managing HDD type information configuring a RAID group number 35152.

A media type 35153 is the information indicating a media type such as SSD or SAS.

An RPM 35154 indicates the revolutions per minute of the media.

A RAID level 35155 is the information in configuring the RAID group, for example, RAID1, RAID5, and others.

Figure 17:
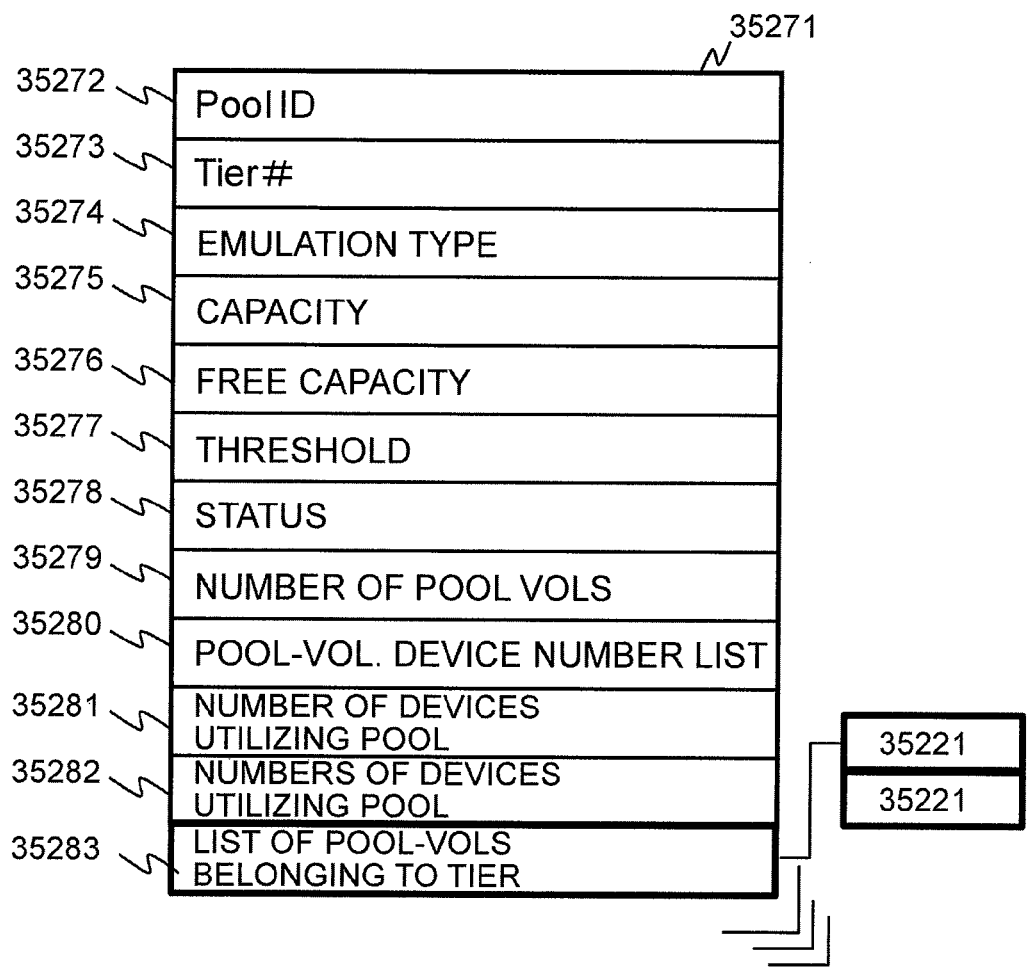
FIG. 17 is a table 35271 showing an example of hierarchy management information of the hierarchized capacity virtualization pool or the hierarchized system capacity pool.

FIG. 17 is a table 35271 which is an example of the management information 35271 for hierarchy management of the hierarchized capacity virtualization pool or the hierarchized system capacity pool. The characteristic of this table is that the hierarchy information (Tier #: 35273) is added to the capacity virtualization pool management information (FIG. 15) or the system capacity pool management information (FIG. 18) which is described later.

The information table 35271 is configured of a pool-ID 35272, a hierarchy number 35273, an emulation type 35274, a capacity 35275, a free capacity 35276, a threshold 35277, a status 35278, a number of pool volumes 35279, a pool volume device number list 35280, a number of devices utilizing the pool 35281, numbers of devices utilizing the pool 35282, and a list of pool volumes belonging to the tier 35283.

As for each of these types of information, what is different from the capacity virtualization pool management information table (FIG. 15) or the system capacity pool management information table (FIG. 18) is described.

The hierarchy number 35273 is identification information of a hierarchy set for the pool (refer to FIG. 13A and FIG. 13B). If multiple hierarchies are set in the pool, a table shown in FIG. 17 is set for each hierarchy.

The capacity 35275 is a total actual capacity of each hierarchy (Tier #: 35273).

The free capacity 35276 is the size of an unused area in the hierarchy.

The threshold 35277 can be set for each hierarchy.

The status 35278 is a current status of the hierarchy, for example, being defined, being extended, enabled, and others.

The number of pool volumes 35219, the pool volume device number list 35220, the number of devices utilizing the pool 35221, and the numbers of devices utilizing the pool 35222 are respectively as described above, and are set for each hierarchy.

In the list of pool volumes belonging to the hierarchy 35283, a list of pool volumes belonging to each hierarchy 35221 (FIG. 12) is included.

Note that, if the capacity virtualization pool is located across multiple clusters as in FIG. 3, the information for distinguishing the clusters is added to the management tables (FIG. 15, FIG. 17), and the information in the tables are managed by each cluster.

Figure 18:
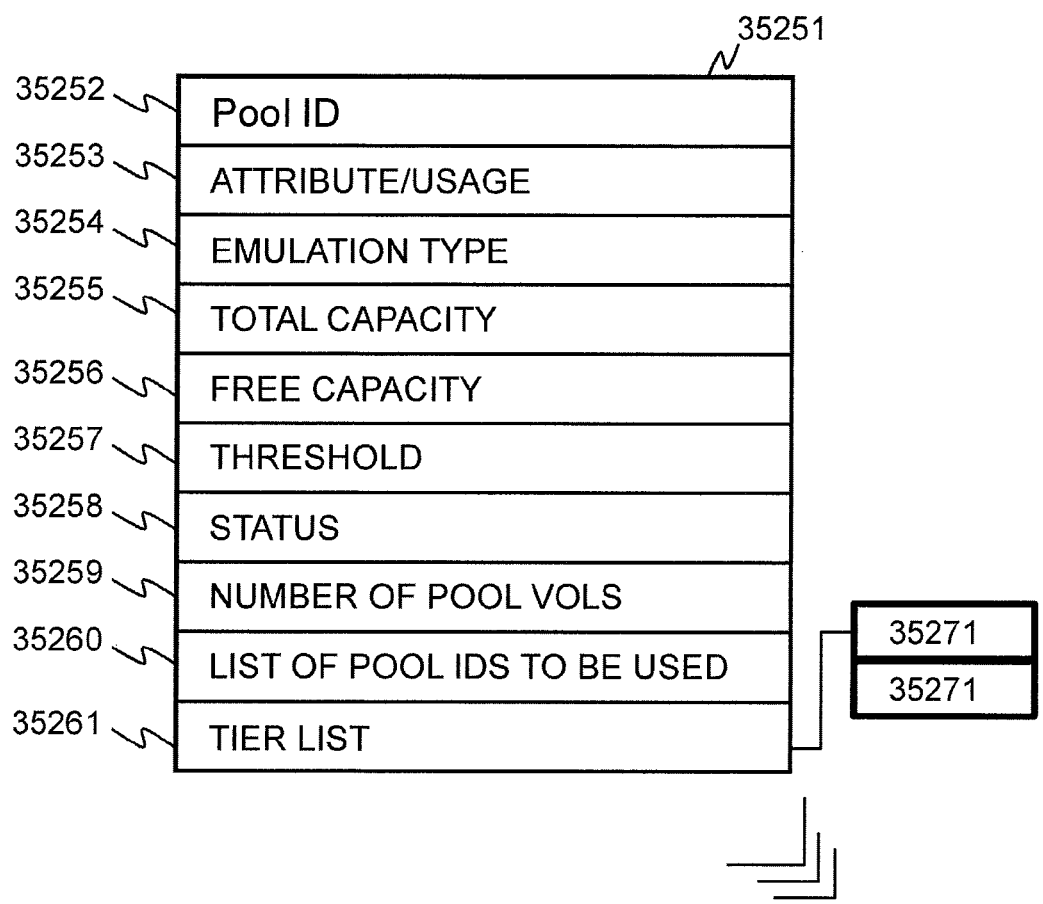
FIG. 18 is a system capacity pool management information table.

FIG. 18 is a table 35251 of the system capacity pool management information 3525. The system capacity pool management information table 35251 is configured of a pool ID 35252, an attribute/usage 35253, an emulation type 35254, a capacity 35255, a free capacity 35256, a threshold 35257, a status 35258, a number of pool volumes 35259, a list of pool IDs to be used 35260, and a hierarchy list 35261.

The pool ID 35252 is an identifier of the system capacity pool.

The attribute/usage 35253 is an identifier indicating the attribute and usage of the pool, as more specifically described, indicating that the pool is a system capacity pool.

The emulation type 35254 is an identifier of the emulation type of the system capacity pool.

The capacity 35255 is a total capacity of the system capacity pool. The total capacity is a sum of the capacities of all the pool volumes set for the system capacity pool.

The free capacity 35256 is the size of an unused area in the system capacity pool.

The threshold 35257 is a limit value for the system capacity pool and is nearly the same as what is described above. For example, if the used capacity of the system capacity pool exceeds the threshold, storage devices must be additionally installed to the storage apparatus.

The status 35258 is a current status of the system capacity pool. For example, [the status is] being defined, being extended, enabled, and others.

The number of pool volumes 35259 is a total number of LDEVs (unused pool volumes) set as the system capacity pool.

The list of pool IDs to be used 35260 is a list of IDs of capacity virtualization pools associated with the system capacity pool. Normally, all multiple capacity virtualization pools in the storage apparatus are registered.

The hierarchy list 35261 is a list of tables 35271 of hierarchies set for the system capacity pool.

Note that, in the above-mentioned tables, if no hierarchy is set, NULL is registered in the hierarchy information.

The respective tables from FIG. 15 to FIG. 18 are set and updated by the configuration control program 3503. Hierarchies can be defined even though the pool is operating.

Note that the storage apparatus may also apply the system capacity pool, as well as Thin Provisioning, to Snapshot and remote copy which is another copy function in the storage control, and use the same for securing copy destination volumes required for these copy functions.

Figure 19:
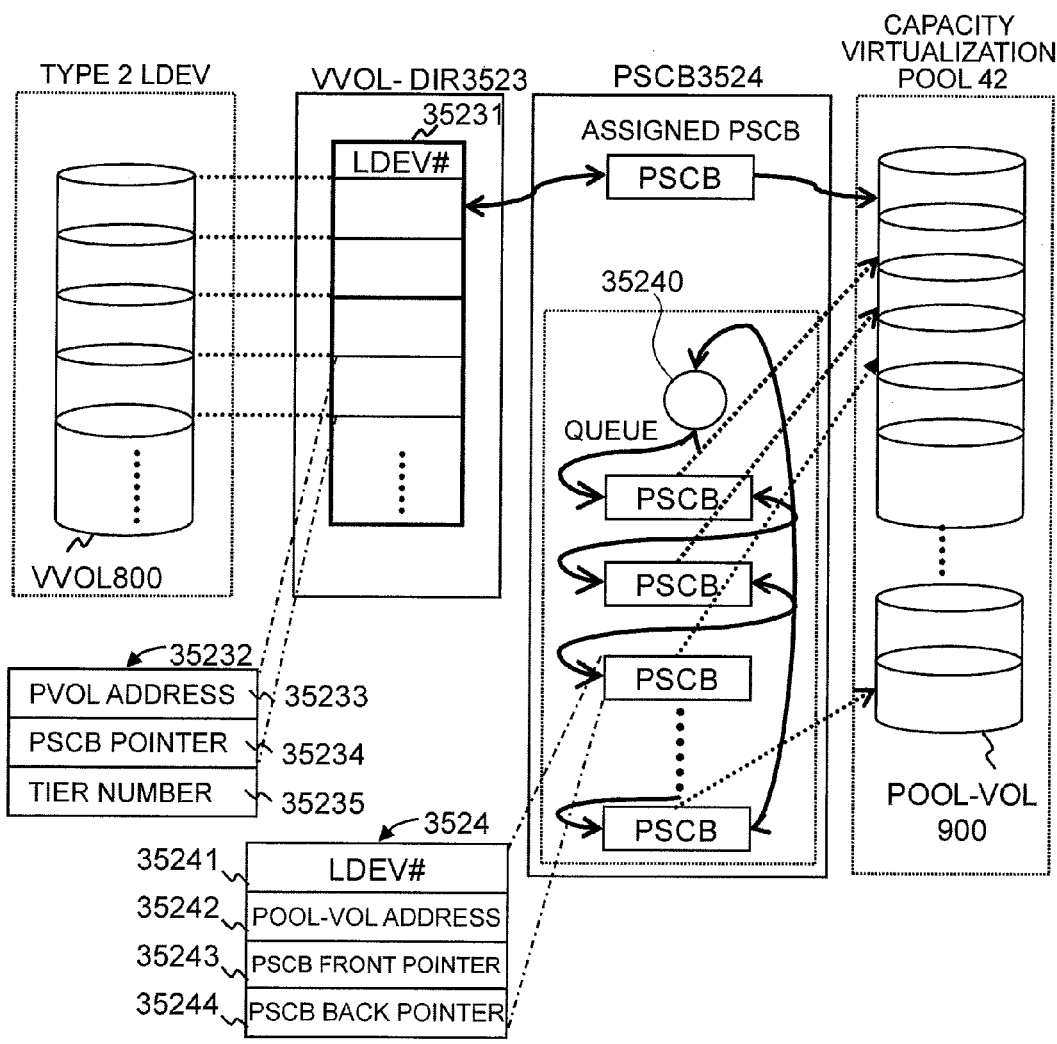
FIG. 19 is a block diagram describing VVOL-DIR and PSCBs.

FIG. 19 is a block diagram describing VVOL-DIR 3523 and PSCBs 3524.

VVOL-DIR 3523 is the configuration information of the Type 2 LDEVs for configuring a virtual area of the virtual volume.

The PSCBs (Pool Slot Control Brocks) 3524 are the configuration information of the Type 1 LDEVs set for the capacity virtualization pool 42.

As described above, the storage apparatus 30 configures a Type 1 VDEV 400 from PDEVs 34 by the RAID configuration. [The storage apparatus 30] divides this Type 1 VDEV 400 into Type 1 LDEVs 500 which are storage areas.

The Type 1 LDEVs are set for the capacity virtualization pool 42. These Type 1 LDEVs set for the capacity virtualization pool 42 are pool volumes 900.

Furthermore, the storage apparatus sets a virtual volume (VVOL) 701, and further configures a Type 2 VDEV 401. [The storage apparatus 30] divides this Type 2 VDEV into Type 2 LDEVs (VVOLs 800) as virtual storage areas of the virtual volume.

The storage apparatus assigns the Type 2 LDEVs 501 which are the virtual volumes 701 to the Type 1 LDEVs 500 which are the pool volumes. By this method, the storage area of the virtual volume which the host computer 10 accesses should correspond to the Type 1 LDEVs configured of PDEVs 34 which are physical devices.

The configuration of the virtual volume is stored in the VVOL-DIR 3523. The VVOL-DIR 3523 is configured of LDEV numbers (LDEVs #) 35231 and entries 35232.

The LDEV number (LDEV #) 35231 is an identifier of a Type 2 LDEV.

The entry 35232 is the configuration information of the Type 2 LDEV. This entry 35232 is configured of a Type 2 LDEV address 35233, a PSCB pointer 35234, and a hierarchy number 35235.

In the PSCB pointer 35234, if a Type 2 LDEV is assigned to a Type 1 LDEV of the pool volume 900, the pointer for the area of the Type 1 LDEV is stored. Note that, as the Type 2 LDEV is not assigned to any Type 1 LDEV in the initial status, "NULL" is stored in the PSCB pointer 35234.

A PSCB 3524 is the information of a Type 1 LDEV set for the capacity virtualization pool 42. This PSCB 3524 is set for each slot of the Type 1 LDEVs set for the capacity virtualization pool 42.

The PSCB 3524 is configured of an LDEV number (LDEV #) 35241, a pool volume address 35242, a PSCB front pointer 35243, and a PSCB back pointer 35244.

The LDEV number (LDEV #) 35241 is an identifier of a Type 1 LDEV in the pool volume. The pool volume address 35242 is an address of the Type 1 LDEV in the pool volume 900.

The PSCB front pointer 35243 and the PSCB back pointer 35244 are identifiers of the front and back slots of the Type 1 LDEV in the pool volume 900.

Furthermore, among the areas in the pool volume 900, as for an unused area, the head of the same is shown by a free PSCB queue 35240. The free PSCB queue 35240 includes a pointer for PSCB 3524 indicating the next slot.

The storage apparatus 30, by referring to the pointer shown by the free PSCB queue 35240, acquires the next PSCB 3524. Furthermore, by referring to the PSCB back pointer 35245 of the next PSCB 3524, [the storage apparatus 30] gradually traces the PSCBs 3524. Then, [the storage apparatus 30] acquires the PSCB 3524 corresponding to the last slot of the unused area. The PSCB back pointer 35244 of this last PSCB 3524 is a free PSCB queue 35240.

The storage apparatus traces the free PSCB queue 35240 and, by the set concatenated by the pointers of the PSCBs 3524, can ascertain the unused areas of the pool volume 900.

The storage apparatus sets PSCBs 3524 corresponding to Type 1 LDEVs set for the capacity virtualization pool 42. As more specifically described, [the storage apparatus] sets a PSCB 3524 corresponding to each slot of the Type 1 LDEVs set for the capacity virtualization pool 42, and further sets a free PSCB queue 35240. In the initial status, as the entire capacity virtualization pool 42 is unused, a set concatenated by the free PSCB queue 35240 corresponds to all the areas of the Type 1 LDEVs set for the capacity virtualization pool.

Then, the storage apparatus 30, in using an area of this capacity virtualization pool, can use the relevant area by assigning the PSCBs 3524 for the required slots to the VVOL-DIR 3523 which is the Type 2 LDEVs.

One slot or a set of multiple slots corresponds to a page. The page is identified by one or multiple PSCBs. Access from the host device to the virtual volume 800 and assignment of storage areas from the pool volume to the access areas in the virtual volume 800 is performed in units of pages.

As more specifically described, the storage apparatus refers to the free PSCB queue 35240. Then, [the storage apparatus] acquires the PSCBs 3524 for the required areas (pages) to be assigned to the Type 2 LDEVs. These acquired PSCBs 3524 are respectively assigned to the entries of the VVOL-DIR 3523. That is, in the PSCB pointer 35234 of each entry of the VVOL-DIR 3523, the pointer indicating the corresponding PSCB 3524 is stored. Note that the assigned PSCBs 3524 are removed from the concatenation of the free PSCB queue 35240.

By this method, each page (slot) of the Type 2 LDEVs is assigned to a PSCB 3424 indicated by the PSCB pointer 35234 of each entry of the VVOL-DIR 3523.

As a PSCB 3524 corresponds to the slot of a Type 1 LDEV, as a result, a Type 2 LDEV is assigned to the Type 1 LDEV, and the virtual volume which is the access target of the host computer 10 becomes available as a physical device.

In FIG. 19, as hierarchization management is not performed for the capacity virtualization pool, the hierarchy number 35235 is blank.

The command control program 3501 traces the VVOL-DIR table with reference to the address of the virtual volume which received a write request from the host computer 10, and checks whether a PSCB is assigned to the entry of the VVOL-DIR 3523 or not.

If a PSCB is assigned, the command control program 3501 overwrites the already existing PSCB with the write data.

If no PSCB is assigned, [the command control program 3501] selects a PSCB connected to the free queue, and assigns this to the entry 35232 of the VVOL-DIR 3523.

As information in units of pages, furthermore, the information acquired by validating the page status exists, for example, the information acquired as a result of regularly monitoring the access frequency of the page.

Furthermore, it may also be permitted that the information of each page in the capacity virtualization pool is added to the data stored in the pool volume and that the information by which to what address of what virtual volume the data is assigned can be searched is included.

The storage apparatus 30 may not have to manage the system capacity pool 44 in units of pages. In the processing of adding pool volumes from the system capacity pool 44 to the capacity virtualization pool 42, [the storage apparatus] adopts the management form based on PSCBs.

Note that the storage apparatus 30 may also connect the pool volumes to be added from the system capacity pool to the capacity virtualization pool to the free queue and manage the same.

Figure 20:
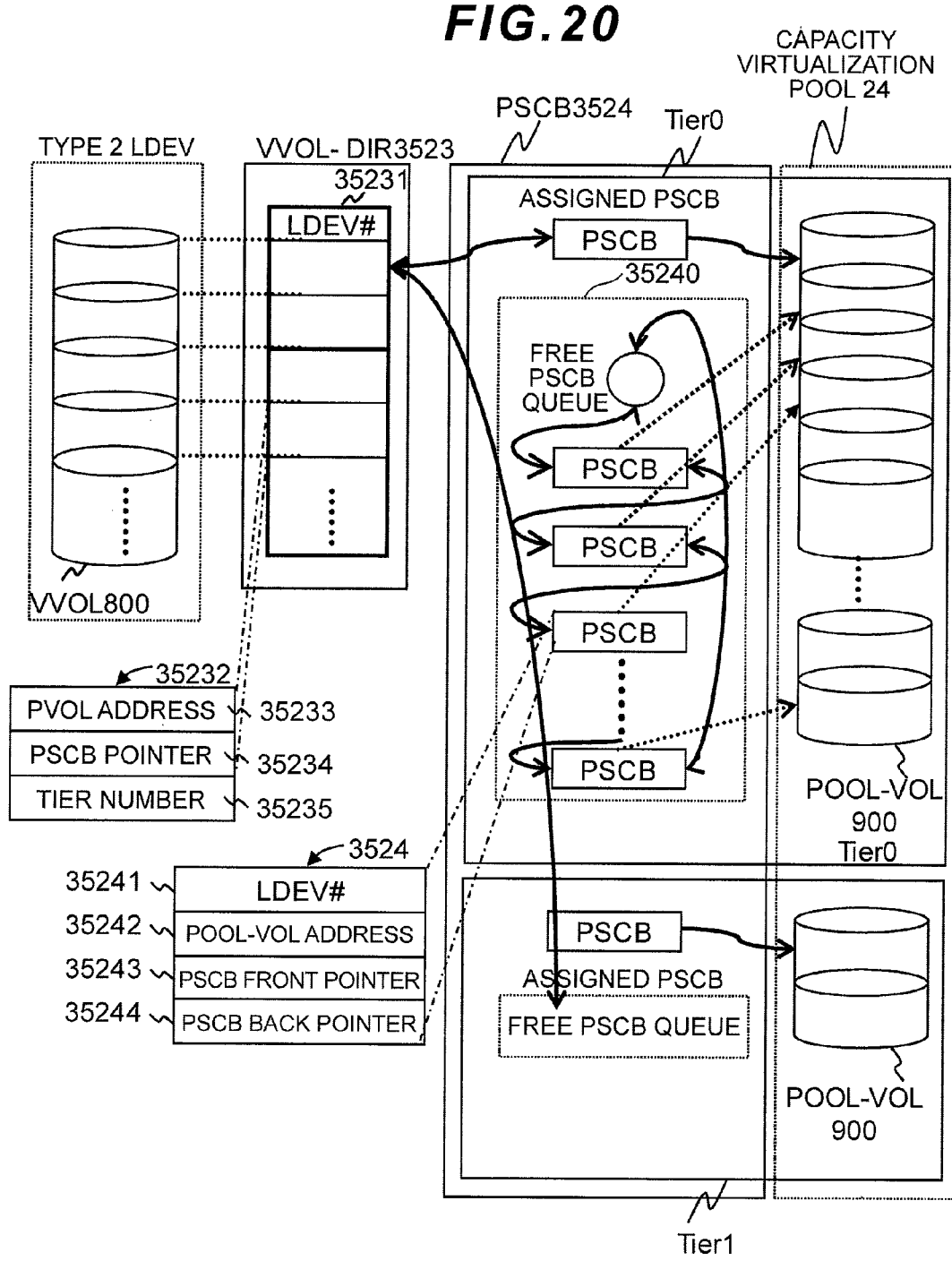
FIG. 20 is a block diagram of a case where hierarchies are set in the system capacity pool described in FIG. 19.

FIG. 20 shows a block diagram of a case where hierarchies are set in the capacity virtualization pool 42.

The storage apparatus 30 manages free PSCBs in units of hierarchies. As the hierarchies, the Tier 0 and the Tier 1 are shown as examples. The capacity virtualization pool is also managed in units of the same hierarchies.

To one Type 2 LDEV 35231, areas are assigned from the multiple hierarchies (Tier, Tier 1) in units of pages. The storage apparatus 30 manages the information in units of pages as the information in units of PSCBs. The hierarchy number 35235 is a number of the hierarchy to which a PSCB belongs.

The command control program 3501, if no PSCB is assigned to an entry of the VVOL-DIR 3523, selects a PSCB to be connected to the free queue assigned to the target hierarchy number, and assigns this to the entry 35232 of the VVOL-DIR 3523.

As for pages of what Tier should be initially assigned to the virtual volume, for example, there is a method in which pages are assigned initially from the high-performance Tier whose response is expected to be fast.

The host computer or the storage apparatus may also set a Tier number to be initially assigned to each virtual volume.

The capacity virtualization pool may also be set to assign pages to the virtual volume from the high-performance Tier or from the low-performance Tier. The storage apparatus may also monitor the I/O load from the host computer and reallocate the data to the appropriate Tiers.

If multiple capacity virtualization pools exist, it may be permitted that all the capacity virtualization pools are hierarchized or it may also be permitted that a part of the capacity virtualization pools are hierarchized and the others are not hierarchized. Note that a pool which is not hierarchized is normally configured of pool volumes in a single Tier.

As the target to which pool volumes are added from the system capacity pool, a "capacity virtualization pool" which is a pool for Thin Provisioning is described, as substitutes for which, as roughly described above, a Snapshot pool comprising Snapshot volumes and a journal pool comprising remote copy journal volumes exist.

As a threshold for the Snapshot pool, a total number of Snapshot volumes which are not used for Snapshot or a total unused capacity exists. In case of Snapshot, as the capacity becomes insufficient if the backup amount increases, the storage apparatus adds Snapshot volumes from the system capacity pool to the Snapshot pool.

Meanwhile, if the backup capacity is small, the Snapshot pool capacity is excessively large, and therefore the storage apparatus performs the processing of returning the Snapshot volumes from the Snapshot pool (corresponding to the capacity virtualization pool) to the system capacity pool.

As a threshold for the journal pool, a remote copy bandwidth exists. If the transfer bandwidth between the copy source volume and the copy destination volume in remote copy becomes narrow, the storage apparatus adds journal volumes from the system capacity pool to the journal pool, and secures the bandwidth.

Meanwhile, if the bandwidth is broad and the remote copy performance is sufficiently high, the storage apparatus narrows the bandwidth and, for intending to reduce the cost, returns the journal volumes from the journal pool (corresponding to the capacity virtualization pool) to the system capacity pool.

The storage apparatus sets Type 1 LDEVs for the system capacity pool 44, and then registers the ID of the system capacity pool in the POOL-ID 351301 in the LDEV management table (FIG. 12).

The storage apparatus adds pool volumes from the system capacity pool 44 to the capacity virtualization pool 42, and then registers the ID of the target capacity virtualization pool in the POOL-ID 351301 in the LDEV management table (FIG. 12).

The storage apparatus determines the capacity to be added to the capacity virtualization pool in accordance with the tendency to consume the capacity in the capacity virtualization pool or determines the same from the past tendency to add pool volumes from the system capacity pool to the capacity virtualization pool.

The number of pool volumes to be added to the capacity virtualization pool is ascertained by dividing the assumed amount of addition by the standard capacity of a pool volume.

Next, the capacity extension operation of the capacity virtualization pool is described. This is performed by the automatic capacity extension/reduction program 3509. The program is called in the course of page assignment processing for the virtual volume, in the copy functions in the storage apparatus e.g. mirroring and differential snapshot, in the course of the page assignment processing corresponding to the write processing to the secondary volume, and in the course of the periodic system monitoring processing.

Figure 21:
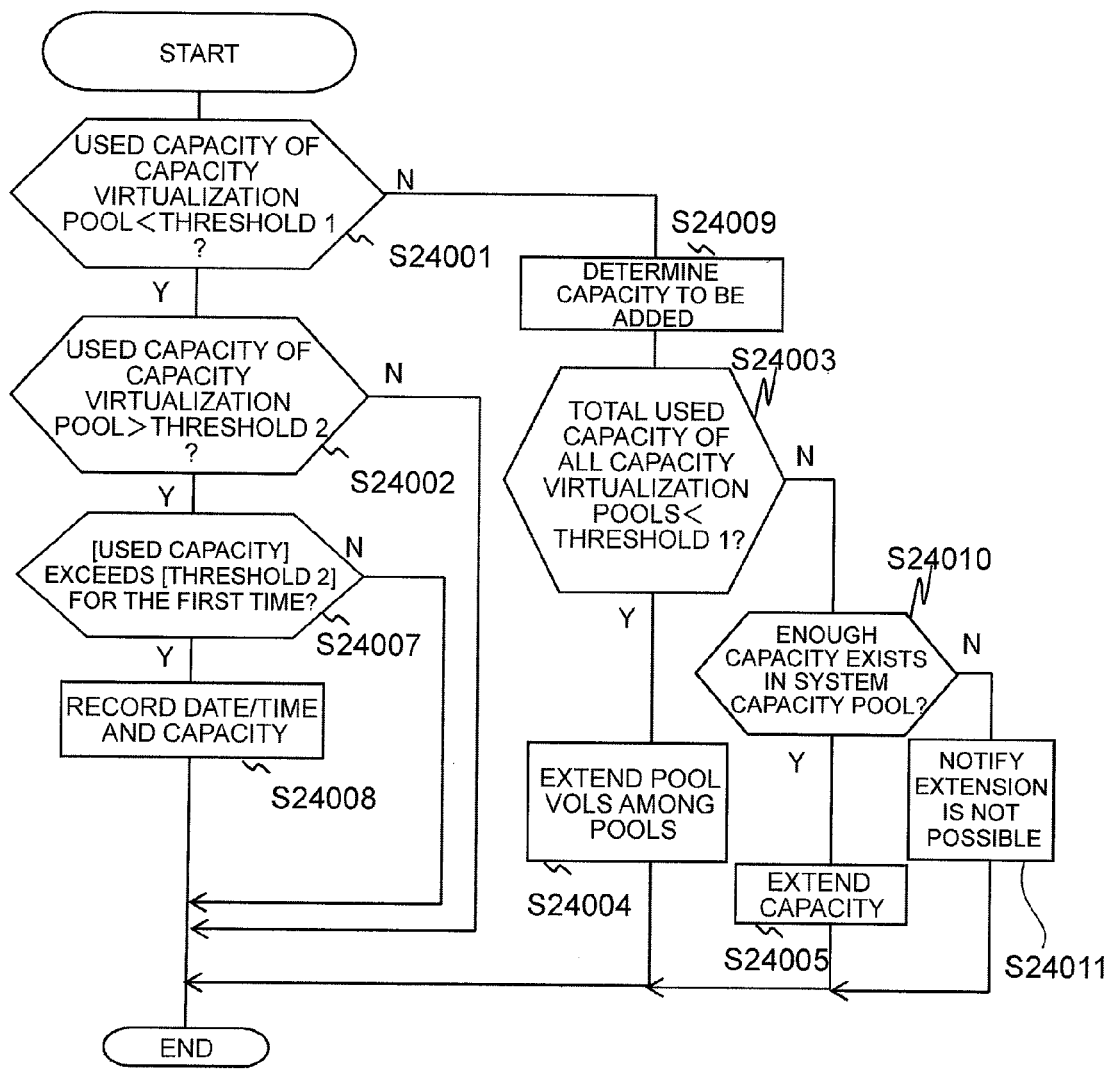
FIG. 21 is a flowchart showing the details of capacity change control processing for the capacity virtualization pool in cases where a command processing program performs the write processing for the virtual volumes.

The details of the capacity extension processing for the capacity virtualization pool performed by the automatic capacity extension/reduction program in cases where the command processing program 3501 performs the write processing for the virtual volumes are described in accordance with the flowchart shown in FIG. 21. This flowchart uses two thresholds for changing the capacity of the capacity virtualization pool.

The first threshold is an upper limit value and, if the used capacity of the pool exceeds this threshold, the automatic capacity extension/reduction program 3509 extends the capacity of the capacity virtualization pool 42.

The second threshold is a reference value and, if the used amount exceeds this threshold, the program starts to record the monitoring of the used capacity for monitoring the capacity virtualization pool. Note that the first and second thresholds are the relative ratios to the total capacity of the capacity virtualization pool, and the used capacity is also the relative ratio to the total capacity of the pool.

At S24001, the automatic capacity extension/reduction program 3509 compares the used capacity of the capacity virtualization pool with the first threshold. As a result of this comparison, if [the program] determines the former to be equal to or larger than the latter, [the program] determines that the effective actual capacity of the capacity virtualization pool is insufficient, and determines the capacity to be added from the system capacity pool 44 to the capacity virtualization pool 42 (S24009).

Next, at S24003, the sum of the used capacities of all the capacity virtualization pools is compared with the first threshold. Though the first threshold at this step may be the same as the first threshold at S24001 or may also be different, the first threshold at S24003 is the upper limit ratio of the total used amount to the total capacity of all the capacity virtualization pools.

As a result of this determination, if the total used amount is less than the threshold, S24004 considers that the multiple capacity virtualization pools existing in the storage apparatus comprise sufficient capacity, and adds pool volumes from the other capacity virtualization pools to the capacity virtualization pool to which the write processing from the host device is applied.

Meanwhile, as a result of the determination at S24003, if the total used amount is equal to or larger than the threshold, the program 3509 considers that the capacity of the capacity virtualization pool is insufficient and that pool volumes must be added from the system capacity pool 44 to the capacity virtualization pool 42, determines at S24010 whether pool volumes which can be added to the capacity virtualization pool exist in the system capacity pool or not. If negating this determination, [the program notifies] the user that the capacity of the capacity virtualization pool cannot be extended, that is, requires the user or the administrator to additionally install media in the storage apparatus (S24011).

Meanwhile, if the automatic capacity extension/reduction program 3509 affirms the determination at S24010, adds pool volumes to the capacity virtualization pool as the target of the write processing from the system capacity pool (S24005).

At S24001, the program 3509, if determining the used capacity of the capacity virtualization pool to be less than the first threshold, compares the used capacity with the second threshold (S24002). If the former is equal to or smaller than the latter, [the program 3509] considers that the capacity insufficiency does not exist in the capacity virtualization pool, and terminates the processing. However, in this case, as the capacity virtualization pool has excessive capacity, the pool volumes are reduced from the capacity virtualization pool.

If the former is larger than the latter, [the program 3509] determines whether this occurred for the first time by this write processing or not (S24007). If the program affirms the determination, in order to prepare for the capacity insufficiency of the capacity virtualization pool, [the program] starts the monitoring processing for the capacity virtualization pool as the write target (S24008).

The monitoring processing is the record of the capacity of the capacity virtualization pool and the date and time of checking the capacity. The monitoring program continues the regular monitoring processing for the capacity virtualization pool. Note that S24003 may also be changed to the determination whether the system capacity pool comprises sufficient capacity.

Figure 22:
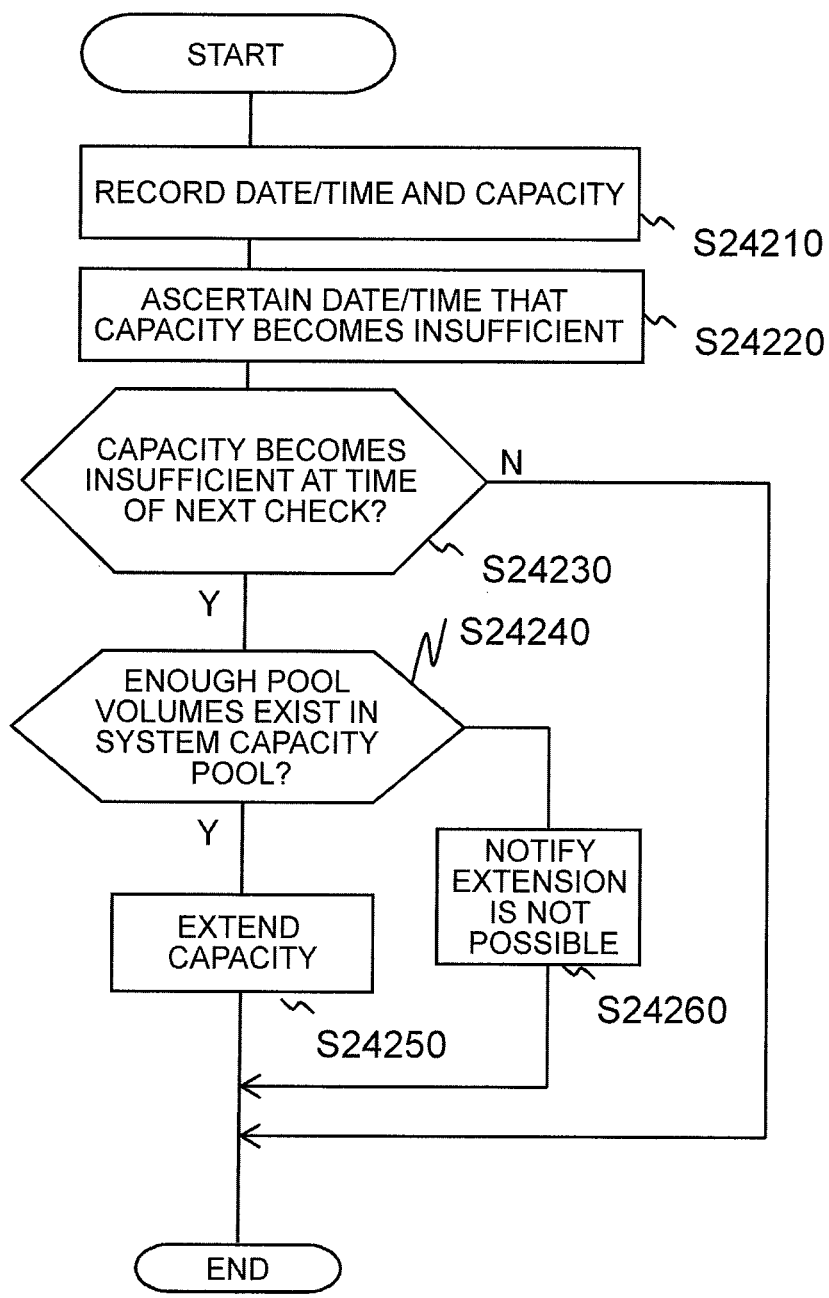
FIG. 22 is a flowchart of automatic capacity extension processing for the capacity virtualization pool which is regularly performed by the storage apparatus.

Next, FIG. 22 is a flowchart of the automatic capacity extension processing for the capacity virtualization pool which is regularly performed by the automatic capacity extension/reduction program 3509.

At S24210, [the program] reads the record of the used capacity of the capacity virtualization pool and the date and time when the capacity is determined from the processing area of the memory.

At S24220, in accordance with the operation tendency such as the past capacity consumption rate of the capacity virtualization pool and others, [the program] ascertains the date and time when the effective actual capacity becomes insufficient. The capacity consumption rate can be ascertained by comparing the capacities (used capacities or the free capacities) of the capacity virtualization pool acquired at the timing of the regular check.

At S24230, [the program] compares the scheduled date and time for the next capacity check of the capacity virtualization pool with the ascertained date and time and, if the scheduled date and time is earlier than the ascertained date and time, terminates the flowchart. If the scheduled date and time is on or after the ascertained date and time, at S24240, [the program] determines whether sufficient pool volumes exist in the system capacity pool or not.

If negating the determination, at S24260, [the program] determines that the capacity extension of the capacity virtualization pool is not possible, and terminates the flowchart. If affirming the determination, at S24250, [the program] performs the capacity extension processing.

Note that, if the capacity of the system capacity pool is insufficient, it may also be permitted that the storage apparatus adds the amount of the capacity existing in the system capacity pool to the capacity virtualization pool, and that the management device 20 notifies the user or the administrator of the ID of the system capacity pool which runs out of the capacity and the identification information of the storage apparatus comprising the system capacity pool which runs out of the capacity.

Figure 23:
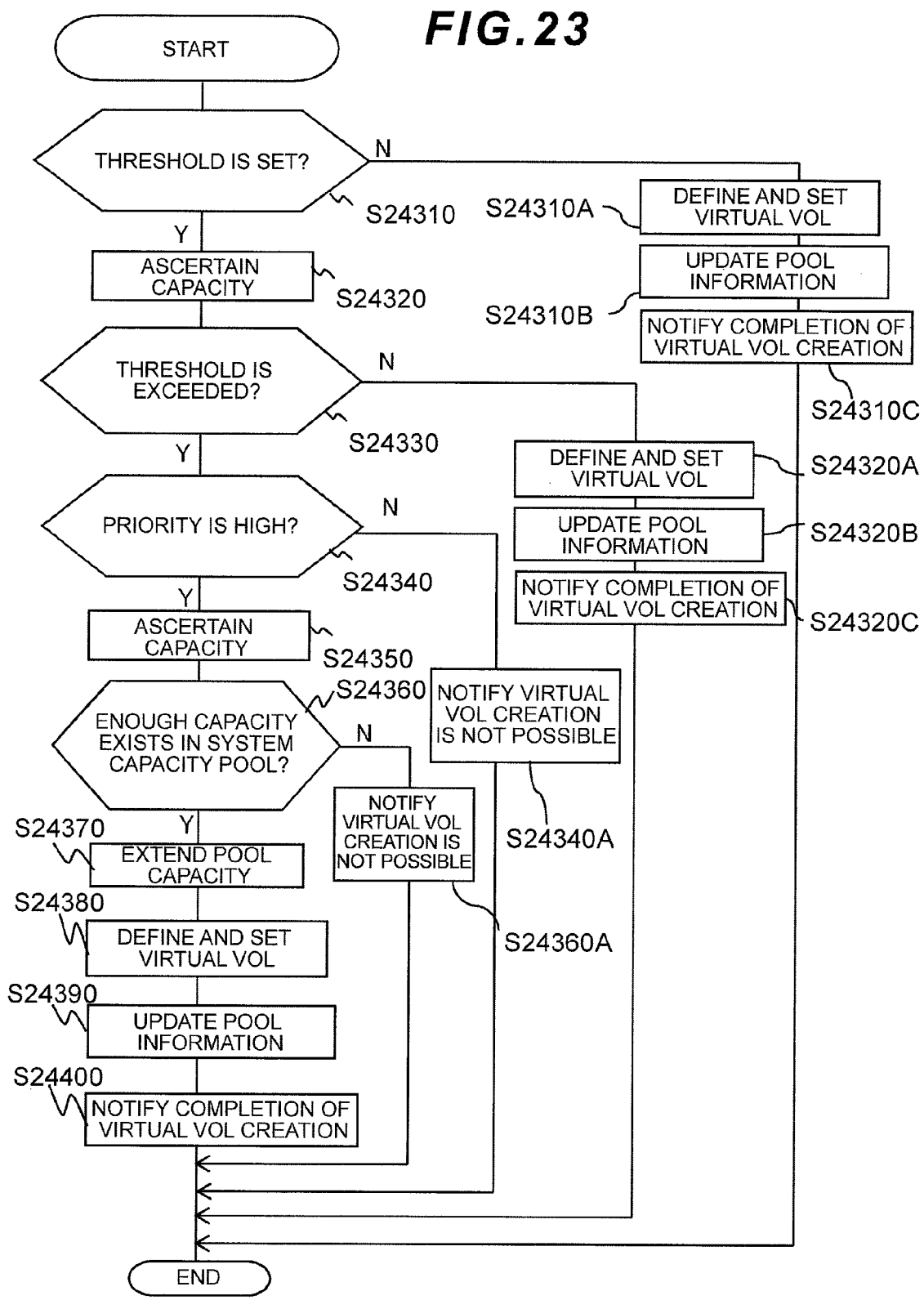
FIG. 23 is another flowchart of the automatic capacity extension processing for the capacity virtualization pool.

FIG. 23 is another flowchart of the automatic capacity extension processing for the capacity virtualization pool. The command control program 3501, if receiving a virtual volume creating command from the administrator device, calls the pool control program 3507.

The pool control program 3507 checks whether an over-provisioning threshold (35217 in FIG. 15) is set for the capacity virtualization pool to which the ID specified by the administrator is provided or not (S24310).

The pool control program 3507, if determining that no threshold is set, for defining the virtual volume of which the creation is instructed by the administrator for the capacity virtualization pool to which the ID instructed by the administrator is provided, sets the virtualized volume information defined by the capacity virtualization pool management information (FIG. 15) for the virtual volume as the creation target.

Furthermore, after calling the configuration control program 3503, the configuration control program sets the information of the created virtual volume for the respective mapping information of the address management table 3511. That is, at S24310A, the processing for defining and setting the virtual volume is performed.

Next, the capacity virtualization pool management information (FIG. 15) is updated at S24310B, and the notification to the administrator that the virtual volume creation is completed is performed at S24310C.

The pool control program 3507, if determining that an over-provisioning threshold is set, ascertains the total used capacity which is the sum of the virtualized volumes which are already installed in the storage apparatus and the virtual volume to be created in accordance with the request from the administrator (S24320), and then compares the relevant total virtual capacity with the multiplied value of the actual capacity of the capacity virtualization pool by the over-provisioning threshold, and checks whether the former exceeds the latter or not (S24330).

The pool control program 3507, if determining that the former does not exceed the latter, performs S24320A to S24320C.

Meanwhile, the pool control program 3507, if determining that [the former] exceeds [the latter], for determining whether to cover the exceeded amount or not by adding pool volumes to the capacity virtualization pool, checks whether the priority information is sent to the storage apparatus from the management server 20 and others or not, and further checks whether this priority information is "High" or not (S24340).

If the priority is "High," the pool control program 3507 calls the automatic capacity extension/reduction program 3509, and causes the same to perform the automatic extension processing for the capacity virtualization pool after S24350.

At S24350, [the program] ascertains or predicts the insufficient amount of the actual capacity in the capacity virtualization pool (S24350), and next, at S24360, by referring to the threshold set for the system capacity pool and by other methods, determines whether the free capacity of the system capacity pool comprises enough actual capacity to cover the amount of this actual capacity or not.

As an example of planning to what degree the capacity virtualization pool should be extended, there are some cases where a value is determined in advance and, to ensure that the sum of the virtual capacities of the virtual volumes is equal to or smaller than 90% of the actual capacity of the capacity pool, pool volumes are additionally installed to the capacity virtualization pool.

If this is determined to be negative at S24360, at S24360A, [the program] warns or notifies the source of the virtual volume creation request that the creation of the virtual volume is impossible.

Note that the storage apparatus, instead of the mode of issuing the notification that the creation of the virtual volume is impossible, may also retrieve the capacity from the capacity virtualization pool comprising the enough capacity or search a storage externally connected to the storage apparatus 30 and, by using the capacity, set the capacity extension processing for the capacity virtualization pool to be automatically continued. This is not limited to the processing related to the flowchart shown in FIG. 23 and can also be applied to the processing related to the other flowcharts.

If the determination is affirmed at S24360, at S24370, [the program] adds pool volumes from the system capacity pool to the target capacity virtualization pool, and performs the virtual volume creation processing at S24380, S24390, and S24400.

Meanwhile, if the priority is determined not to be "High" at S24340, [the program] considers that the over-provisioning [threshold] is violated, and notifies the administrative user that the creation of the virtual volume is impossible.

Figure 24:
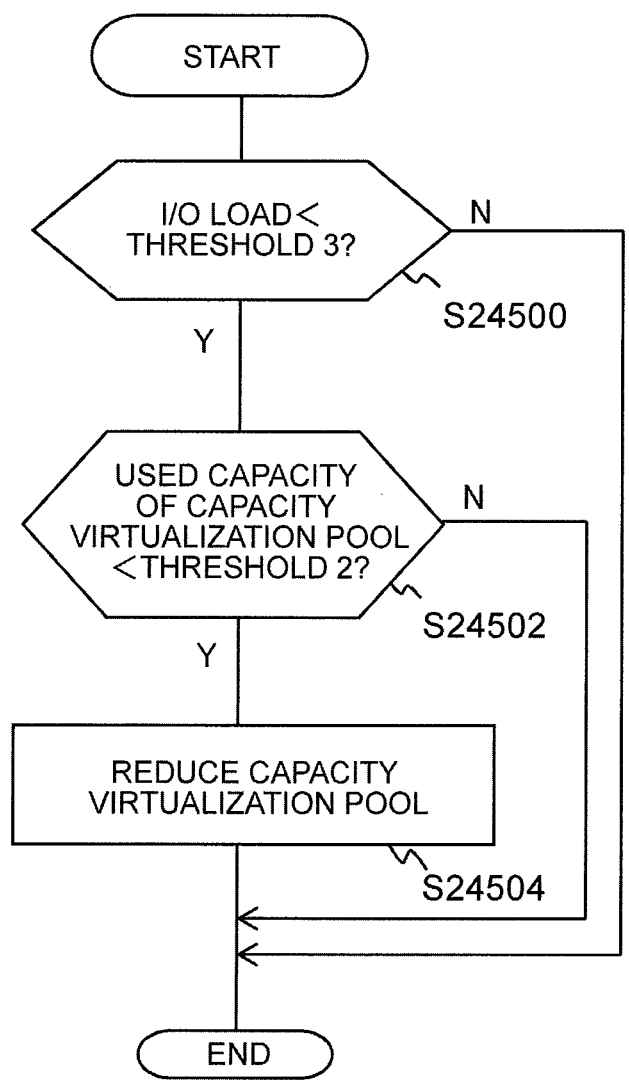
FIG. 24 is a flowchart of automatic reduction processing for the capacity virtualization pool.

FIG. 24 is a flowchart describing the automatic capacity reduction processing for the capacity virtualization pool. As for applying the automatic capacity extension processing and the automatic capacity reduction processing for the capacity virtualization pool, the I/O frequency and the I/O load for the capacity virtualization pool may also be adopted as thresholds. A threshold 3 at S24500 is a limit value based on the I/O load for the capacity virtualization pool.

The command control program 3501 compares the I/O load for the capacity virtualization pool with the threshold 3 (S24500) and, if the former is equal to or larger than the latter, considers that the capacity of the capacity virtualization pool 42 should not be reduced, and terminates the processing.

Meanwhile, if the former is less than the latter, [the program] considers that the capacity can be reduced, and calls the automatic capacity extension/reduction program 3509.

At S24502, [the program] compares the used capacity of the capacity virtualization pool with a threshold 2. The threshold 2 is for specifying the lower limit value of the used capacity of the capacity virtualization pool and, if the used capacity of the capacity virtualization pool is equal to or larger than this threshold, [the program] considers that there is no excessive capacity of the capacity virtualization pool and that the capacity cannot be reduced, and terminates the flowchart at S24502.

If the determination is affirmed at S24502, [the program] deletes the pool volumes in the capacity virtualization pool at S24504, and adds the deleted pool volumes to the system capacity pool. Note that the triggers for performing the flowchart in FIG. 24 are the same as at least one of the triggers from FIG. 21 to FIG. 23.

Figure 25:
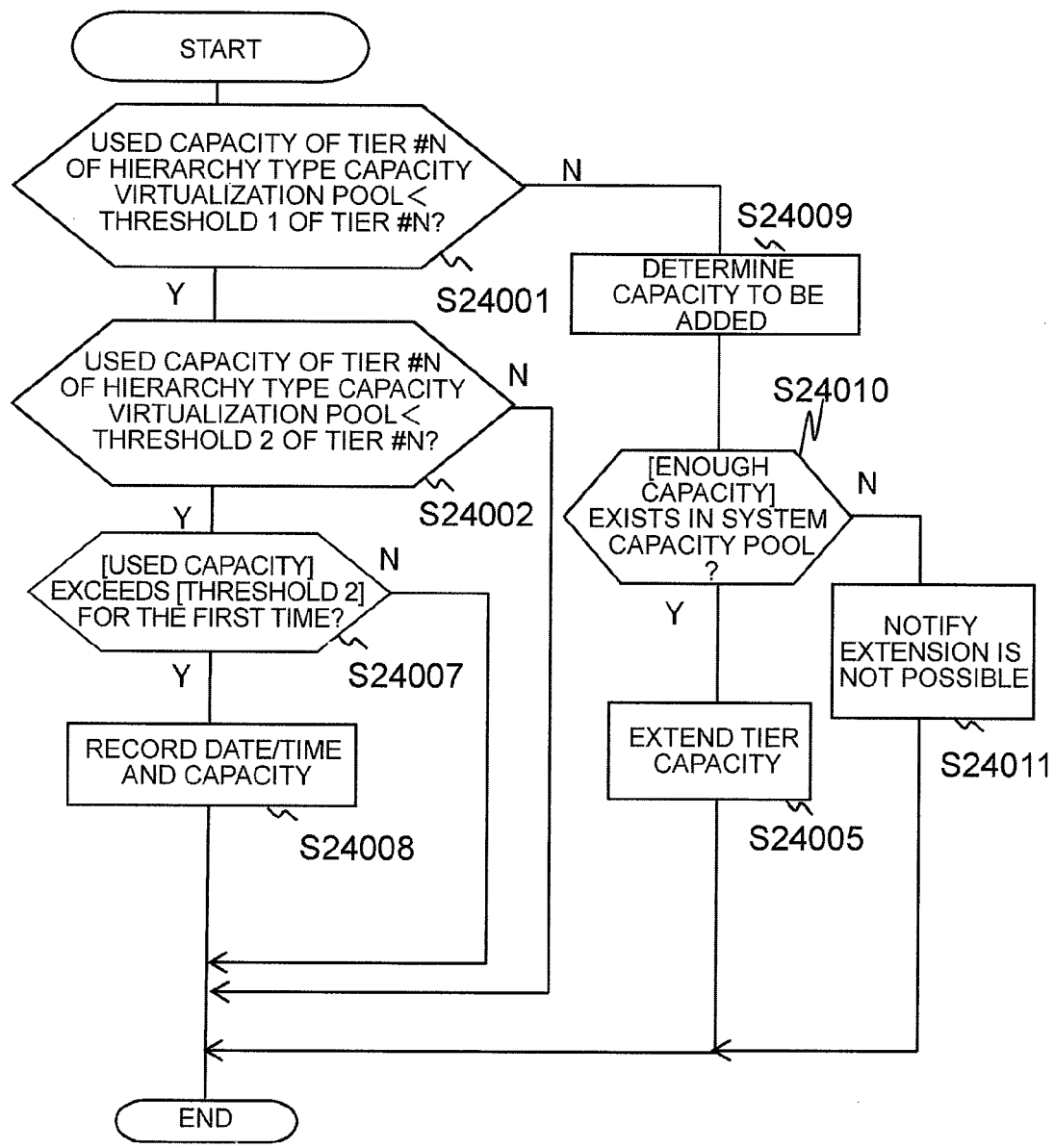
FIG. 25 is a flowchart related to another example of the automatic extension processing for the capacity virtualization pool.

FIG. 25 is a flowchart related to another example of the automatic extension processing for the capacity virtualization pool. This flowchart is a modified example of FIG. 21 and is different [from FIG. 21] in that the capacity virtualization pool is hierarchized and that the automatic capacity extension processing is performed for each hierarchy of the capacity virtualization pool.

In this flowchart, to the parts corresponding to the respective types of processing shown in FIG. 21, the same reference signs are added. In the processing of the reference signs S24001 and S24002 in FIG. 25, the threshold is considered for each hierarchy. In the flowchart of FIG. 25, the processing equivalent to S24003 and S24004 of FIG. 21 is not included.

Figure 26:
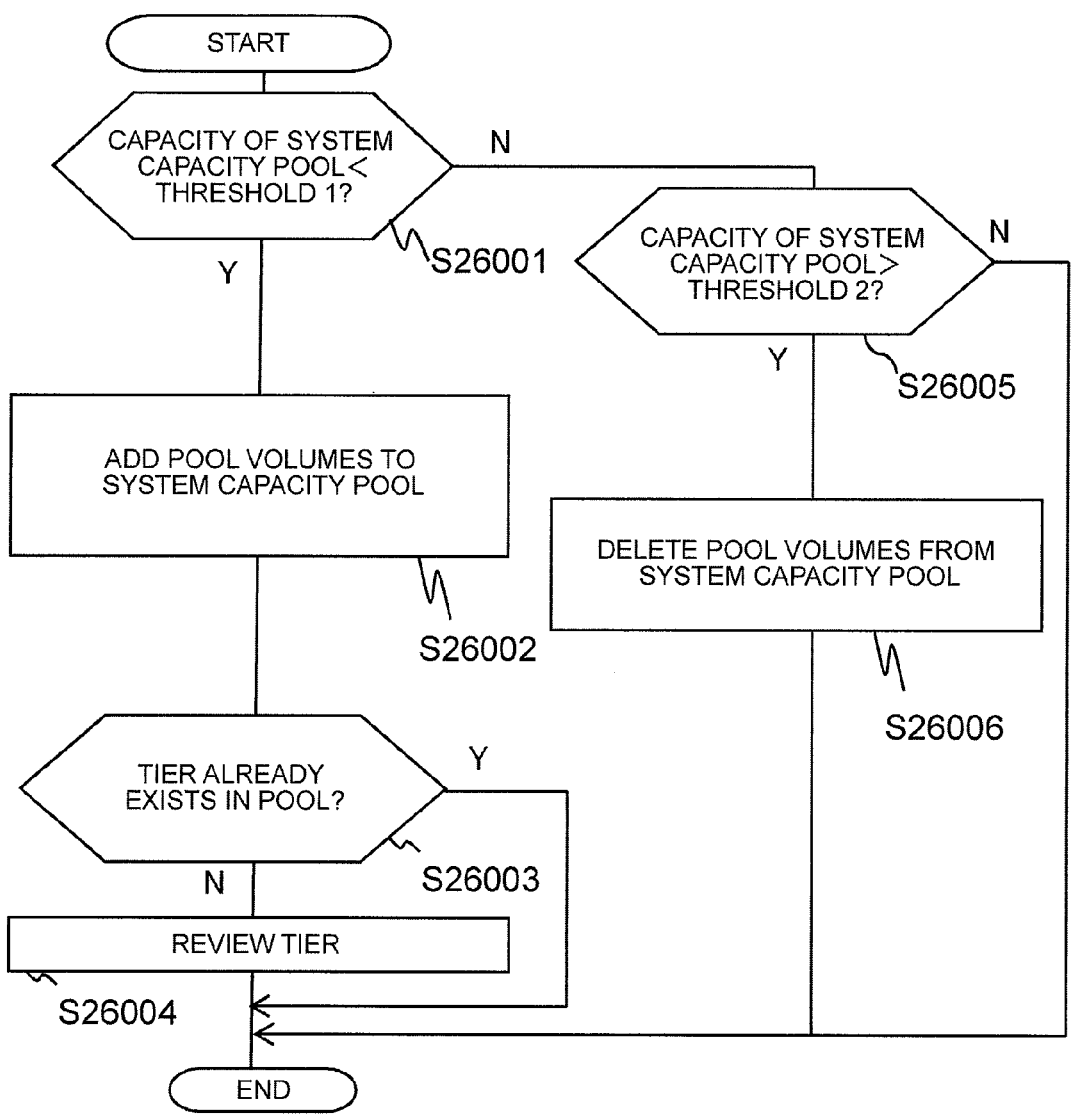
FIG. 26 is a flowchart of automatic addition/automatic deletion of pool volumes for the system capacity pool.

FIG. 26 is a flowchart of automatic addition/automatic deletion of pool volumes for the system capacity pool. The automatic capacity extension/change program 309 compares the currently existing capacity of the system capacity pool (the total capacity of the multiple unused pool volumes) with the lower limit threshold (threshold 1) (S26001). If determining the former to be equal to or larger than the latter, [the program] compares the capacity of the system capacity pool with the upper limit threshold (threshold 2) (S26005). If determining the former to be equal to or less than the upper limit threshold, [the program] considers that the capacity of the system capacity pool is neither excessive nor insufficient, and terminates the flowchart.

If determining at S26005 that the capacity of the system capacity pool is larger than the threshold 2, at S26006, [the program] considers that the capacity of the system capacity pool is excessive, and deletes unused pool volumes from the system capacity pool.

As described above, for reducing the capacity of the system capacity pool, reducing storage drives is fundamental. The automatic capacity extension/change program 309 determines an HDD disk to be removed, and determines whether to cause the storage apparatus to automatically reduce the capacity of the system capacity pool or to let the administrative user manually reduce the same, in accordance with the previous setting or the input information from the administrative user.

If the former is selected, the automatic capacity extension/ change program 309 deletes the pool volumes created in the HDDs to be removed from the management table. Next, [the program] notifies the information of the HDDs to be removed to the administrative user. The user, receiving this notification, removes the HDDs.

Meanwhile, if the latter is selected, the user performs the processing of deleting the pool volumes from the management table, then recognizes the HDDs to be removed and performs the removal.

The automatic capacity extension/change program 309, for S26001, if determining the capacity of the system capacity pool to be less than the threshold 1, as the capacity of the system capacity pool is insufficient, adds pool volumes from the PDEVs to the system capacity pool.

The automatic capacity extension/change program 3509 detects the insufficiency of the capacity of the system capacity pool, and then sends a request for additionally installing media to the user or the administrator. The user or the administrator sets VDEVs and LDEVs from the PDEVs, and sets the LDEVs as pool volumes for the system capacity pool.

Next, at S26003, [the program] refers to the system capacity pool management table (FIG. 18), determines whether the pool volumes to be added to the system capacity pool are from the media classified for the hierarchies existing in the system capacity pool or not and, if affirming this determination, terminates the flowchart.

Meanwhile, if negating the above-mentioned determination at S26002, [the program] reviews the hierarchies about the new media and the media classified for the existing hierarchies, adds the reviewed hierarchies to the system capacity pool table (FIG. 18), and terminates the flowchart.

The processing described in FIG. 26 is performed at a regular timing. In other cases, [the processing] may also be performed if the automatic capacity extension/reduction for the capacity virtualization pool occurs. If no hierarchy is set for the system capacity pool, S26003 and S26004 are omitted.

Figure 27:
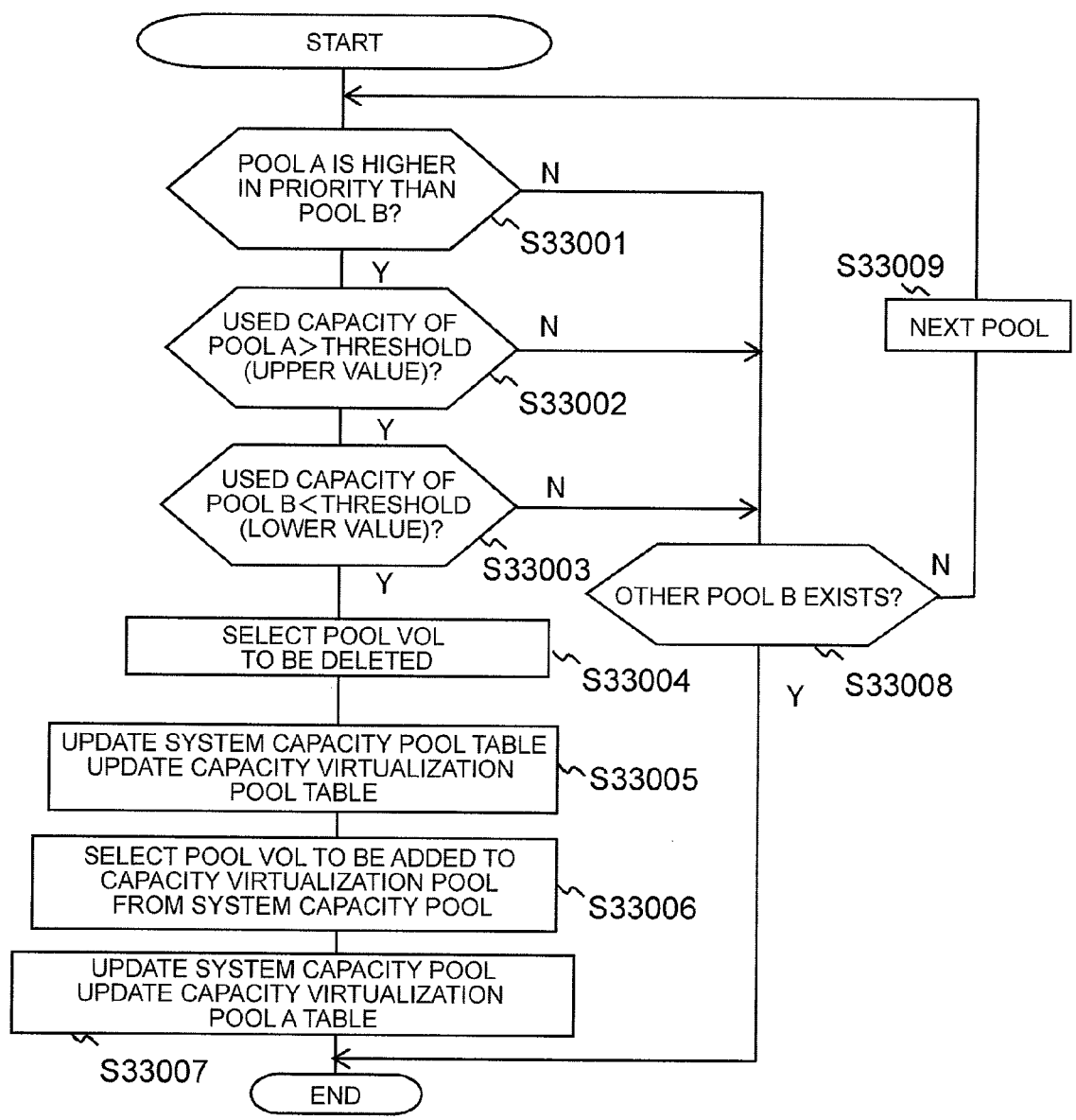
FIG. 27 is a flowchart of achieving the automatic capacity change processing among multiple capacity virtualization pools.

FIG. 27 is a flowchart for achieving the automatic capacity change processing between multiple capacity virtualization pools. A capacity virtualization pool A is the migration destination of the pool volumes, and a capacity virtualization pool B is the migration source of the pool volumes.

This flowchart is performed by the automatic capacity extension/reduction program 3509. At S33001, [the program] compares the priority between the capacity virtualization pool A and the capacity virtualization pool B, and determines whether the capacity virtualization pool A is higher in priority than the capacity virtualization pool B or not.

If negating this determination at S33001, at S33008, [the program] selects whether the other capacity virtualization pool B exists or not and, if determining that the other capacity virtualization pool B does not exist in the storage apparatus, terminates the flowchart.

Meanwhile, if negating this determination, [the program] proceeds to the next step, selects the next capacity virtualization pool B at S33009, and returns to S33001.

If affirming the determination at S33001, [the program] compares the used capacity of the capacity virtualization pool A with the threshold (upper limit) at S33002. If negating this determination at S33002, [the program] proceeds to S33008. Meanwhile, if affirming the determination at S33002, [the program] compares the used capacity of the capacity virtualization pool B with the threshold (lower limit) at S33003 and, if determining this to be negative, proceeds to S33008.

Performing the affirmative determination at S33003 indicates that the effective actual capacity of the capacity virtualization pool A is insufficient while the capacity virtualization pool B comprises the enough effective actual capacity, and therefore indicates that pool volumes can be added from the capacity virtualization pool B to the capacity virtualization pool A. Therefore, at S33004, [the program] selects the pool volumes to be deleted from the capacity virtualization pool B and retrieved to the system capacity pool.

The configuration control program 3503 applies the update which is the deletion of pool volumes to the table of the capacity virtualization pool B (FIG. 15), and next, applies the update which is the addition of pool volumes from the capacity virtualization pool B to the system capacity pool table (FIG. 18).

Next, the automatic capacity extension/reduction program 3509 refers to the system capacity pool table, and selects the pool volumes to be added to the capacity virtualization pool A from the system capacity pool (S33006). Next, at S33007, [the program] updates the system capacity pool table and the table of the capacity virtualization pool A, and terminates the processing of the flowchart.

Figure 28:
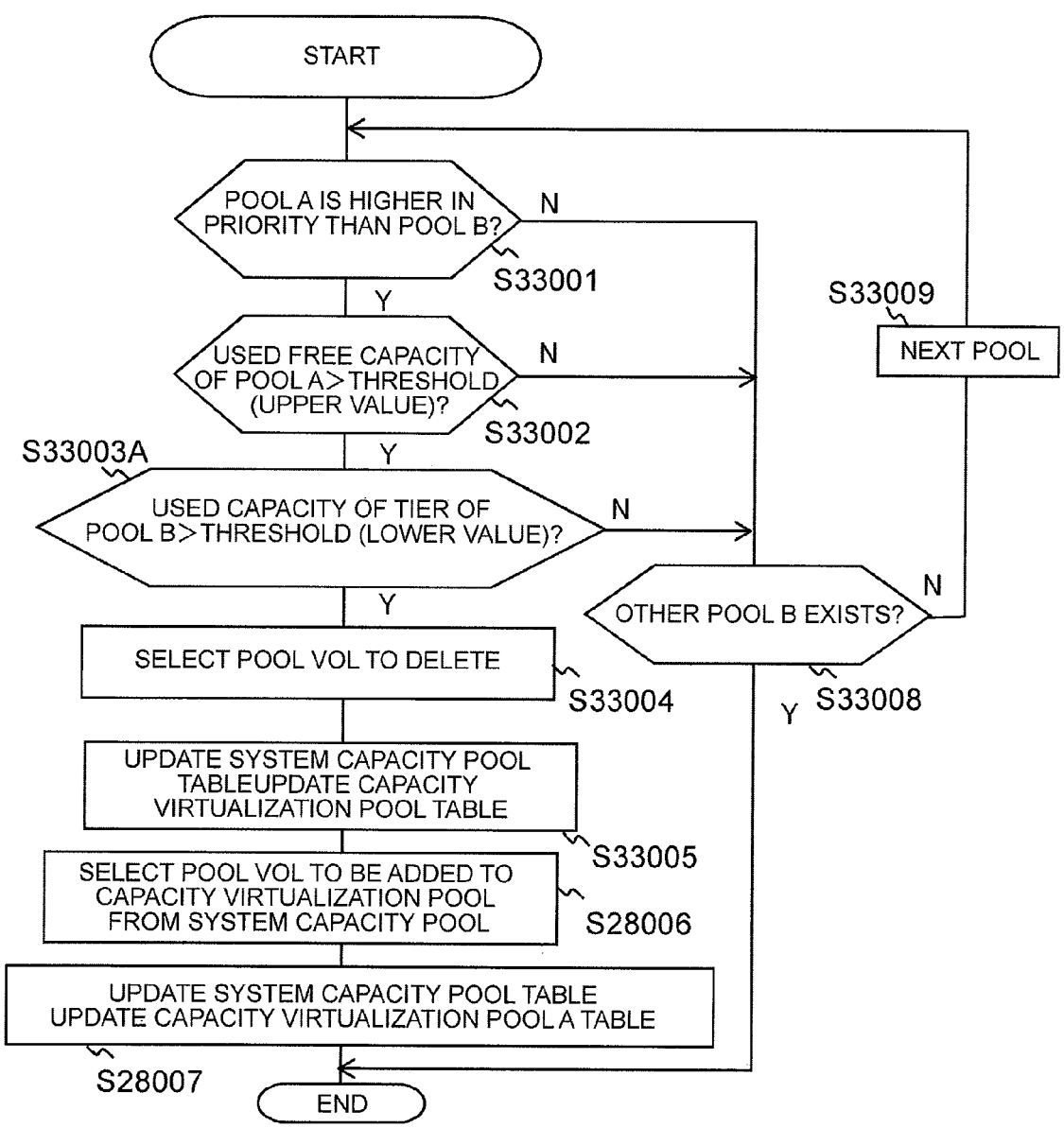
FIG. 28 is a flowchart related to a modified example of FIG. 27.

The flowchart in FIG. 28 is a modified example of FIG. 27, wherein the capacity virtualization pool is hierarchized, and the addition and deletion of pool volumes are performed among the same hierarchy. Only S33003A (S33003 in FIG. 27) is different from the flowchart in FIG. 27.

Among the steps in the flowchart of FIG. 28, to the steps corresponding to the steps in the flowchart of FIG. 27, the same reference signs are added.

The pool volumes to be added from the capacity virtualization pool B to the capacity virtualization pool A are selected from the same hierarchies in both of the pools. Therefore, the determination whether the used capacity of the capacity virtualization pool B is less than the threshold (lower limit value) or not and whether the capacity virtualization pool B comprises enough capacity or not (S33003A) is performed for the hierarchy which is determined at S33002 of which the effective actual capacity of the capacity virtualization pool A is insufficient.

The processing of what hierarchy of pool volumes should be selected when the command control program 3501 assigns the pages of the pool volumes of the capacity virtualization pool to the access areas of the virtual volume is described.

The hierarchy is determined in accordance with the number of I/Os (I/O frequency) per unit of time for the virtual volume. That is, as the I/O frequency is larger, the pool volumes of the higher hierarchy are selected. The examples of the selection criteria for selecting the pool volumes to be deleted (FIG. 24: S24504, FIG. 26: S26006, FIG. 28: S33004) are that the data assignment (used capacity) to the pool volumes should be small and that the pool volumes should not be located across modules.

By the former [criterion], the data migration load remains small, and the latter [criterion] is, as described in FIG. 3, for reducing the load on the system. Similarly, the selection criterion for selecting the pool volumes to be added from the system capacity pool to the capacity virtualization pool is also that [the pool volumes] preferably should not be located across modules.

Figure 29A:
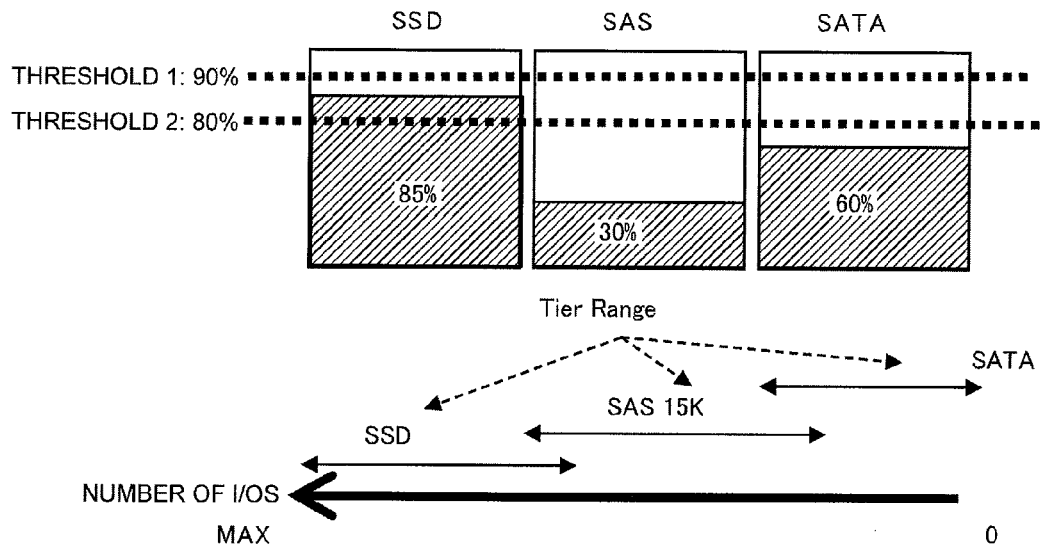
FIG. 29A is a block diagram showing that respective hierarchies of SSD, SAS, and SATA are set from the top for the capacity virtualization pool.

FIG. 29A shows that the respective hierarchies of SSD, SAS, and SATA are set from the top for the capacity virtualization pool 42. Furthermore, FIG. 29A shows what degree of range of the number of I/Os per unit of time each of the hierarchies covers to store data.

In FIG. 29A, in the SSD hierarchy, the used capacity approaches the threshold (1), which indicates the tight tendency of the SSD hierarchy. This is because the I/O frequency from the host computer 10 tends to be high.

In this case, the used capacity of the SSD hierarchy is likely to exceed the threshold (1) and, in that case, the automatic capacity extension/reduction program 3509 should add pool volumes from the SSD hierarchy of the system capacity pool to the SSD hierarchy of the capacity virtualization pool, which leads to the consumption of SSDs of high bit cost.

Figure 29B:
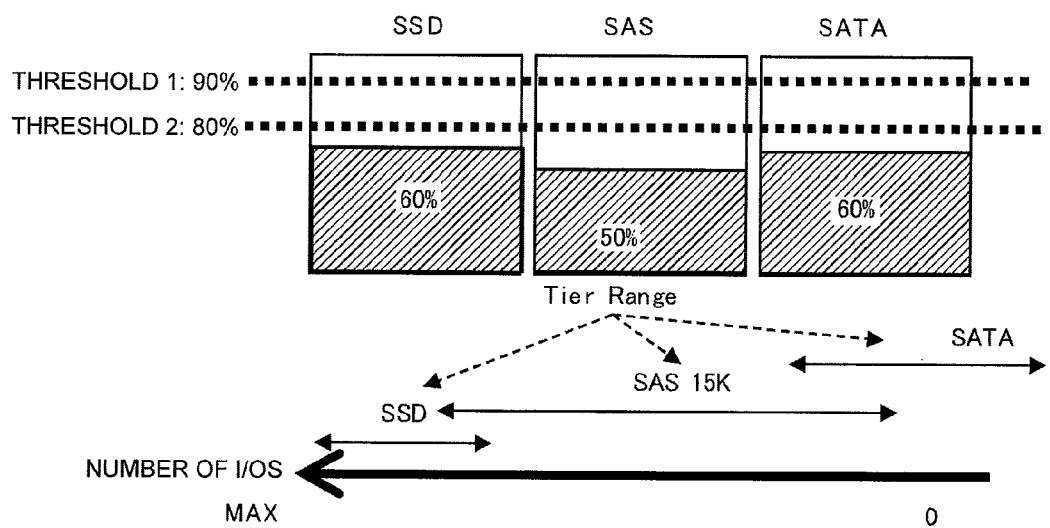
FIG. 29B is a flowchart related to a modified example of FIG. 29A.

Therefore, the administrator, as shown in FIG. 29B, extends the range of the I/O frequency to which the SAS's correspond while reducing the range of the I/O frequency assigned to the SSDs, for reducing the capacity consumption tendency in the SSD hierarchy and extending the capacity consumption tendency in the SAS hierarchy. Consequently, the capacity consumption of high bit-cost media can be inhibited.

Figure 37:
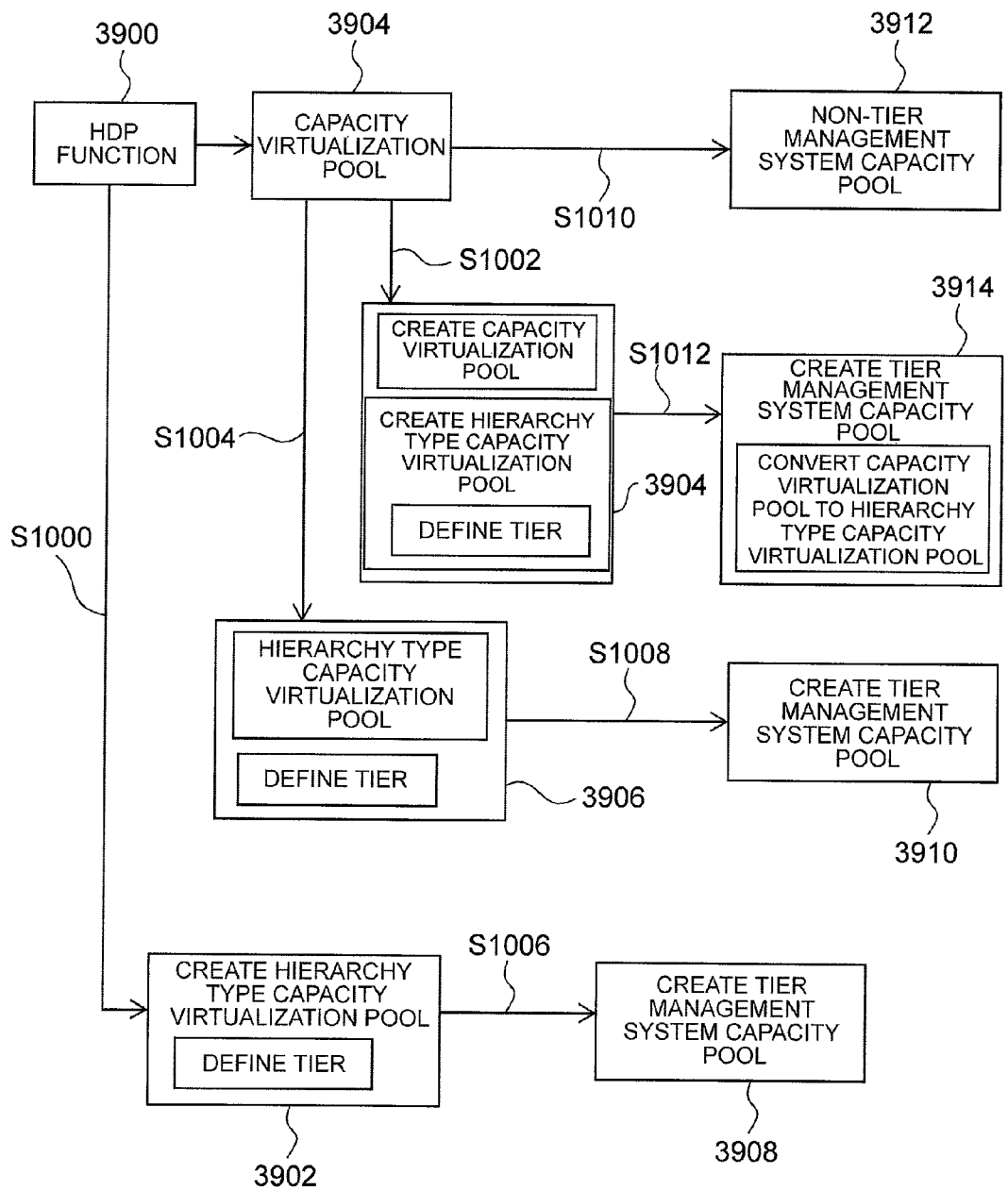
FIG. 37 is a block diagram of the computer system describing the hierarchy management/control function and the automatic capacity extension function of the capacity virtualization pool.

Next, with reference to the block diagram in FIG. 37, the processing in which the user/administrator sets the Thin Provisioning function (HDP function) 3900 for the computer system is described.

When the user/administrator creates or sets a capacity virtualization pool in the computer system, the application of the first function of applying the hierarchy management to the capacity virtualization pool to the capacity virtualization pool can be set on or off.

In the input for setting the capacity virtualization pool, if the user/administrator performs the input to set the relevant [application] on (S1000), a capacity virtualization pool 3902 to which the hierarchization management function is added is created. This input can be performed even after the operation of a capacity virtualization pool 3904 is started or after the creation of the same. This input [to set the application] on is in the mode for the respective capacity virtualization pools (S1002) and in the mode for all the capacity virtualization pools, that is, for the entire system (S1004).

By the former input, the storage apparatus 30 changes the capacity virtualization pool to which the hierarchy management is not applied to the capacity virtualization pool to which the hierarchization management is not applied, as a result of which, a capacity virtualization pool group 3904 including both of the types is set or created and, by the latter input, the multiple capacity virtualization pools existing in the system are respectively changed to the hierarchy management type capacity virtualization pools (S3906).

Then, the user/administrator can set the second function on or off that the storage apparatus automatically extends or reduces the capacity of the capacity virtualization pool.

In setting the capacity virtualization pools, if the user or others sets the second function on after setting the first function on for at least one capacity virtualization pool, the system capacity pool to which the hierarchy management is applied is created/set (S1006→3908, S1008→3910)

If the first function is off for all the capacity virtualization pools and if, subsequently, the second function is set on, the system capacity pool to which the hierarchization management is not applied is set (S1010→3912).

After setting the capacity virtualization pools and the system capacity pool, if the user sets the first function on for at least one capacity virtualization pool, the storage apparatus, if the system capacity pool is not in the status under the hierarchy management, converts this to the status under the hierarchy management.

For the mode in which the hierarchy management type capacity virtualization pools and the non-hierarchy type capacity virtualization pools are mixed in the storage apparatus, if the second function is set on, the storage apparatus, in creating hierarchy management type system capacity pools, automatically converts non-hierarchy type capacity virtualization pools to hierarchy type capacity virtualization pools 3914.

Note that the conversion to hierarchy type capacity virtualization pools is not required if multiple system capacity pools exist and if system capacity pools corresponding to non-hierarchy type capacity virtualization pools and hierarchy type capacity virtualization pools are distinguished.

If non-hierarchy type capacity virtualization pools and hierarchy management type capacity virtualization pools share the same system capacity pool, the hierarchy management is also required in the capacity virtualization pools.

FIG. 30 is a block diagram showing the relationship between the system configuration and the input means 300 of Thin Provisioning.

The input means is configured of the host computer 10 and the management server or the maintenance management terminal 153.

Dashed lines between the system capacity pool 44 and the capacity virtualization pool 42A or the capacity virtualization pool 42B indicate the correspondence relationship between the same hierarchies. Furthermore, dashed lines between the capacity virtualization pools 42A, 42B and the virtual volumes 411, 412 indicate the correspondence relationship between the hierarchies which the virtual volumes use and the hierarchies in the capacity virtualization pools.

Furthermore, the reference sign 1610 indicates the input by the input means for setting the virtual volumes for the storage apparatus, the reference sign 1611 indicates the input for setting the capacity virtualization pools, and the reference sign 1612 indicates the input for setting the system capacity pool.

Figure 31:
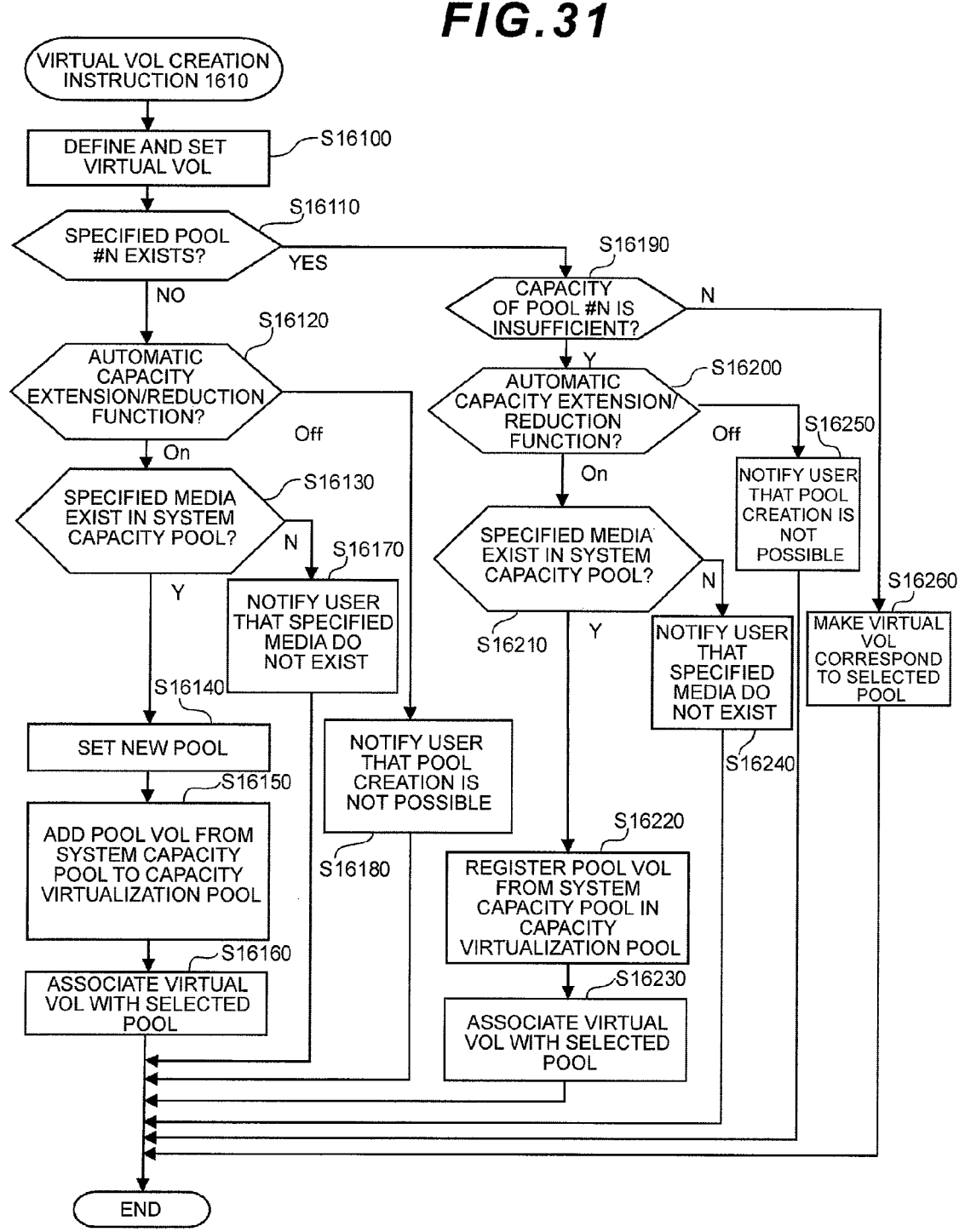
FIG. 31 is a flowchart showing the procedure of creating a virtual volume.

FIG. 31 is a flowchart showing the procedure of creating a virtual volume. This flowchart is performed by the configuration control program 3501 of the storage apparatus 3501 as the input information of the reference sign 1610 in FIG. 30 being sent to the storage apparatus.

This input information comprises a virtual volume number, a pool number of the capacity virtualization pool used by the virtual volume, a type of media used by the virtual volume, whether to perform automatic extension/reduction of the pool capacity or not, and a virtual capacity of the virtual volume.

The input is performed via the GUI. Furthermore, a target port, LUN, a host mode, and LUN security are also included in the information which can be input as needed.

The media type can be set by the user specifying the performance requirement and the cost requirement. If the input of the performance requirement and the cost requirement is performed for the host computer 10 or others, the programs of the host computer 10 ascertain the response performance (ms), throughput (IOPS, MBPS), and bit cost from the input information, and determine the most appropriate media type for the storage control processing.

Furthermore, the user can determine the media type by specifying the service level. For example, if "Prioritize response performance" is selected, the program on the GUI determines the SSDs or SAS's to be the most appropriate as the media which the virtual volume should use.

The host computer or others determines, for each user, whether pools can be newly created and assigned to the virtual volume or not. For example, for a specific user, as well as existing pools, new pools can be assigned to the virtual volume. Meanwhile, for a specific user, hierarchies can be set for the capacity virtualization pool.

In the flowchart of FIG. 31, the configuration control program 3503, if receiving a virtual volume creation command from the host computer or others, starts the virtual volume definition and setting processing (S16100).

The configuration control program 3503 determines whether the ID of the capacity virtualization pool specified by the virtual volume creation command 1610 exists in the capacity virtualization pool management table (FIG. 15) in the memory 350 or not (S16110).

If determining this to be affirmative, [the program] determines whether the capacity of the capacity virtualization pool is insufficient or not (S16190). This determination is performed in accordance with the unused capacity or the used capacity of the capacity virtualization pool and the threshold set for the capacity virtualization pool.

If the capacity of the capacity virtualization pool is not insufficient, the configuration control program associates the virtual volume with the capacity virtualization pool selected by the command, and terminates the virtual volume creation processing (S16260).

Note that, if the virtual volume creation command 1610 includes the specification of "type of media to be used," the configuration control program 3503, before S16260, determines whether the specified media exist in the storage apparatus 30 or not and, if affirming this determination, proceeds to S16260 or, if negating this determination, notifies the user that the virtual volume creation failed. The same applies to the processing related to the flowcharts described later.

In this case, if the automatic capacity extension/reduction function is set on, the pool for the virtual volume is set as a capacity virtualization pool and, if the function is not set on, the pool for the virtual volume is set as a conventional pool.

The correspondence relationship between the virtual volume and the pool for the virtual volume is achieved by being registered in the management table.

Meanwhile, the configuration control program 3503, if determining that the unused capacity of the capacity virtualization pool is insufficient (S16190), checks whether the automatic extension/reduction function in the capacity virtualization pool is set on or not (S16120) and, if this is not set on, [the program] determines that the storage apparatus cannot add pool volumes to the pool for the virtual volume and that, as a result, the capacity of the pool for the virtual volume is likely to be insufficient, and next, notifies the user that the virtual volume creation is not possible and that the new pool creation is not possible (S16240).

If [the function is] determined to be set on at S16200, at S16210, [the program] determines whether the pool volumes based on the media specified at S16100 exist in the system capacity pool or not.

If the determination is affirmed at S16210, at S16220, [the program] adds pool volumes from the system capacity pool to the capacity virtualization pool, and registers the added volumes in the capacity virtualization pool management table (FIG. 15). Next, at S16230, [the program] associates the virtual volume with the capacity virtualization pool, and terminates the virtual volume creation processing.

If the determination is negated at S16210, at S16240, [the program] notifies the user that the media specified at S16100 do not exist in the storage system, and therefore that the virtual volume creation cannot be performed.

If determining at S16110 that the specified pool does not exist in the storage apparatus, at S16120, [the program] checks whether the capacity extension/reduction function of the pool for the virtual volume is set on or off. The configuration control program 3503 manages [the setting between] on and off of the hierarchization management function and the automatic capacity change function by dedicated flags.

If the automatic capacity change function is off, at S16180, as at S16250, [the program] terminates the processing. Meanwhile, if the relevant function is determined to be on, at S16130, [the program] determines whether the pool volumes based on the media specified at S16100 exist in the system capacity pool or not (S16130) and, if this is determined to be negative, as at S16240, terminates the processing.

If the determination is affirmed at S16130, [the program] sets a new capacity virtualization pool for which the automatic capacity extension/reduction function is set (S16140). Furthermore, the configuration control program adds pool volumes from the system capacity pool to the capacity virtualization pool (S16150). The pool volumes to be added from the system capacity pool to the capacity virtualization pool are sequentially determined from the multiple pool volumes in accordance with the priority.

Next, the configuration control program causes the virtual volume to correspond to the new capacity virtualization pool (S16160), and terminates the virtual volume creation processing.

Figure 32:
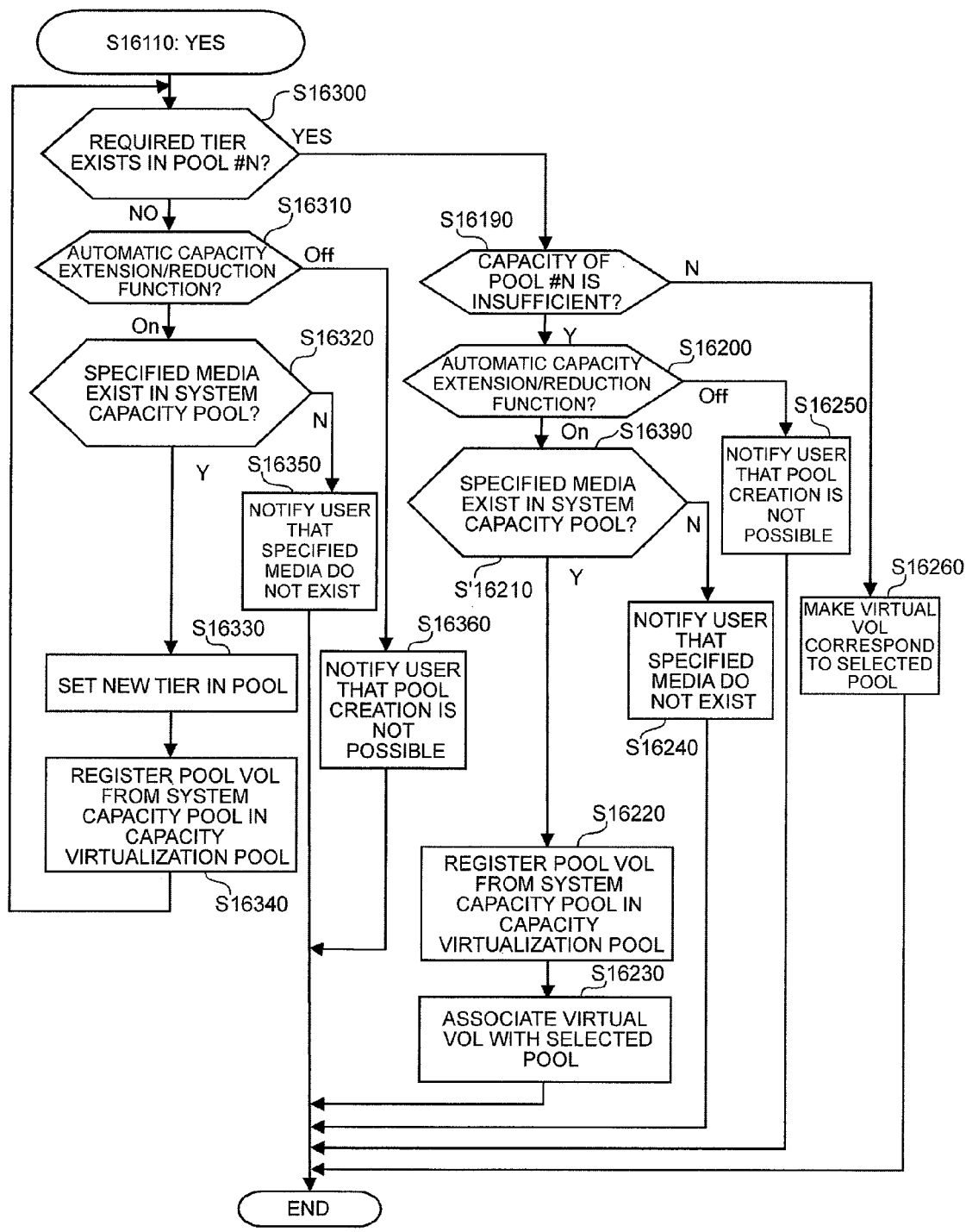
FIG. 32 is a flowchart related to a second example of the virtual volume creation processing.

FIG. 32 shows a flowchart related to a second example of the virtual volume creation processing. What is different from the flowchart in FIG. 31 is that the user can set hierarchies for the virtual volume. If the determination at the above-mentioned S016110 is "Not exist," the same processing as in FIG. 31 is performed. The case where this determination is "Exist" is as shown in FIG. 32, and is different from [the case] in FIG. 31.

The configuration control program 3503 determines whether the hierarchies required for the virtual volume exist in the pool specified at S16100 or not (S16300). The processing in cases where this is determined to be "Exist" is the same as the processing at the above-mentioned S16190 and later.

If the determination at S16300 is "Not exist," at S16310, [the program] determines whether the automatic capacity extension/reduction function is on or off. If this is determined to be "Off," at S16360, [the program] notifies the user that the creation of the pool for the virtual volume is not possible and that the virtual volume creation is not possible, and terminates the processing.

If [the function is] determined to be "On" at S16310, at S16320, [the program] determines whether the pool volumes based on the media specified at S16100 exist in the system capacity pool or not and, if this is determined to be negative, as at S16350, notifies the user that the specified media cannot be associated with the virtual volume, and terminates the processing.

Meanwhile, if the determination is affirmed at S16320, at S16330, [the program] newly sets a hierarchy for the capacity virtualization pool, adds pool volumes from the hierarchy of the system capacity pool to the new hierarchy of the capacity virtualization pool at S16340, and returns to S16300. The configuration control program 3503 continues the processing at S16300 and later until there is no more insufficient hierarchy in the capacity virtualization pool.

Figure 33:
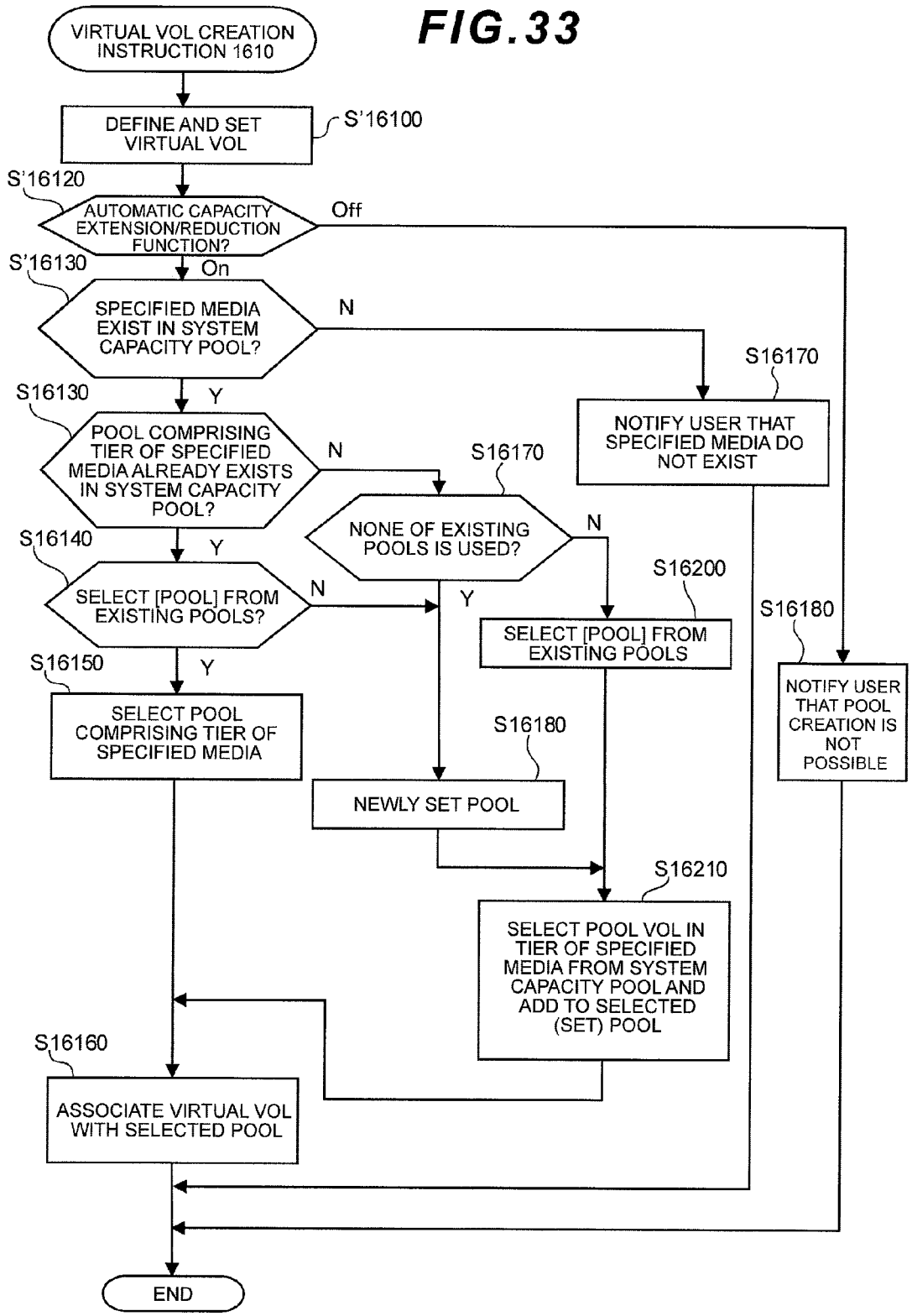
FIG. 33 is a flowchart related to a third example of the virtual volume creation processing.

FIG. 33 is a flowchart related to a third example of the virtual volume creation processing. The characteristic of this flowchart is that the user or others is enabled to select whether to use an existing [pool] or newly set [a pool] as the pool for the virtual volume.

Note that, if the user or others selects to newly create a capacity virtualization pool, the user or others should perform the setting of a pool ID, a capacity, a media type, a threshold and others of the capacity virtualization pool for the new capacity virtualization pool.

The configuration control program 3503 determines whether a capacity virtualization pool comprising the hierarchy of the media specified at S16100 already exists or not (S16130). If this determination is negated at S16130, at S16170, [the program] determines whether to use the existing capacity virtualization pool or not. If, at S16170, in accordance with the input from the user, determining to use the existing capacity virtualization pool for the access processing to the virtual volume, at S16200, [the program] selects the target capacity virtualization pool from the existing multiple capacity virtualization pools.

At S16210, from the system capacity pool, [the program] selects the pool volumes of the hierarchy comprised of the media specified at S16100, and adds the same to the capacity virtualization pool selected at S16200. The capacity and the number of pool volumes to be added are determined in advance.

Next, at S16160, [the program] registers the correspondence relationship between the virtual volume and the selected capacity virtualization pool in the management tables of the volume and the pool, and terminates the processing.

Meanwhile, if determining not to use the existing capacity virtualization pool at S16170, at S16180, [the program] sets a new capacity virtualization pool in the management table, and proceeds to the processing at S16210.

If "affirmative" is determined at S16130, [the program] selects whether to use the existing capacity virtualization pool or not and, if "negative" is selected at S16140, proceeds to S16180. If "affirmative" is selected, at S16150, [the program] selects the capacity virtualization pool comprising the hierarchy configured of the media specified at S16100 from the existing capacity virtualization pools, proceeds to S16160, and terminates the processing.

Next, the new capacity virtualization pool creation processing is described in accordance with the flowchart from FIG. 34A to FIG. 34D. Firstly, the administrator specifies a pool ID which is an identifier of a capacity virtualization pool, a threshold, a usage, a number of Type 1 LDEVs, and of the respective LDEV numbers to the management server 20 via the GUI (S41110).

The management program of the management server 20 generates a capacity virtualization pool creation command including the input information, and sends the relevant command to the storage apparatus 30. The command control program 3501 of the storage apparatus receives the creation command (S41130).

The command control program 3501 confirms the contents of the received command and, if the content of the command is what is considered to be invalid, rejects the reception of this command (S41140). Furthermore, the command control program, if determining the received command to be for the capacity virtualization pool setting processing, passes the received command to the pool control program 3507. The pool control program 3507, in accordance with the received command, performs the setting and creation processing of the capacity virtualization pool (S41150).

Next, the pool control program 3507 proceeds to the flowchart in FIG. 34B. The pool control program 3507 confirms whether the pool ID included in the instruction command is valid or not and, at the same time, whether this is undefined or not (S41180).

Next, the pool control program 3507 acquires the pool specific information of the capacity virtualization pool ID instructed by the command from the capacity virtualization pool management information 3521 (FIG. 15), and sets the pool status from pool undefined to pool being defined (S41190).

Next, the pool control program 3507 confirms whether the LDEV number instructed by the command can be used or not (S41210). As more specifically described, if the LDEV number related to the instruction command is blocked or being formatted, the relevant LDEV cannot be used, and therefore [the program] rejects the command (S41210).

If the LDEV instructed by the command is already being used, for example, if the LDEV is already defined for a path, if [the LDEV is] being used by the copy function or others, or if [the LDEV is] set to be reserved as the copy destination, the LDEV cannot be used, and therefore the pool control program 3507 rejects the command (S41220).

Next, the pool control program 3507, in accordance with the information specified by the command, sets a capacity, a free capacity, a threshold, and a number of pool-volumes for the pool specific information (management table in FIG. 15) (S41230).

Next, the pool control program 3507 determines whether the hierarchy management function (FIG. 37: (Tier management function)) is set on or not for the pool instructed by the command (S41240). If this determination is affirmed, the pool control program 3507 determines whether the processing from S41260 to S41320 is repeated or not for the number of LDEVs (pool volumes) specified by the command (S41250).

If this determination is negated, the pool control program 3507 selects one LDEV from the multiple LDEVs specified by the command, and registers the selected LDEV in the pool volume device number list (FIG. 15: 35220) (S41260).

Next, the pool control program 3507 determines whether the management information of the hierarchy information area corresponding to the pool volumes is set for the pool instructed by the command or not (S41270).

If this determination is negated, the pool control program 3507 creates a management information table 35271 for managing the hierarchies of the capacity virtualization pool, and registers this in the hierarchy list (35223) of the capacity virtualization pool management table (S41280).

Next, the pool control program 3507 accesses the hierarchy management table 35271 (FIG. 17), and registers the LDEV number ID in the pool volume list 35283 (S41290).

Next, the pool control program 3507 assigns PSCBs to the Type 1 LDEVs set for the capacity virtualization pool (S41300). Then, [the program] connects the PSCBs to the free queue of each hierarchy (S41310).

By the above-mentioned method, the pool control program 3507 sets the Type 1 LDEVs for the capacity virtualization pool, and the configuration control program 3503 sets the LDEV management information 3512. As more specifically described, for the device attribute 35218 in the LDEV management information 3512 (FIG. 12) of the LDEV number specified by the command, [the program] sets the identifier (pool volume attribute) indicating the capacity virtualization pool and, for the pool ID, registers the pool ID to which the pool volume belongs (S41320).

Figure 34A:
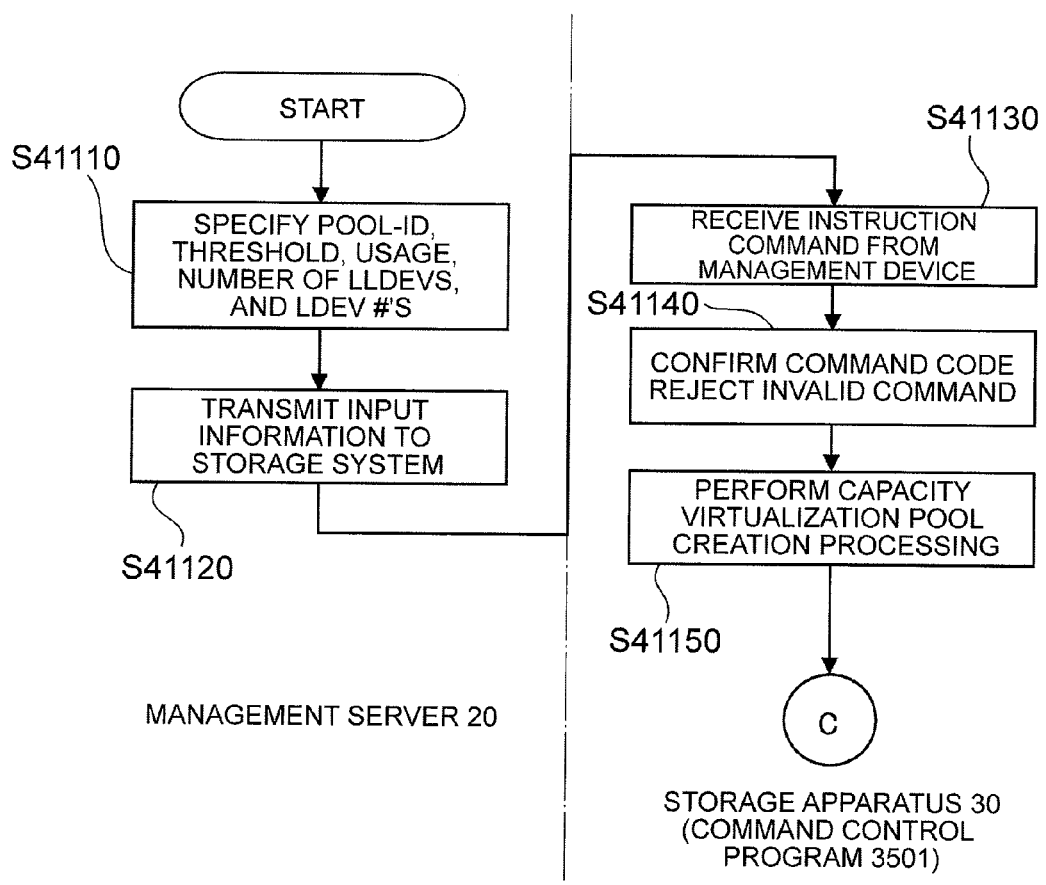
FIG. 34A is a flowchart related to a part of new capacity virtualization pool creation processing.
Figure 34C:
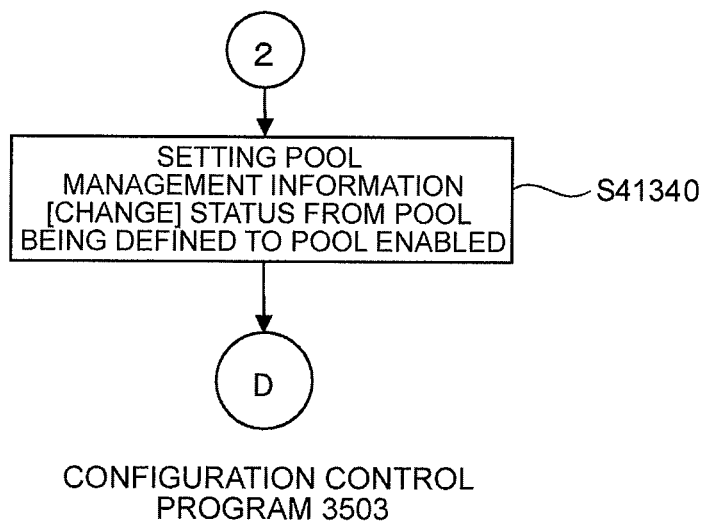
FIG. 34C is a flowchart related to yet another part of the new capacity virtualization pool creation processing.

Next, the configuration control program 3503 transfers the control to the pool control program 3507, and the pool control program 3507 returns to S41250 and, if determining that the processing for all the LDEVs is completed, transfers the control to the configuration control program 3503. The configuration control program 3503, as shown in FIG. 34C, sets the pool ID status of the pool management information 3512 from "Pool being defined" to "Pool enabled" (S41340).

Figure 34D:
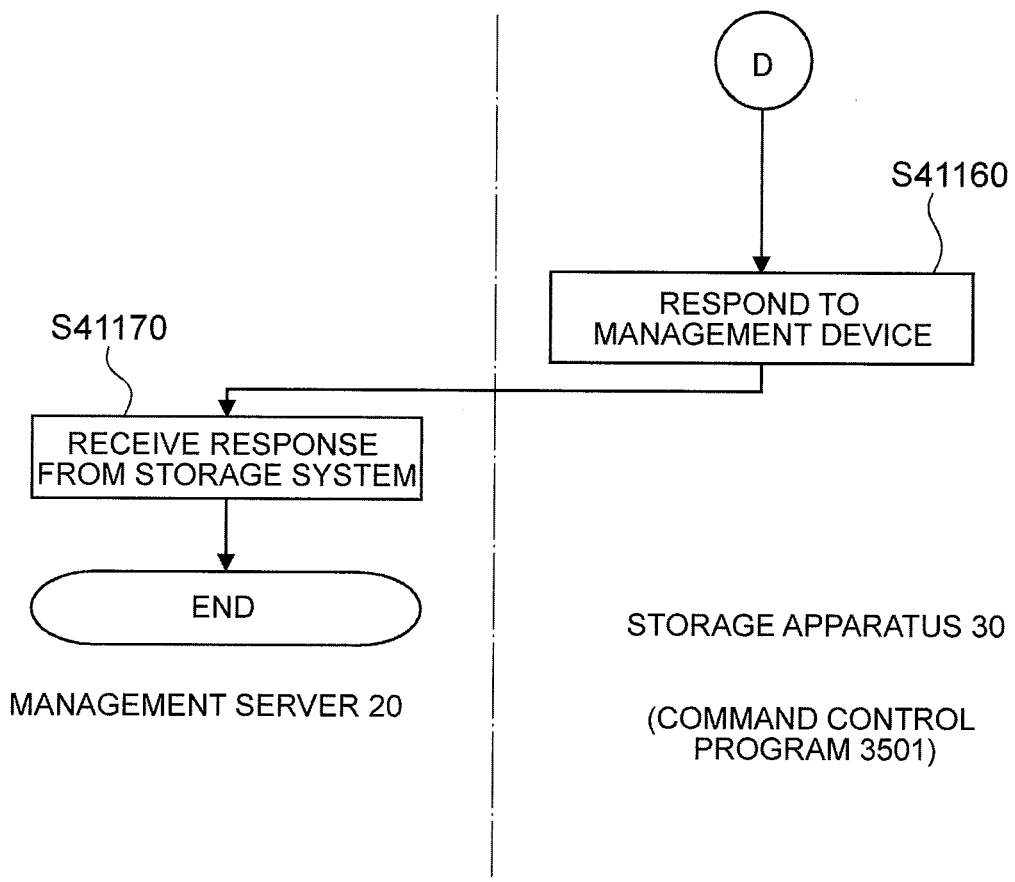
FIG. 34D is a flowchart related to yet another a part of the new capacity virtualization pool creation processing.

Then, as shown in FIG. 34D, the command control program 3501 sends a response that the command is successful to the management server 20 (S41160). Then, the management program of the management server 20, receiving the response from the storage apparatus (S41170), terminates this series of processing.

At S41240 of FIG. 34B, if the hierarchy management function is determined to be off, the pool control program 3507 omits the processing from S41270 to 41290, and performs S41250, S41260, S41300, S41310, and S41320. However, as no Tier management information exists, at S41310, no free PSCB queue for each Tier exists.

Though, in generating a capacity virtualization pool, the flowchart from FIG. 34A to FIG. 34D should set LDEVs from the PDEVs for the capacity virtualization pool, the pool volumes of the system capacity pool 44 may also be assigned to the capacity virtualization pool 42, or both of the methods may also be adopted.

Furthermore, though [the flowchart] from FIG. 34A to FIG. 34D describes that a pool is generated in accordance with the user instruction from the management server 20, a capacity virtualization pool may also be generated in accordance with the user instruction from the host computer or from the maintenance terminal instead of the management server.

Note that, if the input information from the user includes the media type which should be used for creating a capacity virtualization pool, the storage apparatus 30 firstly determines whether the specified media exist or not and, if [the media] exist, performs the new capacity virtualization pool setting processing related to [the flowchart] from FIG. 34A to FIG. 34D. If the specified media do not exist, [the storage apparatus] notifies the user that the specified media do not exist in the system.

Though the [flowchart] from FIG. 34A to FIG. 34D is described as the processing for generating a capacity virtualization pool, the flowchart from FIG. 34A to FIG. 34D can be applied to the case where a system capacity pool is generated.

As the management information, instead of the capacity virtualization pool management information 3521, the system capacity pool management information 3525 is utilized. As for the system capacity pool 44, the processing is merely the addition of pool volumes, and therefore the pool control program 3507 does not perform the system capacity pool creation by the method utilizing the queue form of PSCBs (S41300, S41310) as the case of capacity virtualization pools.

Meanwhile, the pool control program 3507, if pool volumes are added from the system capacity pool to the capacity virtualization pool, at that step, creates PSCBs of the pool volumes.

Next, the processing for adding pool volumes automatically from the system capacity pool to the capacity virtualization pool is described with reference to FIG. 38. FIG. 38 is a flowchart performed by the pool control program 3507.

The pool control program 3507, if detecting any triggers for starting the additional capacity installation processing of the capacity virtualization pool, starts the flowchart. These triggers are the trigger that the storage apparatus 30 receives a command generated by the management server 20 and that the trigger for the storage apparatus 30, independently of the command from the management server 20, internally generates a capacity extension command for the capacity virtualization pool.

In the former mode, the management server 20 regularly checks the status of the storage apparatus 30 and, if detecting that the capacity of the capacity virtualization pool 42 is insufficient, sends a command for extending the capacity of the capacity virtualization pool to the storage apparatus 30. In the latter mode, the automatic capacity extension/reduction program 3509 performs the capacity monitoring processing for the capacity virtualization pool.

The pool control program 3507 determines the ID of the capacity virtualization pool to which pool volumes should be added and, with the relevant ID as a key, checks the capacity virtualization pool management information table 3521. The pool control program 3507, if confirming with reference to the capacity virtualization pool management information table that the ID is valid and that the pool status 35218 is "Undefined" (S5000), next, sets the pool status to "Being extended" (S5002).

With reference to the system capacity pool management information table (FIG. 18), from the unused pool volumes, [the program] selects one or multiple pool volumes which should be added to the capacity virtualization pool (S5004).

Note that, if hierarchy management is applied to the capacity of the capacity virtualization pool, the pool control program 3507 refers to the hierarchy list 35271 in the system capacity pool management information table, and selects the pool volumes which are classified for the same type of hierarchy as the hierarchy whose capacity is insufficient in the capacity virtualization pool.

Next, the pool control program 3507 specifies the system capacity pool ID, the capacity virtualization pool ID, the pool volume numbers (LDEV #'s) to be added from the system capacity pool to the capacity virtualization pool, and the Tier number (S5006).

Next, the pool control program 3507 determines whether the hierarchy management function is set on for the pool instructed by the command or not (S5007). If this determination is affirmed, the pool control program 3507 repeats the processing from S5010 to S5020 for the number of LDEVs (pool volumes) selected at S5002 (S5008).

The pool control program 3507 selects the unprocessed LDEVs, and deletes the numbers of the selected LDEVs from the LDEV list of the system capacity pool management information 3525 (FIG. 18). That is, with reference to the Tier management information table 3513 (FIG. 17) of the same system pool ID and Tier number, [the program] deletes the numbers of the unprocessed LDEVs related to S5010 (S5012).

The pool control program 3507 registers the LDEVs deleted from the system capacity pool management information in the pool volume device number list (FIG. 15: 35220) (S5014).

Next, the pool control program 3507 accesses the hierarchy management table 35271 (FIG. 17) and, in the pool volume list 35283, registers the number of the LDEVs to be added to the capacity virtualization pool (S5016).

Note that updating the capacity virtualization pool control information table is the same as the above-mentioned processing for the system capacity pool (S5010, S5012). The storage apparatus, at the time of registration in the capacity virtualization pool, if the Tier to which the pool volumes to be registered belong does not exist in the capacity virtualization pool, adds the Tier management information 35271 to the capacity virtualization pool management information table.

Next, the pool control program 3507 assigns PSCBs to the LDEVs set for the capacity virtualization pool (S5018). Then, [the program] connects the PSCBs to the free queue of each hierarchy (S5020).

By the above-mentioned method, at the time the pool control program 3507 adds the pool volumes (Type 1 LDEVs) to the capacity virtualization pool 42, as in FIG. 34B, the pool volumes are managed by the PSCBs.

Next, the pool control program 3507 returns to S5008 and, if determining that the processing for all the unprocessed LDEVs is completed, registers the changes such as the capacity and the number of pool volumes which occurred due to the addition of the pool volumes to the capacity virtualization pool in the capacity virtualization pool (S5022).

The configuration control program 3053 changes the status 35218 of the capacity virtualization pool management information (FIG. 15) from "Being extended" to "Pool enabled" (S5024).

The command control program 3501 does not apply Thin Provisioning to the pool volumes whose status is not "Pool enabled."

By the trigger that the pool volumes are added to the capacity virtualization pool, the command control program 3501 performs the above-mentioned page rebalance processing among the multiple pool volumes including the pool volumes added to the capacity virtualization pool.

At S5007, if the hierarchy management function is determined to be off, the pool control program 3507 performs S5008, S5010, S5014, S5018, and S5020 (S5026).

Next, the processing for deleting the pool volumes of the capacity virtualization pool and returning the same to the system capacity pool is described by comparison with FIG. 38. The pool control program 3507, if comparing the capacity with the threshold of the capacity virtualization pool and if determining the capacity of the capacity virtualization pool to be excessive, determines the volumes to be deleted. These volumes are, as described above, for example, the pool volumes with a small number of assigned pages or the pool volumes belonging to the hierarchy with the scarce free capacity.

The I/O control program 3501 migrates the data of the assigned pages of the selected pool volumes to the other pool volumes, and changes the assignment of the virtual volume and the pages. At this step, the command control program performs the above-mentioned rebalance processing.

Next, the pool control program deletes the information of the pool volumes to be deleted from each of the capacity virtualization pool management information, the LDEV management information and, if the capacity virtualization pool is hierarchized, the Tier management information.

At this step, the pool control program cancels the PSCBs which are set for the pool volumes to be deleted, and further releases the unused PSCBs from the free queues.

Next, the pool control program adds the management information of the deleted pool volumes to each of the system capacity pool management information, the LDEV management information and, if the capacity virtualization pool is hierarchized, the Tier management information.

Note that, when the pool control program retrieves the pool volumes from the capacity virtualization pool to the system capacity pool, may also sustain the PSCBs set for the pool volumes without cancelling the same.

Furthermore, as for the addition of pool volumes to the capacity virtualization pool, the case via the system capacity pool and the case without going through the same exist.

Next, the read processing from the host computer to the storage apparatus is described with reference to the figures.

Figure 35:
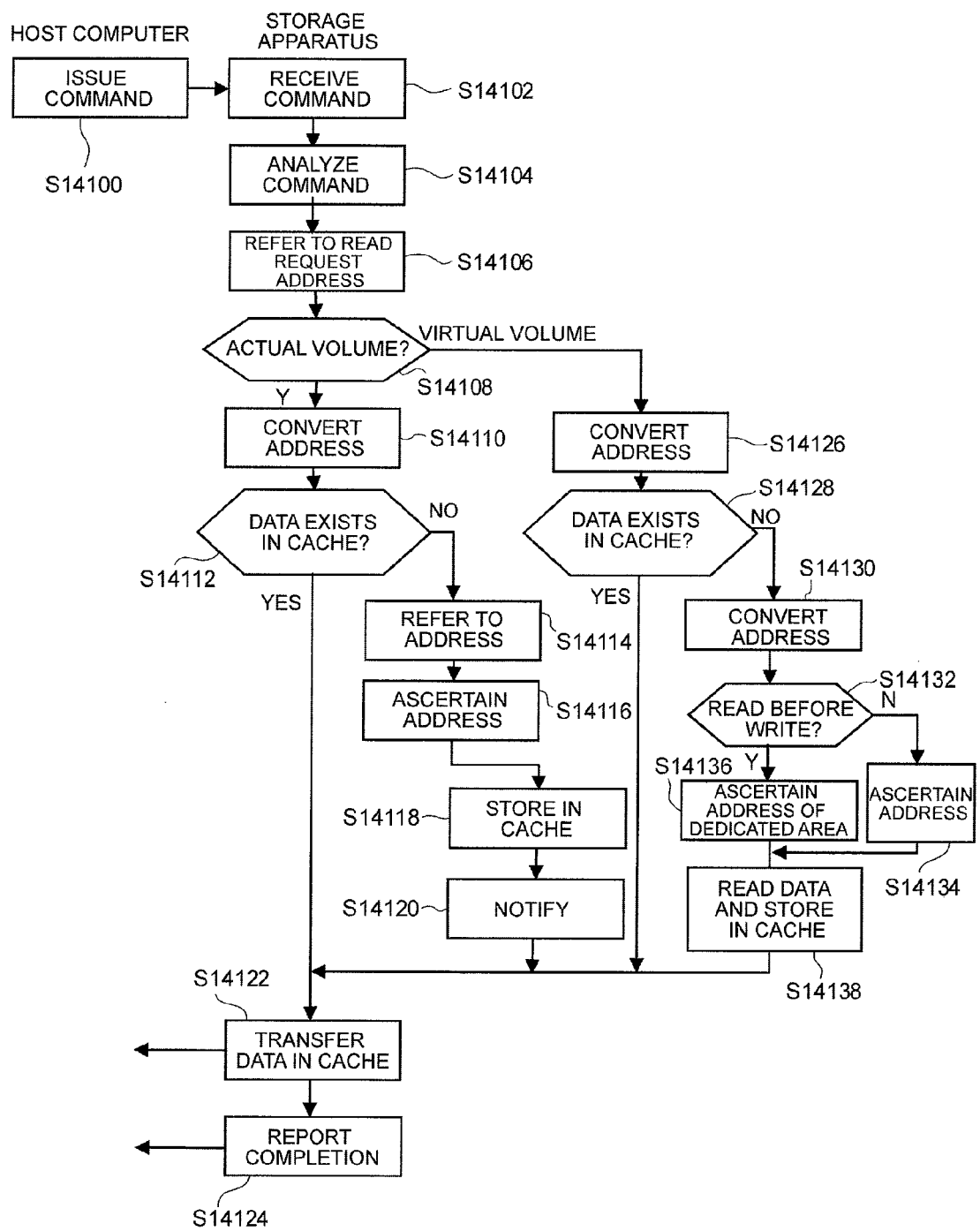
FIG. 35 is a flowchart describing the read processing for the virtual volume from the host computer.

FIG. 35 is a flowchart describing the read processing. If the host computer 10 issues a command (S14100), the storage apparatus 125 accepts the command (S14102). The command control program 3501 of the storage apparatus analyzes the command (S14104), and refers to the address included in the read request (S14106).

The command control program, in accordance with the referred address, determines whether the access target volume is an actual volume or not (S214106).

If determining the read target address to be the address of an actual volume, the command control program performs the LU-LDEV-VDEV address conversion (14110), and determines whether the data of the read target address exists in the cache memory or not (S14112).

If the data of the read target address exists in the cache memory, the command control program transfers the data in the cache to the host computer (S14122), and reports the completion to the host computer (S14142).

If the data of the read target address does not exist in the cache memory, the command control program performs the VDEV-PDEV/external LU address conversion (S14114), ascertains the address of the media in which the read target data is stored (S14116), and starts up a media access program.

The media access program reads the data from the ascertained media address, stores the same in the cache (S14118), and notifies the command control program that [the data] is stored in the cache (S14120). The command control program, receiving the notification from the media access program, transfers the data in the cache to the host (S14122).

If the read target address is the address of a virtual volume, the command control program performs the LU-LDEV-VDEV address conversion (S14126), and determines whether the data of the read target address exists in the cache or not (S14128). If the data of the read target address exists in the cache, [the program] transfers the data in the cache to the host (S14122).

If the data of the read target address does not exist in the cache, the command control program, by the virtual-pool address conversion function (S14130), converts the address of the VDEV space of the virtual volume to the address of the VDEV space of the capacity virtualization pool.

At this time, in case of a data read request to the area to which no data is written (S14132), an address of the VDEV space (0 data area) for returning a default value (e.g. all "0") is ascertained (S14136).

In other cases, the VDEV address of an area assigned to the virtual volume for writing data when writing data for the first time, or otherwise, of an area to which data is migrated from the above-mentioned area for writing data or others for the purpose of distributing the load on the pool, improving the usage rate, and failure recovery is ascertained (S14134).

The command control program further performs the VDEV-PDEV/external LU address conversion, and ascertains the address of the media in which the read target data is stored (S14136). [The program] reads the data from the ascertained media address, and stores the same in the cache memory secured for the address of the virtual volume space (S14138).

Figure 36:
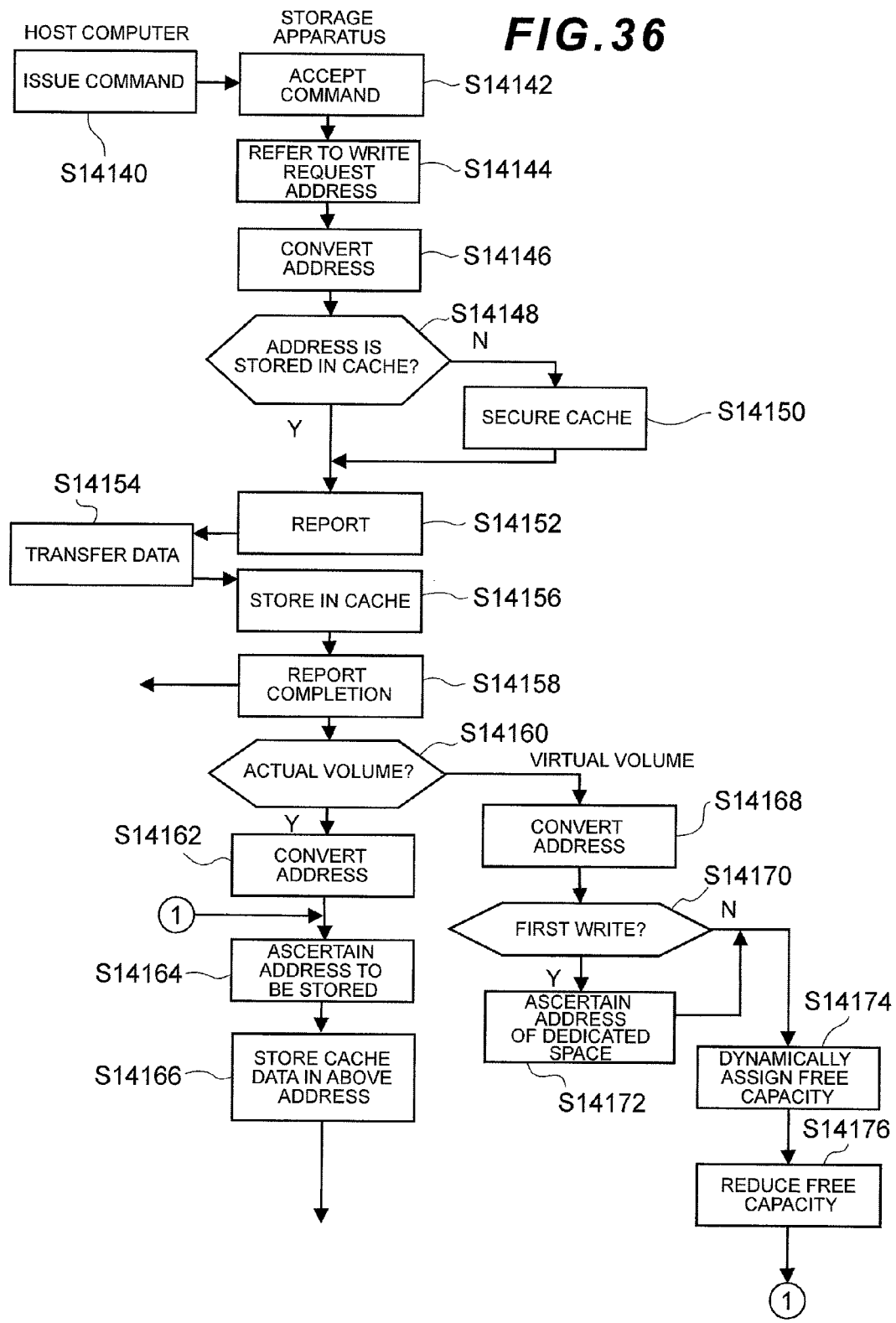
FIG. 36 is a flowchart describing the write processing for the virtual volume from the host computer.

Next, the write processing is described with reference to the flowchart in FIG. 36. The storage apparatus 125, receiving a write command (S14140, S14142), the command control program refers to the address of the write request (S14144).

Regardless of whether the address is of an actual volume or of a virtual volume, [the program] performs the LU-LDEV-VDEV address conversion (S14146), and determines whether the write target address is secured in the cache memory or not (S14148).

If no cache memory is secured for the write target address, the command control program secures a cache memory area for storing the data to be transferred from the host (14150). Next, the command control program reports to the host that [the program is] prepared to accept the data (S14152).

The command control program, receiving the transferred data from the host computer (S14154), stores the data in the secured cache memory (S14156), and sends a write completion report to the host device (S14158).

If the write request address is the address of an actual volume (S14160), the command control program performs the VDEV-PDEV/external LU address conversion (S14162), ascertains the address of the media in which the write target data is to be stored (S14164), and writes the data stored in the cache memory to the media address (S14166).

If the write request address is a virtual volume (S14160), the command control program, by the virtual volume address-capacity virtualization pool address conversion function, refers to the VVOL-DIR table, and converts the address of the VDEV space of the virtual volume to the address of the VDEV space of the capacity virtualization pool (S14168).

If the write is a write request for the area to which no data is written before (S14170), the command control program ascertains an address of the VDEV space (0 data area) for returning a default value (e.g. all "0") (S14172), and cancels the assignment of this address and the virtual volume address.

Next, the command control program dynamically assigns the free area of the capacity virtualization pool for storing the data corresponding to the address of the virtual volume (S14174). At this step, the command control program leaves out the assigned area from the target of the free area management, and reduces the free capacity (S14176).

At this step, the command control program performs the threshold check for the free capacity of the capacity virtualization pool. The command control program, if determining the capacity of the capacity virtualization pool to be insufficient or excessive, starts up the automatic capacity extension/reduction program.

Furthermore, [the program] ascertains the address of the capacity virtualization pool for which the above-mentioned dynamic assignment of the free area is performed as the address of the VDEV space of the capacity virtualization pool corresponding to the address of the write target VDEV space for the virtual volume.

Note that, though each of the modules in this invention disclosed in the claims described later is a software module achieved by the one or multiple above-mentioned programs, a part or all of the same may also be achieved by dedicated hardware modules.

Reference Sign List
10 Host computer
20 Management device
30 Storage apparatus
42 Capacity virtualization pool
44 System capacity pool

The invention claimed is:

1. A computer system, comprising:
a control device for processing a write access from a host computer; and
at least one storage device,
wherein the control device is configured to:
provide an access target to be accessed by the host computer,
provide a first pool, having one or more logical volumes provided by the at least one storage device and which are arranged in a hierarchy,
provide a second pool, having one or more logical volumes provided by the at least one storage device and which are arranged in a hierarchy,
assign a storage capacity from the one or more logical volumes of the first pool to a write destination area of the access target of a write request from the host computer,
add at least one of the one or more logical volumes in the second pool to the first pool, according to a status of the first pool, and
add at least one logical volume provided by the at least one storage device to the second pool, according to a status of the second pool,
wherein the at least one logical volume of the second pool added to the first pool belongs to a same part of the hierarchy in the first pool as in the second pool.

2. The computer system according to claim 1,
wherein the access target is a virtual volume in which a capacity provided to the host computer is virtualized, and
wherein the control device is further configured to:
virtualize a capacity of the first pool.

3. The computer system according to claim 2,
wherein the control device is further configured to:

delete at least one of the logical volumes in the first pool and recover the deleted at least one logical volumes in the second pool upon determining that there is an excess in actual capacity that can be assigned to the access target from the first pool.

4. The computer system according to claim 1,
wherein the control device is further configured to:
set a first threshold to the actual capacity of the first pool, and
determine deficiency in the actual capacity of the first pool based on the first threshold.

5. The computer system according to claim 2,
wherein the control device is further configured to:
provide the first pool and the second pool so that the first pool and the second pool have the same hierarchy.

6. The computer system according to claim 1,
wherein the control device is further configured to:
set a second threshold to a capacity of the second pool, and
determine whether an excess or a deficiency in the capacity of the second pool exists based on the second threshold, and
add at least one logical volume from the at least one storage device to the second pool upon determining the deficiency in the capacity of the second pool exists.

7. The computer system according to claim 3,
wherein the control device is further configured to:
set a plurality of the first pools, and
upon determining that there is a deficiency in the actual capacity of one of the first pools and that there is an excess in the actual capacity of a second of the first pools, delete at least one of the logical volumes from the second of the first pools, recover the deleted logical volumes in the second pool, and add the recovered logical volumes in the second pool to the one of the first pools.

8. The computer system according to claim 2,
wherein the control device is further configured to:
set a plurality of the virtual volumes, and
compare a threshold based on a capacity of the first pool and a total virtual capacity of the plurality of virtual volumes, and, if determined that the total virtual capacity exceeds the threshold based on the capacity of the first pool, adds the at least one logical volume in the second pool to the first pool.

9. The computer system according to claim 8,
wherein the control device is further configured to:
determine whether to add the at least one logical volume in the second pool to the first pool based on a priority for the threshold based on the capacity of the first pool.

10. The computer system according to claim 1,
wherein the access target is a virtual volume in which a capacity provided to the host computer is virtualized,
wherein the control device is further configured to:
virtualize a capacity of the first pool,
set a first threshold to an actual capacity of the first pool,
set a second threshold to a capacity of the second pool,
delete at least one of the logical volumes from the first pool and recover the deleted logical volume in the second pool upon determining an excess in the actual capacity that can be assigned to the access target from the first pool, and
add one or more logical volumes from the at least one storage device to the second pool upon determining a deficiency in the capacity of the second pool based on the second threshold.

11. The computer system according to claim 10,
wherein the control device is further configured to:
set a plurality of the first pools, and
upon determining that there is a deficiency in the actual capacity of one of the first pools and that there is an excess in the actual capacity of a second of the first pools, delete at least one of the logical volumes from the second of the first pools, recovers the deleted logical volumes in the second pool, and add the recovered logical volumes in the second pool to the one of the first pools.

12. The computer system according to claim 10,
wherein the control device is further configured to:
create the logical volumes of the first pool and the second pool from the at least one storage device of an externally connected storage.

13. The computer system according to claim 10,
wherein the control device is further configured to:
set a plurality of the first pools, and
wherein, upon determining that there is a deficiency in the actual capacity of one of the first pools and that there is an excess in the actual capacity of a second of the first pools, delete at least one of the logical volumes from the second of the first pools, and add the deleted logical volumes to the one of the first pools without recovering the deleted logical volumes in the second pool.

14. The computer system according to claim 1,
wherein the control device is further configured to:
determine whether the write destination area of the write request has been assigned to the access target when there is a write request to the access target,
assign additional storage capacity to the access target upon determining the write destination area of the write request has not been assigned to the access target, and
writing write data of the write request in the write destination area upon determining the write destination area of the write request has been assigned to the access target.

15. The computer system according to claim 1, wherein the same part of the hierarchy in the first pool and second pool corresponds to a particular tier of the hierarchy.

16. A storage control method of a computer system that controls access from a host computer and thereby controls read/write processing to at least one storage device, the storage control method comprising:
providing an access target to be accessed by the host computer;
providing a first pool, having one or more logical volumes provided by the at least one storage device and which are arranged in a hierarchy;
providing a second pool, having one or more logical volumes provided by the at least one storage device and which are arranged in a hierarchy;
assigning a storage capacity from the one or more logical volumes of the first pool to a write destination area of the access target of a write request from the host computer;
adding at least one of the one or more logical volumes in the second pool to the first pool, according to a status of the first pool;
adding at least one logical volume provided by the at least one storage device to the second pool, according to a status of the second pool;
wherein the at least one logical volume of the second pool added to the first pool belongs to the same part of the hierarchy in the first pool as in the second pool.

17. The storage control method according to claim 16,
wherein the same part of the hierarchy in the first pool and the second pool corresponds to a particular tier of the hierarchy.

* * * * *